United States Patent
Cain

(10) Patent No.: US 7,027,409 B2
(45) Date of Patent: Apr. 11, 2006

(54) METHOD AND DEVICE FOR ESTABLISHING COMMUNICATION LINKS AND FOR ESTIMATING OVERALL QUALITY OF A DIRECTIONAL LINK AND REPORTING TO OLSR IN A COMMUNICATION SYSTEM

(75) Inventor: Joseph Bibb Cain, Indialantic, FL (US)

(73) Assignee: Harris Corporation, Melborne, FL (US)

( * ) Notice: Subject to any disclaimer, the term of this patent is extended or adjusted under 35 U.S.C. 154(b) by 173 days.

(21) Appl. No.: 10/400,997

(22) Filed: Mar. 27, 2003

(65) Prior Publication Data

US 2004/0032847 A1   Feb. 19, 2004

Related U.S. Application Data

(63) Continuation-in-part of application No. 10/043,457, filed on Jan. 10, 2002, now Pat. No. 6,904,032.

(51) Int. Cl.
*H04B 7/212* (2006.01)
*H04Q 7/00* (2006.01)

(52) U.S. Cl. ............ 370/252; 370/337; 370/338; 370/347; 370/442; 455/450

(58) Field of Classification Search ........... 370/338, 370/345, 347, 348, 328, 350, 392, 252, 254, 370/325, 401, 337, 442; 455/1, 11.1, 562.1, 455/450; 707/1; 702/182
See application file for complete search history.

(56) References Cited

U.S. PATENT DOCUMENTS

| | | | |
|---|---|---|---|
| 5,371,780 A | 12/1994 | Amitay | 379/58 |
| 5,535,207 A * | 7/1996 | Dupont | 370/433 |
| 5,767,807 A | 6/1998 | Pritchett | 342/374 |
| 5,949,760 A * | 9/1999 | Stevens et al. | 370/254 |
| 6,115,580 A * | 9/2000 | Chuprun et al. | 455/1 |
| 6,226,531 B1 * | 5/2001 | Holt et al. | 455/562.1 |
| 6,243,371 B1 | 6/2001 | Chawla et al. | 370/347 |
| 6,278,883 B1 | 8/2001 | Choi | 455/552 |
| 6,295,285 B1 | 9/2001 | Whitehead | 370/329 |
| 6,418,148 B1 | 7/2002 | Kumar et al. | 370/468 |
| 6,438,389 B1 | 8/2002 | Sandhu et al. | 455/562 |
| 6,590,891 B1 * | 7/2003 | Jacquet et al. | 370/350 |
| 6,640,087 B1 * | 10/2003 | Reed et al. | 455/11.1 |
| 6,751,196 B1 * | 6/2004 | Hulyalkar et al. | 370/252 |
| 6,778,512 B1 * | 8/2004 | Gipson et al. | 370/330 |
| 6,798,761 B1 * | 9/2004 | Cain et al. | 370/337 |
| 6,845,091 B1 * | 1/2005 | Ogier et al. | 370/338 |
| 6,850,532 B1 * | 2/2005 | Thubert et al. | 370/401 |
| 6,894,991 B1 * | 5/2005 | Ayyagari et al. | 370/325 |
| 6,901,064 B1 * | 5/2005 | Cain et al. | 370/337 |

(Continued)

*Primary Examiner*—Alpus H. Hsu
(74) *Attorney, Agent, or Firm*—Allen, Dyer, Doppelt, Milbrath & Gilchrist, P.A.

(57) ABSTRACT

A wireless communication network includes a plurality of mobile nodes each including a transceiver, a phased array antenna connected to the transceiver, and a controller connected to the transceiver. The controller discovers routes and routes communications to neighboring nodes with a routing protocol, e.g. an Optimized Link State Routing (OLSR) protocol. The controller schedules time slots to establish a communication link with each neighboring mobile node, and the phased array antenna is aimed by the controller towards each neighboring mobile node during communication therewith. Also, the controller estimates link quality based upon the quality of each time slot scheduled for the communication link and reports estimated link quality to the routing protocol.

32 Claims, 15 Drawing Sheets

U.S. PATENT DOCUMENTS

| | | |
|---|---|---|
| 6,901,066 B1* | 5/2005 | Helgeson .................... 370/348 |
| 2002/0049561 A1* | 4/2002 | Garcia-Luna-Aceves et al. .......................... 702/182 |
| 2003/0067892 A1* | 4/2003 | Beyer et al. ................. 370/328 |
| 2004/0081152 A1* | 4/2004 | Thubert et al. ............. 370/392 |
| 2004/0117339 A1* | 6/2004 | Thubert et al. ................ 707/1 |

* cited by examiner

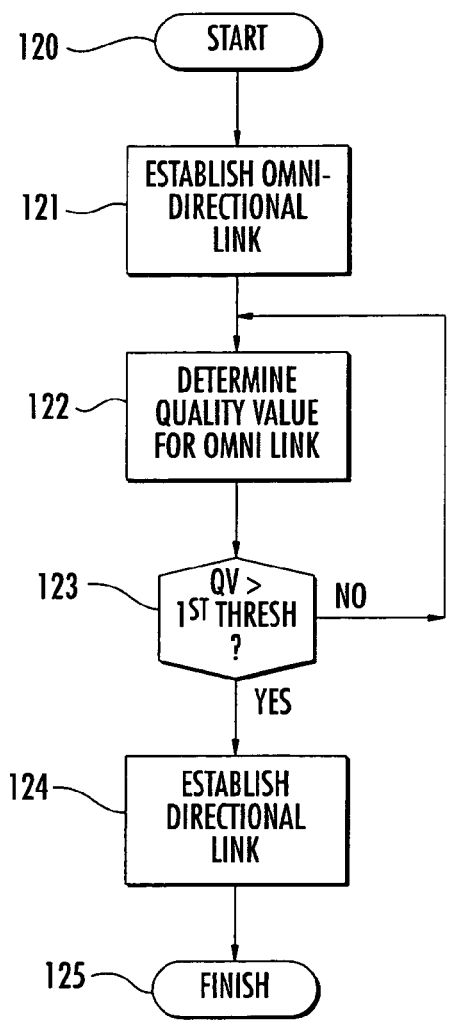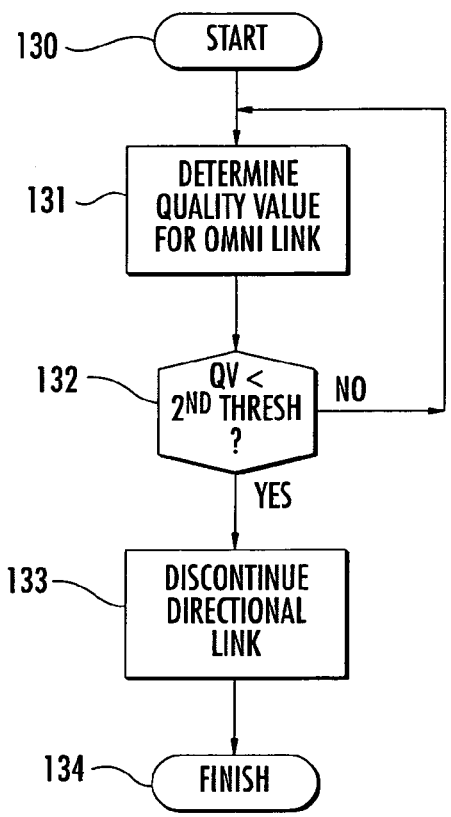
FIGURE 12                    FIGURE 13

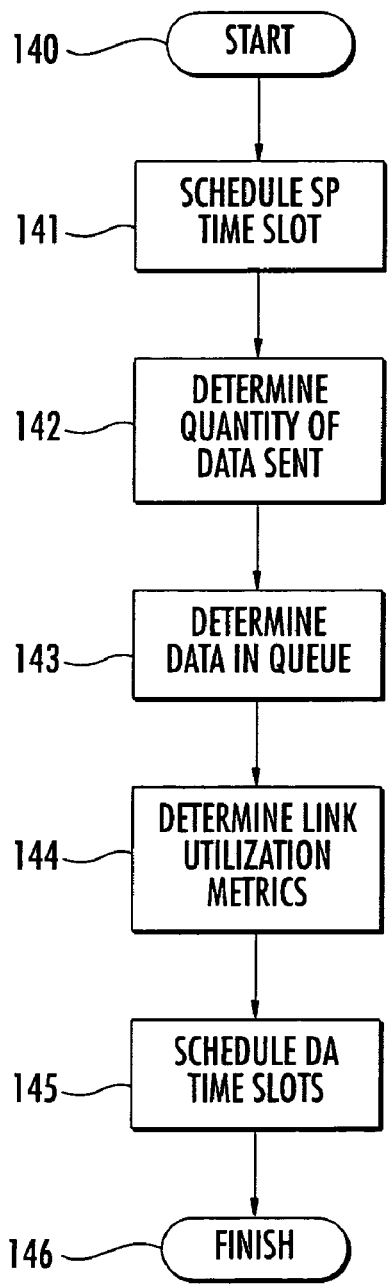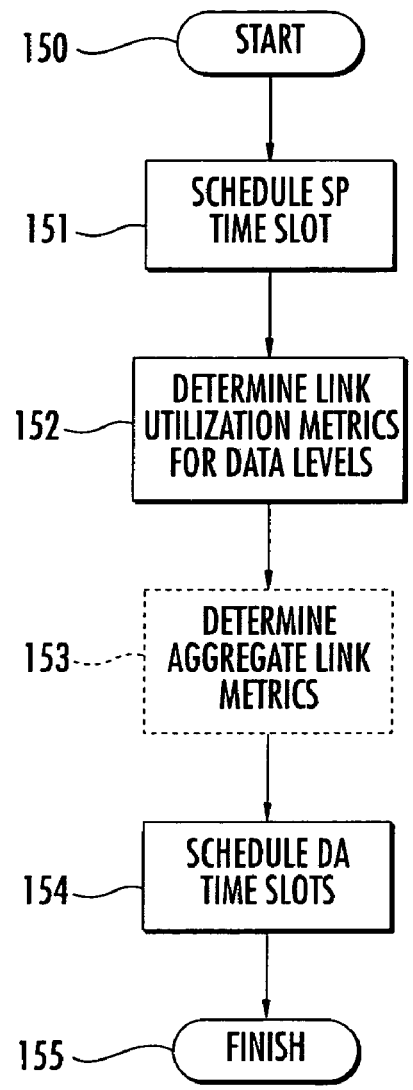
FIGURE 14
FIGURE 15

METHOD AND DEVICE FOR ESTABLISHING COMMUNICATION LINKS AND FOR ESTIMATING OVERALL QUALITY OF A DIRECTIONAL LINK AND REPORTING TO OLSR IN A COMMUNICATION SYSTEM

RELATED APPLICATION

This application is a continuation-in-part of application Ser. No. 10/043,457 filed Jan. 10, 2002 now U.S. Pat. No. 6,904,032, the entire disclosure of which is incorporated herein by reference.

This invention was made with Government support under Contract Number N00014-96-C-2063 awarded by the Naval Research Laboratory. The Government has certain rights in this invention.

FIELD OF THE INVENTION

The present invention relates to the field of communications, and more particularly, to a network of mobile communication systems operating with directional antennas.

BACKGROUND OF THE INVENTION

Time division multiple access (TDMA) is one example of an access scheme used for establishing communication links between wireless mobile communication systems. Communication links between the wireless mobile communication systems are established within a series of time frames. Each time frame is divided into time slots, with each wireless mobile communication system being assigned at least one time slot.

An omni-directional antenna is typically used by a wireless mobile communication system so that information transmitted by one mobile communication system is received by all the other mobile communication systems. When the mobile communication systems are operating at a fixed frequency, they must take turns transmitting within their respective time slots to prevent channel interference.

To improve quality of a communications link between two wireless communication systems, a directional antenna may be used. The directional antenna provides an increased antenna gain in a desired area that is limited in coverage while decreasing the antenna gain towards the remaining area.

U.S. Pat. No. 5,767,807 to Pritchett discloses phased array antennas being used for establishing communication links within a network of wireless communication systems. The phased array antenna includes parasitic elements for selectively controlling the antenna pattern. The phased array antenna radiates an omni-directional signal when all of the parasitic elements are in a high impedance state, and radiates a directional signal when a selected number of parasitic elements are placed in a lower impedance state in response to switching circuits.

More particularly, the Pritchett '807 patent discloses the acquisition, by a fixed initiating wireless communication system from a fixed receiving wireless communication system, of a list of the wireless communication systems operating in the network and a corresponding respective time slot list for each wireless communication system. A table is then created based upon the list for scheduling time slots among the wireless communication systems.

Scheduling time slots for wireless communication systems operating with directional antennas, particularly when the wireless communication systems are mobile, is complex. In such a dynamic network, mobile communication systems are continuously entering into and dropping out of the network. Furthermore, procedures for interference detection and avoidance are needed.

With Optimized Link State Routing (OLSR), link state information can quantify the status of a link with various quality of service (QoS) metrics including bandwidth, delay, and probability of data loss. Each router maintains complete topology information and periodically broadcasts the link state information to all other nodes in the network via flooding. Thus, procedures for reporting link quality to the OLSR protocol in a directional antenna mobile communication system are needed.

SUMMARY OF THE INVENTION

It is an object of the present invention to schedule time slots, and determine and report link quality to a routing protocol in a manner that is responsive to variations in communication link quality in a wireless communications network using directional antennas.

This and other objects, advantages and features in accordance with the present invention are provided by a wireless communication network including a plurality of mobile nodes each having a transceiver, a directional antenna, e.g. a phased array antenna, connected to the transceiver, and a controller connected to the transceiver. The controller preferably includes a communications router to discover routes and route communications to neighboring nodes with a routing protocol, a time slot scheduling unit to schedule time slots to establish a communication link with each neighboring mobile node, an antenna aiming unit to aim said directional antenna toward each neighboring mobile node during communication therewith, and a link quality estimator to estimate link quality based upon the quality of each time slot scheduled for the communication link and to report estimated link quality to the communications router.

The estimated link quality may be defined as the maximum quality of each time slot scheduled for the communication link, and the router may route communications to neighboring nodes based upon the estimated link quality. The communication link is preferably maintained as long as the maximum quality of at least one time slot for the link is above a predetermined threshold, and the router initiates new route discovery when the estimated link quality for the link is below the predetermined threshold. The router may perform a hysteresis function to the estimated link quality reported from the link quality estimator.

A plurality of communication links are preferably established within a scheduled time slot, with each communication link including a different pair of neighboring mobile nodes. The wireless communication network may be a mobile ad-hoc network (MANET), for example.

Objects, advantages and features in accordance with the present invention are also provided by a method for establishing communication links for the plurality of mobile nodes. The method includes, for each mobile node, scheduling time slots to establish a communication link with each neighboring mobile node, aiming the directional antenna toward each neighboring mobile node during communication therewith, estimating link quality based upon the quality of each time slot scheduled for the communication link, and reporting estimated link quality to an Optimized Link State Routing (OLSR) protocol.

BRIEF DESCRIPTION OF THE DRAWINGS

FIGS. 12 and 13 are flow diagrams illustrating a method in accordance with the present invention for establishing directional communication links between the mobile nodes based upon an omni-directional link quality value.

FIGS. 14–16 are flow diagrams illustrating a method in accordance with the present invention for allocating demand assigned time slots based upon link utilization.

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
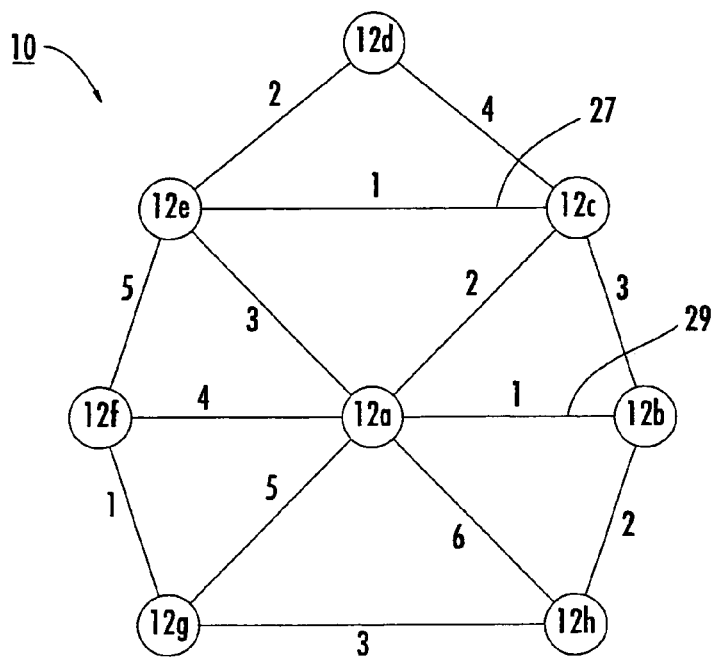
FIG. 1 is a diagram illustrating a wireless mobile ad hoc network in accordance with the present invention.
Figure 2:
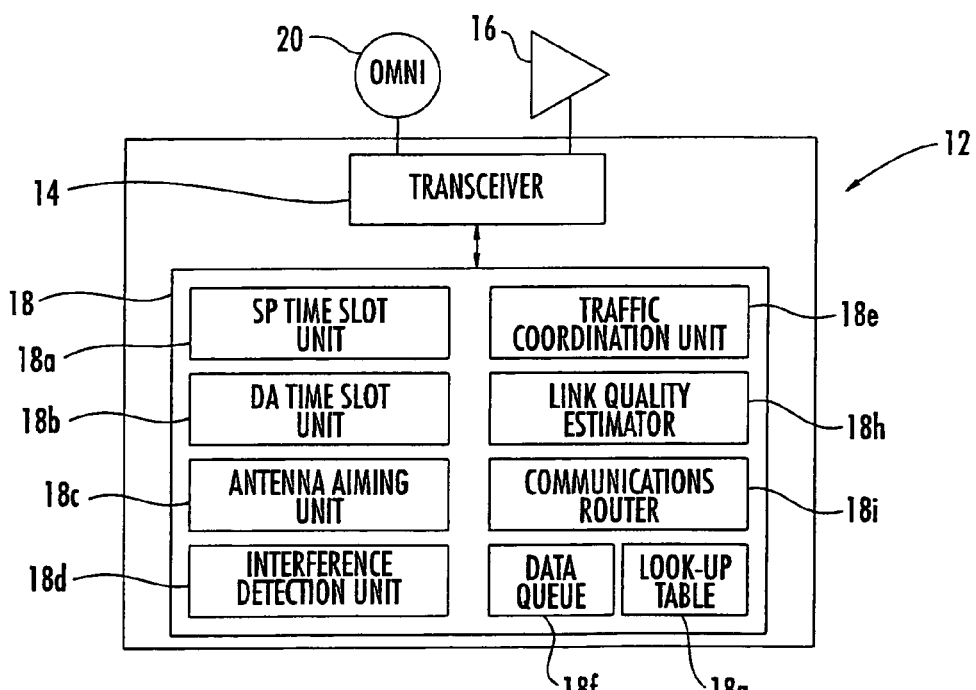
FIG. 2 is a more detailed block diagram illustrating a wireless mobile node in accordance with the present invention.

Referring initially to FIGS. 1–2, a wireless mobile communication network 10 comprises a plurality of wireless mobile nodes 12a–12h. Each mobile node 12a–12h comprises a transceiver 14, a directional antenna 16 connected to the transceiver, and a controller 18 connected to the transceiver.

The controller 18 includes a semi-permanent time slot unit 18a for scheduling a respective semi-permanent time slot for each time frame for establishing a communication link with each neighboring mobile node while leaving at least one available time slot in each time frame. An available time slot unit 18b schedules the at least one available time slot to also serve the communication link with a neighboring mobile node based upon link communications demand. In addition, the controller 18 includes an antenna aiming unit 18c for aiming the directional antenna toward each neighboring mobile node during communication therewith.

Parallel operations can reduce time slot allocation delay. Accordingly, the semi-permanent time slot unit 18a may initiate one or more semi-permanent time slot requests for respective time frames to establish the communication link with each neighboring mobile node and leaving at least one available time slot in each time frame, while processing multiple received semi-permanent time slot requests from neighboring mobile nodes. The available time slot unit 18b may initiate one or more available time slot request to also serve the communication link with the neighboring mobile node based upon link communications demand, while processing multiple received available time slot requests from neighboring mobile nodes.

In other words, a node can have one or more pending demand available requests and semi-permanent requests that it initiated while processing multiple received requests. This may sometimes result in temporarily allocating a given time slot to more than one neighbor. However, this conflict may be eliminated by confirmation messages which indicate the selection of one neighbor node for the time slot, as is discussed in more detail below.

Reliable confirmation messages may be provided with a couple of different approaches. An initiating mobile node transmits a request for time slots to the receiving mobile node, which transmits a reply to the initiating mobile node. The initiating mobile node transmits a confirmation to the receiving mobile node, and the receiving mobile node transmits the reply again if the confirmation is not received. Alternatively, the receiving mobile node may transmit an acknowledgment to the initiating mobile node, and the initiating mobile node transmits the confirmation again if the acknowledgment is not received.

If two nodes simultaneously initiate time slot requests to each other, the time slot request collisions should be handled reliably. The controller 18 waits a time period to resend another request upon simultaneously sending a request to another mobile node and receiving a request from the other mobile node without receiving a corresponding reply. During this time period, incoming time slot requests may be processed. After the period ends, a new request may be sent to the other node if no request was already received from that node or if no time slot allocation was made to that node. If a delayed request reaches the front of the queue, the controller 18 checks to see if a time slot allocation has already been made to that node. If so, the delayed request is discarded. Also, if the request is destined for a node that is no longer a neighbor by the time the request reaches the front of the queue, the delayed request is discarded.

An interference detection unit 18*d* is included to detect interference in time slots for communication with neighboring mobile nodes. The controller 18 coordinates the scheduling of time slots based upon detected interference. The interference detection unit 18*d* may measure a signal-to-interference ratio and/or a packet error rate. The packet error rate may be based upon cyclic redundancy check (CRC) failures. Also, the interference detection unit 18*d* may compare detected interference to a threshold. Preferably, the controller switches an order of communication between nodes for a given time slot based upon detected interference, and may also coordinate scheduling of new time slots based upon detected interference after switching the order of communication.

A traffic coordination unit 18*e* coordinates communication with each neighboring mobile node by allocating time slots to the time slot unit based upon link communications demand. The controller 18 coordinates the scheduling of time slots based upon based upon allocated time slots. The traffic coordination unit 18*e* may allocate a bulk set of time slots based upon an increased link communications demand, and/or may request a bulk set of time slots from neighboring mobile nodes based upon an increased link communications demand. Also, the traffic coordination unit 18*e* may increase a maximum number of time slots, re-allocate time slots, and/or allocate half time slots based upon increased link communications demand. Such increased link communications demand may include streaming video and/or high rate sensor data.

The wireless mobile nodes 12*a*–12*h* are operating in a mobile environment. These systems may be ground based and/or airborne, whereby they are continuously entering into and dropping out of the network 10. The directional antenna 16 may be a phased array, a dish or horn antennas, for example. Transmission via a directional antenna 16 enables the RF signal to be focused in a desired direction.

By selectively controlling the direction of the antenna pattern between a pair of wireless mobile communication systems for establishing a communications link therebetween, additional communication links may be established between other wireless communication systems within the same scheduled semi-permanent time slot. This is illustrated by communication link 27 operating in time slot 1 between mobile nodes 12*c* and 12*e*, and communication link 29 also operating in time slot 1 between mobile nodes 12*a* and 12*b*, as best illustrated in FIG. 1. This feature of the present invention advantageously allows the resources of the wireless mobile communication network 10 to be better utilized.

The controller 18 limits the number of communication links for each wireless mobile node 12*a*–12*h* within each time frame based upon a total number of time slots within the frame. The advantage of limiting the number of communication links to a fraction of the total number of time slots within the time frame significantly simplifies the scheduling of time slots with neighboring nodes.

The number of communication links for each wireless mobile node 12*a*–12*h* within each time frame is less than or equal to N, and the total number of time slots within each frame is greater than or equal to 2N−1. In addition to simplifying the scheduling of time slots, this type of distributed scheduling avoids conflicts.

Distributed scheduling allows any two pair of wireless mobile nodes, such as 12*a* and 12*b*, for example, to schedule a semi-permanent time slot without having to communicate with any other wireless mobile node. In other words, there is no centralized master/slave type of coordination with all of the wireless mobile nodes 12*a*–12*h* for scheduling the semi-permanent time slots. Since the time slots among the wireless mobile nodes 12*a*–12*h* are scheduled in a distributed fashion, there is no single point of failure in the wireless mobile communication network 10.

The controller 18 may prioritize the communication links and drop one of the communication links based upon the prioritization for making available a semi-permanent time slot for establishing a communication link with a new neighboring mobile node. Prioritization of the communication links will be addressed in greater detail below. In addition, the controller 18 may also prioritize the communication links and schedule the at least one available time slot based upon this prioritization.

The controller 18 may also schedule one of the semi-permanent time slots as an available time slot if a number of the communication links is less than N. This advantageously supports communication link demands on an as needed basis for the existing communication links. However, the controller 18 may reschedule the demand assigned time slot back to a semi-permanent time slot if the number of the communication links is again equal to N, as will also be discussed in greater detail below.

Each communication link is formed by an initiating mobile node, such as node 12*a*, and a receiving mobile node, such as node 12*b*, and the initiating mobile node transmits a list of available semi-permanent time slots to the receiving mobile node. The receiving mobile node 12*b* then transmits selection of one of the semi-permanent time slots to the initiating mobile node. The initiating mobile node 12*a* then confirms selection of the selected semi-permanent time slot to the receiving mobile node.

Each mobile node may further comprise an omni-directional antenna 20 connected to the transceiver 14 for exchanging positional information with other neighboring mobile nodes. Other information that may be exchanged includes resource requirements and detection of the presence of a potential new neighbor node. In addition, the phased array antenna 16 may simultaneously generate multiple antenna beams, wherein the controller 18 aims the phased array antenna to multiple neighboring mobile nodes within a scheduled semi-permanent time slot.

The interference detection unit 18*d* detects and avoids interference for collinear node pairs within the beamwidth and allocated the same time slot. For example, referring to FIG. 1, nodes 12*a* and 12*e* transmitting to nodes 12*b* and 12*c*, respectively during their half of the same assigned time slot 1. With wide enough antenna beamwidths, both nodes 12*b* and 12*c* may simultaneously hear transmissions from both nodes 12*a* and 12*e*. The interference detection unit 18*d* may measure the Signal-to-Interference Ratio (SIR) at the physical layer during time slot usage. Alternatively, the packet error rate can be measured at the link layer based upon CRC check failures. If these measurements violate a specified threshold, the slot may be declared bad.

However, because fading may cause a single slot to fail this test, it may be desired to declare excessive interference in a slot if m of n trials of this slot suffer degradation. At this point, the controller 18 attempts to avoid the interference. The order of Tx/Rx at both ends of the link may be switched for the time slot. If such switching fails, a new time slot may be coordinated. Of course both of these changes should be made probabilistically to reduce the likelihood that both node pairs try to make the same change at the same time and thus remain in conflict.

The traffic coordination unit 18e manages unbalanced traffic loads that may be generated by streaming video or high rate sensor data. Coordination mechanisms are provided to permit each half-duplex link to allocate a time slot in any Tx/Rx split of traffic. Also, the maximum number of time slots may be increased to a number above the minimum to create more demand time slots. Subslotting would permit an effective increase or decrease in the maximum number of time slots as nodes may "steal" subslots from a semi-permanent allocated time slot to re-allocate to a demand time slot. Moreover, a reservation protocol could be used together with link scheduling procedures to indicate allocation of resources for a high rate stream at each node along a path from a source to a destination node by requesting and allocating a bulk set of time slots and/or subslots at each node along the path to accommodate the high rate stream. For reserved resources, separate queues and a queue service discipline may be necessary to insure that the capacity required by the stream is delivered.

The invention is also directed to a method for establishing communication links for a plurality of mobile nodes 12a–12h, with each mobile node comprising a transceiver 14, a phased array antenna 16 connected to the transceiver, and a controller 18 connected to the transceiver. The method comprises for each mobile node 12a–12h scheduling a respective semi-permanent time slot for each time frame to establish a communication link with a neighboring mobile node and leaving at least one available time slot in each time frame.

The at least one available time slot is preferably scheduled to serve the communication link with a neighboring mobile node based upon link communications demand. The phased array antenna 16 is aimed toward each neighboring mobile node 12a–12h during communication therewith. Each time frame may have up to N semi-permanent time slots and at least 2N−1 available time slots.

The method may also include initiating one or more semi-permanent time slot requests for respective time frames to establish a communication link with each neighboring mobile node and leaving at least one available time slot in each time frame, while processing multiple received semi-permanent time slot requests from neighboring mobile nodes, and initiating at least one available time slot request to also serve the communication link with a neighboring mobile node based upon link communications demand, while processing multiple received available time slot requests from neighboring mobile nodes.

The directional/phased array antenna 16 is aimed toward each neighboring mobile node 12a–12h during communication therewith, interference is detected in time slots for communication with neighboring mobile nodes, and the scheduling of new time slots is coordinated based upon detected interference. The interference detection unit 18d may measure a signal-to-interference ratio and/or a packet error rate. The packet error rate may be based upon cyclic redundancy check (CRC) failures. Also, the interference detection unit 18d may compare detected interference to a threshold. Preferably, the controller 18 switches an order of communication between nodes for a given time slot based upon detected interference, and may also coordinate scheduling of new time slots based upon detected interference after switching the order of communication. Also, communication with each neighboring mobile node 12a–12h may be coordinated by allocating time slots for scheduling based upon link communications demand.

The method further includes having each node prioritize the communication links and drop one of the communication links based upon the prioritization for making available a semi-permanent time slot for establishing a communication link with a new neighboring mobile node. In addition, an available time slot that is currently scheduled to serve a particular communication link may be reassigned to another communication link based on link demand. This advantageously allows any mobile node to accommodate variations in communication link demands.

Scheduling of the semi-permanent time slots and the available time slots will now be discussed in greater detail. Details on steering the directional antennas 16 toward a receiving mobile node 12a–12h will be omitted since this feature of the present invention is readily understood by one skilled in the art.

For purposes of discussion, it will be assumed that the directional antenna 16 is a phased array antenna. As readily understood by one skilled in the art, a phased array antenna 16 includes a plurality of antenna elements and respective phase shifters that can be adjusted for producing a steerable antenna beam in a desired direction. The phased array antenna 16 steers or scans the antenna pattern without physically moving the antenna.

Also for purposes of discussion, a number of assumptions about the wireless mobile communication network 10 are made. First, there is a single frequency band that is a high data rate channel that is shared by all the wireless mobile nodes 12a–12h. This type of transmission channel is time shared between all the wireless mobile nodes 12a–12h for both transmit and receive. All transmission slots are scheduled in advance.

An assumption is also made that a separate low data rate overhead channel is provided. This overhead channel can be used for node discovery, net entry, and exchange of various other data link control overhead information including resource requests. This overhead channel is provided via an omni-directional antenna 20. Good global timing reference is also known at all nodes. The terms wireless mobile nodes and wireless mobile communications systems 12a–12h are interchangeable throughout the following discussion.

The wireless mobile communication network 10 also includes the capability for locating and tracking mobile nodes so that the phased array antennas 16 can be pointed accurately when a scheduled time slot is available. As noted above, a detailed discussion on the pointing/tracking will not be provided herein.

An assumption is also made that the phased array antennas 16 have zero beamwidth. This assumption will be relaxed later. Consequently, we can assume that a transmission by a given mobile node will be received only by the neighbor mobile node to which it is attempting to transmit. This allows a less restrictive set of constraints on the scheduling of time slots. Each communications link will be labeled with a number which represents a scheduled time slot for transmitting and receiving data therein.

The constraints are as follows. No node may have more than one communications link labeled with the same time slot number. A given time slot assignment will apply to a half duplex link between two mobile nodes, and be used alternately by the two nodes for transmit and receive. These two constraints imply that a time slot assigned by a mobile node to one of its neighboring nodes is constrained by the previous time slot assigned by that node to other links.

The scheduling of time slots for the phased array antenna 16 is illustrated in FIG. 1, which shows a network 10 with link connectivity based upon scheduled time slots. The time slots are scheduled so that the wireless mobile nodes 12a–12h know when to point their respective phased array antenna 16 toward a neighboring wireless mobile node.

The communication links are assumed to be bi-directional and are used in a half duplex fashion where each time slot number represents a time slot and a transmission opportunity in each direction occurring in that time slot. The term $N_{frame}$ will be used to denote the maximum link index or the maximum number of time slots within a frame. In the case of this example, $N_{frame}=6$.

Figure 3:
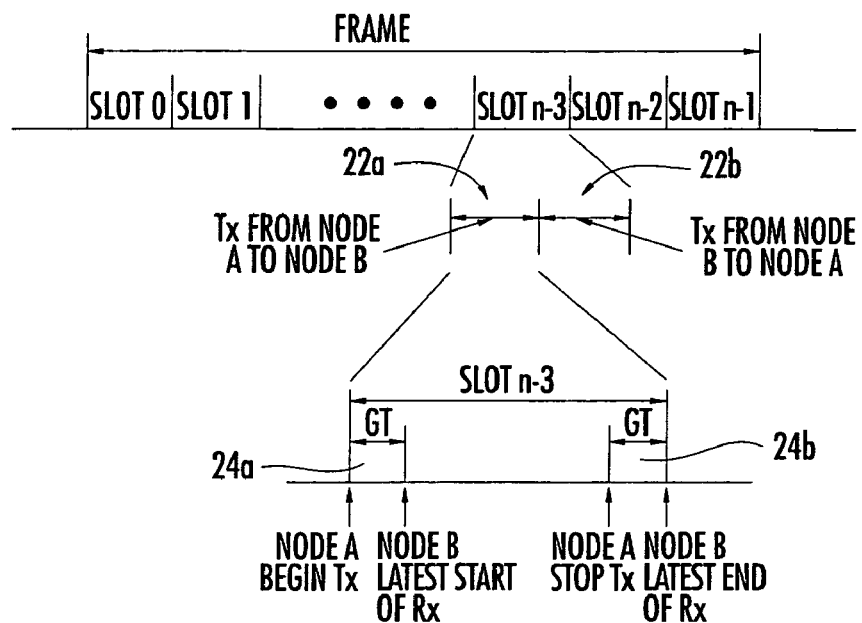
FIG. 3 is a diagram illustrating a frame of time slots in accordance with the present invention.
Figure 4:
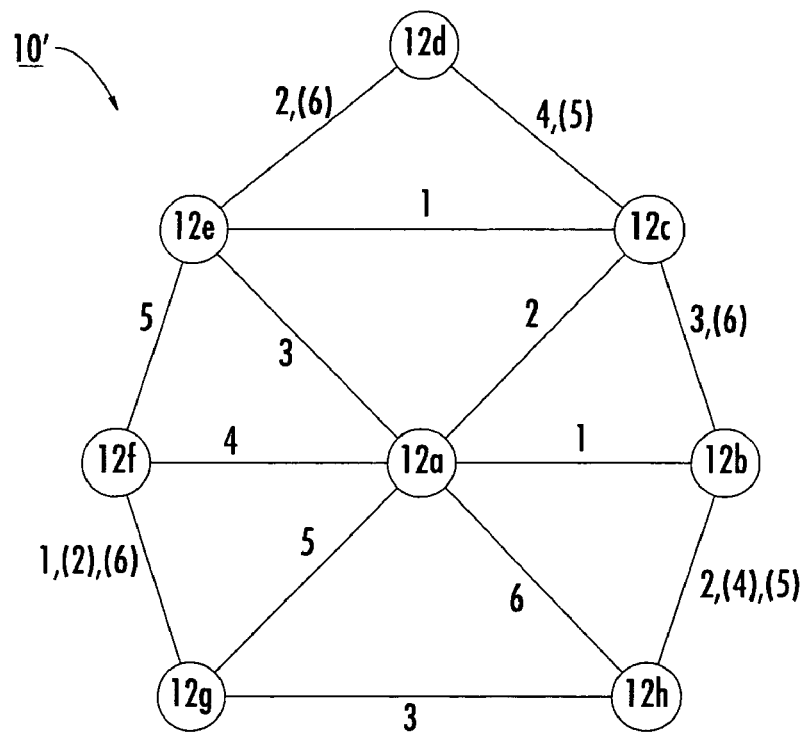
FIG. 4 illustrates the scheduling of available time slots to the network diagram illustrated in FIG. 2 in accordance with the present invention.

FIG. 3 illustrates a representative frame of time slots. In the simplest formulation, each epoch or frame has n slots and the value of n is set to $N_{frame}$. In the figure we also show how a time slot is used for the link connecting to nodes labeled as nodes A and B. Each time slot is divided into two mini-slots 22a, 22b. The first mini-slot 22a (e.g., half of the time slot) is used for transmissions from node A to B. Then the direction of the link is reversed and the second mini-slot 22b is used for transmissions from node B to A.

During the transmission periods, multiple packets can be transmitted. As indicated, each mini-slot 22a, 22b also contains a guard time 24a, 24b selected according to the following considerations. The maximum range between any pair of nodes determines the maximum propagation delay that must be accommodated. A maximum range of 100 miles corresponds to about 0.5 ms of propagation delay. A guard time is allocated for each mini-slot 22a, 22b to accommodate uncertainty of propagation delay and unequal propagation delays between all pairs of nodes.

At a maximum range of 100 miles, a guard time of 0.5 ms is needed. The guard time allocation for a maximum range of 100 miles implies the need to make the mini-slots 22a, 22b on the order of 2 to 4 ms to minimize the channel efficiency loss. As an example, if we assume a 50 Mb/s data rate on the communication links and a maximum range of 100 miles, then a 4 ms mini-slot implies 200,000 bits/mini-slot (250 mini-slots per second). Then the mini-slot would contain a 25,000 bit guard time and 175,000 bits of mission data.

The controller 18 may also bias each established link to assign priority when the available time slots are scheduled. As will be discussed in greater detail below, semi-permanent (SP) time slots and available or demand assigned (DA) time slots are provided within each frame. A stated objective is to increase reuse of time slots among several nodes at the same time. While the mobile network 10 in FIG. 1 is limited in the total number of nodes and communication links, there are a number of cases of parallel usage of time slots. For example, time slots 1 and 2 are simultaneously each used on 3 different communication links, and time slot 6 is used on only one link. All the other time slots are assigned to two communication links. We can define a reuse factor which indicates the average level of reuse as a ratio of the total number of time slot assignments in the network ($N_{frame}$) to the number of assigned time slots (Num_Slots_Assigned):

$$R = \frac{\text{Num\_Slots\_Assigned}}{N_{frame}} \quad (1)$$

For the example network 10 in FIG. 1, the reuse approach provides a reuse factor of R=14/6=2.333, indicating that on the average there are slightly more than two simultaneous users of each time slot in the network schedule. It is obvious that the reuse factor calculated for any specific scheduling algorithm will be highly dependent on the network size and topology. A full comparative evaluation should consider a variety of network sizes and topologies.

A lower bound on the value of $N_{frame}$ for any graph can be determined by noting that each node requires at least as many time slots as the node has neighbors, i.e., the node requires a number of time slots at least equal to its degree. Then $N_{frame}$ must be at least as great as the maximum node degree over the entire graph. Thus, denoting the degree of node i by $d_i$ the lower bound on $N_{frame}$ is $$N_{frame} \geq \max_i \{d_i\} \quad (2)$$

For the example network 10 illustrated in FIG. 2 the reuse portion is assigned the scheduling with $N_{frame}$ equal to the minimum number of time slots that must be used according to equation (2). Note that several nodes, namely all nodes but node 1, are assigned less than the full set of time slot. Thus, an enhanced scheduling algorithm may be able to assign additional slots to some of the links without introducing conflicts in scheduling.

The following discussion focuses primarily on the scheduling of time slots for generating the link schedules. Other parts of the overall phased array network problem that ultimately must be addressed include: 1) node and neighbor discovery, 2) net entry, 3) overhead channel format and protocol including protocol exchanges for scheduling updates, and 4) tracking and location of neighbor nodes (may include assistance of phased array antenna 16), and 5) a routing algorithm for a dynamic network topology.

The approach for scheduling time slots according to the present invention is based upon the following principles. First, a specified number of time slots are allocated as semi-permanent (SP) time slots scheduled for a given link. The rest of the available time slots (DA) may be allocated on a demand-assigned basis to those nodes/links that need them most. This allows flexibility in shifting the schedule on an as needed basis. Secondly, as discussed above, a limit on the maximum number of semi-permanently assigned time slots is established. This limit is a parameter that is selected based upon a specific network. This limit is also the upper limit on the number of allowable neighbor nodes, with a single SP time slot per node.

Third, as also discussed above, a limit on the maximum number of time slots per frame is established. This limit is a parameter that is also selected based upon a specific network. This limit is important for establishing a limit on latency since it determines the maximum revisit time for a link transmit opportunity.

Fourth, the relationship between the number of total time slots per frame, $N_{frame}$, and the limit on the maximum number of semi-permanently assigned time slots per frame is chosen so that the scheduling of the semi-permanently assigned time slots is greatly simplified and scheduling conflicts may be significantly avoided even with distributed scheduling.

By limiting the maximum number of semi-permanently assigned time slots per node to a certain fraction to the total number of time slots per frame, the process of distributively assigning semi-permanently assigned time slots is greatly simplified. The upper limit on the number of the semi-permanently assigned time slots (and, therefore, the maximum number of allowable neighbor nodes) will be denoted by N. We will consider values of $N_{frame}$ such that:

$$N_{frame} \geq 2N-1 \qquad (3)$$

Assume that all nodes 12a–12h in the network 10 are connected by directional links, where each node has a single beam phased array antenna 16 with beam sharing by time hopping and pointing to its neighbor nodes. Further, assume that the number of neighbors is equal to N, and the limit on the allowable number of semi-permanent time slots (with one SP time slot allocated per neighbor) is fixed.

If the fixed value of $N_{frame}$ satisfies equation (3), then all nodes can select a different semi-permanent time slot for each of these links by mutual agreement with the neighbor for that link without regard to what links other nodes are selecting more than one-hop away. This allows each node to select its semi-permanent time slot for the link to a neighbor node in a very direct fashion by communicating only with that neighbor node. This process can be followed for up to N neighbor nodes.

The key is recognizing that as the value of $N_{frame}$ increases for a fixed value of N, there are fewer constraints on the ability of a node to select a time slot that does not conflict with a neighbor's choice of a time slot. A node selecting a time slot for a new link must select a time slot that it is not currently being used and that the neighbor is not currently using.

If a node currently has m neighbors with a single time slot assigned to each of these links to the neighbors and is adding a link to a new neighbor node, then the neighbor node can be using at most (N−1) time slots. Thus, if $N_{frame}$ is greater than (m+N−1), then there will be at least one more time slot available that the node can assign to the new link. The worst case in this assignment process is when the node already has (N−1) neighbors and is assigning the time slot for the $N^{th}$ neighbor node. In this case $N_{frame}$ must satisfy equation (3) for an additional time slot to be guaranteed to be available for assignment to the link to the $N^{th}$ neighbor.

Some additional observations will be made about how this property can be exploited in the disclosed time slot scheduling approach. First, a node need only coordinate the selection of the semi-permanent time slot to be assigned for a directional link to a neighbor with that neighbor. The node requesting the link might, for example, send to the neighbor the list of suggested time slots for the link. This is based upon those time slots not being used for SP assignments. There could be some ordering of this list based upon other factors to be discussed below, but this is not necessary. The neighbor node can then select from this list the time slot it prefers and return a reply with this selection. This allows us to define a straightforward, fully distributed algorithm for scheduling the semi-permanent time slots.

If a node has less than N neighbors, then more than one of its N allowed semi-permanent time slots could be assigned on individual links. However, in this case there is no guarantee that all N assignments can be made via neighbor-to-neighbor node coordination without some conflicts. For example, if N=6 and a node had only 3 neighbors but each of these neighbors each had 6 neighbors, then the node would be able to assign only one time slot to each of the links with its 3 neighbors. In order to simplify our algorithm, we will not allow scheduling of more than one SP time slot per link. However, all unused time slots may be allocated as available time slots.

For certain networks with very large numbers of nodes where the number of potential neighbors will be much larger than the limit N, there will also be a topology control problem to deal with. The node will be faced with choosing, from among the potential neighbors, those neighbors that create the optimum network topology. This topology control problem also is related to the concept of optimizing an energy efficient network. In the case where the number of potential neighbors is much larger than the limit N, a topology control function can be used to select the neighbor node to connect to.

If we assign to $N_{frame}$ the minimum value allowed by (3), then each node will be allowed to have a maximum of N semi-permanent time slots and a total of (2N−1) time slot assignments. The demand assigned time slots will be assigned on a basis to best accommodate the traffic load. Of course, assigning a much larger value of $N_{frame}$ is also an option. In this case, there will be many more time slots available for demand assignment. There may be applications for which this is a desirable way to configure the network.

As with the semi-permanent time slots, the node need only coordinate the selection of the available time slots to be assigned for a directional link to a neighbor with that neighbor. This means that a neighbor will send a request to the neighbor for the time slot assignment over the directional link, and receive either a grant of the assignment or a denial of the request over the same link.

A node requesting the allocation of an available time slot DA from a neighbor node will do so based upon a perceived need for additional capacity on that link. This may be prompted by a high link utilization (queue buildup) based on short and long term measurements. The request will contain the number of slots requested and a metric, which indicates the priority to be attached to the request. The metric might indicate the queue length as a measure of the need for the time slot allocation.

The node receiving the request may also receive requests from other neighbor nodes, which may contend for allocation of the same time slot. In order to simplify the protocol, a node must complete processing one thread of an available time slot DA allocation before considering the next allocation. These allocations may not persist for a long period of time because they are constantly subject to preemption to become re-allocated as semi-permanent time slots as a result of topology changes or subject to re-allocation due to shifting traffic demand.

Neighbor and link discovery will now be discussed. The distributed link scheduling algorithm requires support from an omni-directional overhead channel for certain protocol exchanges that must occur with a potential neighbor node prior to the establishment of the directional link with that node. Such messages include the REQ_SPTS which requests the allocation of a semi-permanent time slot on the directional link to that node.

In addition to supporting protocol message exchanges which directly support the protocol defined herein, the omni-directional overhead channel must support the function of neighbor and link discovery. This is usually done through periodic omni transmissions by each node via an omni-directional antenna 20 that alerts any other node that move within range that the two nodes can be neighbor nodes. Several ad hoc routing protocols (including OLSR) have defined such a supporting protocol. These previously defined protocols could be adapted to support this distributed link scheduling algorithm. The primary function that must be performed by such a protocol is to discover new potential neighbor nodes and to report these to the topology control function.

One approach for node and link discovery includes each node periodically transmitting beacon messages over the control channel to notify neighbor nodes of its presence and its position. In addition, link state messages are transmitted periodically to notify neighbor nodes of the identity of its beacon neighbors (BN list) and its PA neighbor nodes (PAN list) and the time slots assigned to these nodes.

The link discovery portion of the algorithm continually compares the bi-directional beacon neighbors (BBN) list with the PAN list to see if there are any nodes on the BBN list that are not on the PAN list. Any such neighbor node becomes a candidate for link testing to determine if a PA link is possible. According to this approach, after an exchange of control messages the directional link is tested to determine if reliable communication is possible. If communication is reliable, the new neighbor node is added to the PAN list.

This validates communication in the testing time slot, but not necessarily in the time slot that may be assigned to the link on a semi-permanent basis. One approach is to do it this way or another approach is to wait until an SP time slot is assigned and test it in this time slot.

The topology control function can be a very straightforward function if it does not have to do topology optimization. The purpose of this function is to take the list of nodes in the PAN list, the information about the reliability of these links, and the information about the network topology, and use this information to determine which nodes on the PAN list should become PA neighbors. This is the function that should optimize the network topology if there are constraints such as the number of PA neighbors that do not allow all nodes in the PAN list to become PA neighbors.

With the proposed constraints of a fixed value for $N_{frame}$ and a fixed value for N (the maximum number of semi-permanent time slots per node), the potential exists for having some concern about network topology utilization. This would certainly be the case if these values were selected to be very small numbers. For example, if N=3 were selected with $N_{frame}$=5, it may be difficult to expect a well connected network topology when we could have no more than 3 neighbors for any node, unless an intelligent topology control function carefully utilized the topology prior to adding new PA neighbor nodes. This may be particularly so for a large network.

Thus, the topology control function should create a neighbor priority (NP) list, which is the PAN list ordered in order of desirability as potential PA neighbors. This list will direct the priority order in which potential PA neighbors are scheduled time slots. However, our initial problem is that of a small network with perhaps 15 nodes. In this case, we could specify N to have a value in the range of 5 to 8 and still have low latency. There is very little likelihood that there will be any topology utilization issues since allowing for 5 to 8 neighbor nodes will allow almost all possible neighbors to be PA neighbors.

A second purpose of the topology control function is to generate the topology change event that causes the link scheduler process to change state and perform the re-allocation process for the SP time slots.

A top-level scheduling algorithm structure will now be discussed. The scheduling process was formulated with the objective of minimizing the complexity of the process while taking advantage of the overall approach outlined above. A key to controlling this scheduling is maintaining an accurate data structure at each node reflecting the state of time slot schedules for future time slots assigned to the link with each neighbor node.

Two data structures are proposed: a slot assignment DB and a link message DB. The possible states of links in the data structure for a given time slot in the epoch are listed in TABLE 1. The table describes each possible state and gives the notation for that state. TABLE 2 shows an example slot assignment DA and the contents indicating the timeslots for $N_{frame}$=9 (N=5), the state assignments for each state, and example assigned neighbor IDs for each time slot.

In this example, 4 neighbors have been assigned SP time slots so one additional neighbor may be connected with these constraints. There is one free time slot which may be allocated as a DB time slot or offered with the DB time slots to be allocated as an SP time slot if a new neighbor node is possible. The use of the link message DB will be discussed later in the detailed protocol explanation. The example also indicates the use of sub-slots, e.g., 2 sub-slots per slot.

This is a concept to be used with the DA allocations to allow finer granularity. The meaning in this case would be that an allocation of time slot k, sub-slot 1 would be an allocation to a link of time slot k on the odd numbered frames. Conversely, sub-slot 2 would indicate an allocation of the time slot on the even numbered frames.

TABLE 1

| Time Slot State in DB | Notation |
| --- | --- |
| Free | Free |
| SP Allocated Time Slot | SP_Alloc |
| DA Allocated Time Slot (May Be Preempted by SP Allocation Process or by DA Re-allocation) | DA_Alloc |
| SP Allocation Request Message Sent | SP_Req |
| SP Allocation Reply Message Sent | SP_Reply |
| DA Allocation Request Message Sent (May Be Preempted by SP Allocation Process or by DA Re-allocation) | DA_Req |
| DA Allocation Reply Message Sent (May Be Preempted by SP Allocation Process or by DA Re-allocation) | DA_Reply |

TABLE 2

| Time Slot | Subslot | State | Assigned Neighbor ID |
| --- | --- | --- | --- |
| 1 | — | Free | — |
| 2 | — | SP_Alloc | 3 |
| 3 | — | SP_Req | 4 |
| 4 | 1 | DA_Alloc | 3 |
| 4 | 2 | DA_Alloc | 4 |
| 5 | 1 | DA_Alloc | 5 |
| 5 | 2 | DA_Alloc | 3 |
| 6 | — | SP_Alloc | 5 |
| 7 | 1, 2 | DA_Alloc | 8 |
| 8 | 2 | DA_Alloc | 4 |
| 9 | — | SP_Alloc | 8 |

Figure 5:
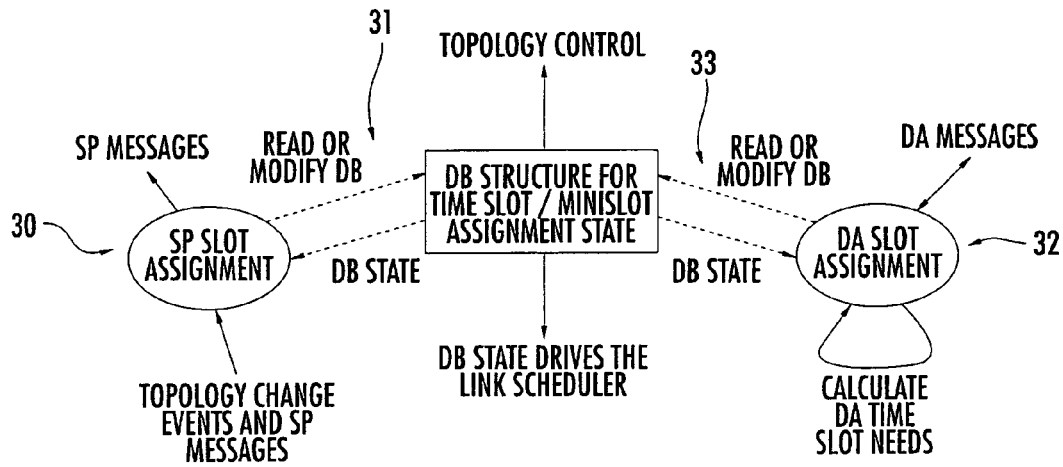
FIG. 5 is a top-level state diagram for the scheduling of semi-permanent time slots and available time slots in accordance with the present invention.

The top-level state diagram for the link scheduling protocol is shown in FIG. 5. The diagram shows two independent processes 30 and 32 that are responsible for maintaining and modifying the time slot allocation database. On the left side is the state diagram for the process for maintaining and assigning semi-permanent (SP) time slots, i.e., process 30. This process has priority over the assignments made by the process 32 on the right, which has responsibility for assigning the available (DA) time slots. Within process path 31, the time slots that can be seized are as follows: free, DA allocated, and in process of being DA allocated. Similarly, within process path 33, the time slots that can be seized are as follows: free, DA allocated and also need to be re-allocated.

This database must be controlled as a locked database such that for any given time slot assignment state, only one of the two scheduling processes may modify that state at a given point in time. Once one of the processes begins to modify the state of a particular time slot assignment, the state is locked and the other process may not modify it until it is released.

At any time each time slot in the DB is in one of seven states as indicated in TABLE 1. Available time slots are said to be in the free state, i.e., they are not assigned to a link to one of its neighbor nodes either because a scheduling conflict has prevented assignment or because the time slot has recently become free and has not yet been scheduled.

As indicated, a time slot in the free state may be scheduled either as an SP time slot or a DA time slot. A time slot that has been allocated as SP assigned may be modified only by the process that maintains SP time slots. The time slot may be de-allocated by this process if network topology changes or if a more desirable topology is possible. Until such a time slot is returned to the free state, the process for maintaining and assigning the DA time slots cannot modify its state.

In addition, any time slot with a DB state indicating that it is in the process of being SP assigned cannot be allocated by the DA assignment process. This includes states indicating that SP request and reply messages have been sent. However, if the state of a time slot is DA allocated, then it may be re-allocated by the DA assignment process. This might be done if the loading on the network indicated that a re-allocation of the DA time slot is needed.

In contrast, the process allocating SP time slots has priority. In addition to assigning free slots, it may seize and reassign all time slots that have been DA assigned or are in the process of being DA assigned. This is done to provide a straightforward process of ensuring at least a single SP time slot assigned to each neighbor node during a frame of $N_{frame}$ time slots. SP allocated time slots are returned to the free state only if the link is lost or if the topology control function determines that a particular link should no longer be in the list of the top N links to be established with neighbor nodes.

FIG. 5 illustrates how this process works at the top level. The SP slot assignment process has greater flexibility in allocating time slots. It can seize more time slots for allocation than the DA process, and it can seize time slots that either have been DA allocated or are in the process of being DA allocated. The SP process may receive various events for processing including topology change events from the topology control function and protocol messages.

Such events might include loss of link to a neighbor, discovery of a new neighbor, reception of an SP allocation request message from a neighbor node, and the discovery that a topology change should occur to either add a link to a neighbor, break a link, or do both. The topology change event notification will carry data that will describe the topology change that needs to occur.

If the event described a loss of a link, then the only action that must be taken is to change the appropriate time slot state in the slot assignment DB to "free." If a link is to be added the process is more complex. In this case, the SP slot assignment process initiates protocol message exchanges with the new neighbor node and modifies the slot assignment DB. This ultimately results in the agreement between the two nodes on a time slot assignment for the SP slot assigned to this link. Only a single SP time slot is to be assigned to each link with a neighbor to simplify the protocol. Additional details of this protocol are described below.

The process of assigning DA time slots follows a similar procedure. The DA slot assignment process must calculate the DA time slot needs and compare them with the allocated time slots to determine if a new time slot re-allocation is needed. If a reassignment of DA slots is initiated, it will also lead to a series of protocol message exchanges with neighbor nodes to agree on the reassigned time slots. The DA slot assignment process may reassign only time slots that are in the free state or not SP assigned. More about the protocol details and the process for determining when DA time slot reassignment is needed will be discussed below.

Allocating semi-permanent time slots to directional links will now be discussed. In the description of the approach for allocating N semi-permanent time slots assume that N is fixed and intelligently chosen with respect to the network size and environment. Also assume that $N_{frame}=2N-1$. $N_{frame}$ could also be set at any value higher than this to provide additional on-demand time slots if that is deemed to be useful for the particular network and traffic environment.

Several important functions are provided by the topology control function. The neighbor priority (NP) list is generated by the topology control function and is used to indicate the preferred PA neighbor nodes for the assignment of time slots.

If the length of the NP list is N or smaller, then the topology control function will generate topology change events to the SP slot assignment process to make it attempt to get time slot assignments to all of these neighbor nodes. If the length of the NP list is greater than N, then it will generate topology change events to the SP slot assignment process to obtain time slot assignments to each of the N highest priority nodes on the NP list.

The NP list is constantly changing due to network dynamics. When PA links go down, the node is removed from the NP list and the time slot(s) for that link are then subject to re-allocation. This is initiated by the topology control function which sends the SP slot assignment process a link delete event. Thus, the SP time slot and any DA time slots allocated to that link become available for re-allocation to another node on the PA list.

The first choice when slots become available is to allocate the slot(s) to additional PA neighbor nodes if that is possible given the current state of the NP list. If no additional neighbor nodes can be added, then the slot(s) can be re-allocated on a DA basis.

Figure 6:
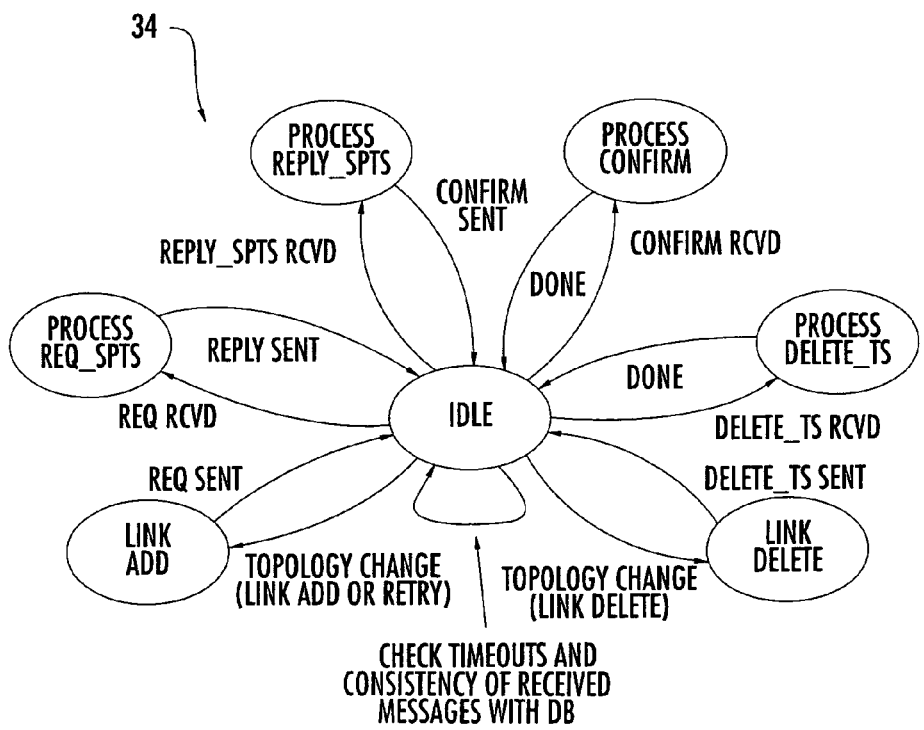
FIG. 6 is a diagram illustrating a semi-permanent time slot scheduling process in accordance with the present invention.

FIG. 6 shows a state diagram of the SP slot assignment process. In order to manage the protocol message processing, a link scheduling message DB is created as shown in TABLE 3. This maintains the state needed from prior protocol exchanges to be used when the next SP message arrives for processing. The idle process does event management in that it checks received events prior to allowing a state change to one of the other states.

These operations include checking received messages to determine if they are consistent with the current state of the DB. If a message is inconsistent with the DB, it is discarded. Certain timeouts may indicate that DB state needs to be reset. This process performs this function.

TABLE 3

| Nbr_ID | Link State | Time out | Time Slot List | Selected Time Slot | Selected Subslot | Num_tries |
|---|---|---|---|---|---|---|
| 1 | SP_Alloc | — | — | 2 | 1 | — |
| 1 | SP_Alloc | — | — | 2 | 2 | — |
| 1 | DA_Alloc | — | — | 5 | 1 | — |
| 2 | SP_Alloc | — | — | 4 | 1 | — |
| 2 | SP_Alloc | — | — | 4 | 2 | — |
| 2 | DA_Alloc | — | — | 5 | 2 | — |
| 3 | SP_Req | T2 | Ls | — | — | 1 |
| 4 | SP_Alloc | — | — | 6 | 1 | — |
| 4 | SP_Alloc | — | — | 6 | 2 | — |

There are four basic message types required in the SP time slot assignment protocol as listed below in Table 4. The use of these are self-explanatory and consistent with the prior discussion.

TABLE 4

| Message Type | Message Function |
|---|---|
| REQ_SPTS | Request New SP Slot Allocation |
| REPLY_SPTS | Reply to Received REQ_SPTS |
| CONFIRM | Response to Received REPLY_SPTS |
| DELETE_TS | Message Indicating Deleted Time Slot Allocation |

Figure 7:
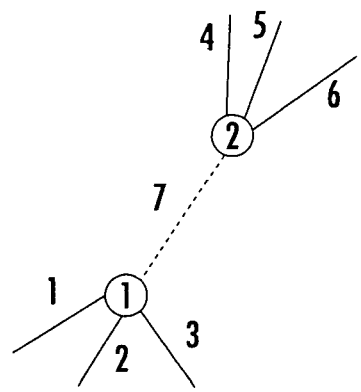
FIG. 7 is a diagram illustrating a semi-permanent time slot being scheduled for a new communication link in accordance with the present invention.

An example of SP time slot assignment is shown in FIG. 7. Nodes 1 and 2 both have 3 neighbors with the SP time slots allocations shown for each link. Therefore, they can add an additional link between themselves. The link scheduling protocol will find an acceptable time slot for the SP allocation. The corresponding protocol message exchange is shown in TABLE 5.

Node 1 initiates the exchange by sending a REQ_SPTS (L=(4,5,6,7)) with a list of at least N candidate time slots. This list may include all free and DA time slots. Node 1 is using slots 1, 2 and 3 for SP allocations to its neighbors so its list L contains the other time slots 4, 5, 6 and 7. When the request message is sent, the appropriate changes are made to the time slot and link scheduling message data structures. Node 2 is using time slots 4, 5 and 6 as SP allocations for its links to its 3 neighbors so it selects time slot 7 as the only one that will work for the new link. It sends this choice in the reply message.

When a reply message is sent, the appropriate changes are also made to the time slot and link scheduling message data structures. Finally, when a confirm is sent or received, the state of the appropriate time slots are changed to "SP allocated to link (1,2)."

Note also that if nodes 1 and 2 had already selected 4 neighbor nodes, it would still be possible for them to find common time slots with which to establish a link between them if they used the same time slots with at least two of their neighbors.

TABLE 5

| Node 1 | Node 2 |
|---|---|
| Receives Link Add Event From Its Topology Control For A Link From Node 1 to Node 2 | |
| Send REQ_SPTS(L=(4, 5, 6, 7)) | → Msg Lost |

TABLE 5-continued

| Node 1 | Node 2 |
|---|---|
| Timeout and retry | |
| Resend REQ_SPTS(L=(4, 5, 6, 7)) | → Rcvd REQ_SPTS(L=(4, 5, 6, 17)) |
| Rcvd REPLY_SPTS(Slot 7) | ← Send REPLY_SPTS(Slot 7) |
| Send CONFIRM(Slot 7) Slot 7 Allocated to Link (1,2) | → Rcvd CONFIRM(Slot 7) Slot 7 Allocated to Link (1, 2) |

Some initial pseudocode describing the processes required in FIG. 6 has been developed. There are various events that may occur which must be processed by the SP slot assignment process 34. Event management is done in the idle process as shown in TABLE 6. Four categories of events are shown: received message, check timeouts, link addition notification from topology control, and link failure or link deletion.

Received messages are first checked versus the link scheduling message DB to insure that the message is consistent with the current state of the DB. For example, if we sent a request to a neighbor, the next message expected is a reply. To simplify this distributed protocol, only one thread of SP protocol message exchanges is allowed at a time. This is enforced in the procedure by checking the DB to see if other SP message exchanges are ongoing prior to initiating a link add transition or prior to processing a REQ_SPTS message.

If a link addition cannot be initiated because another SP protocol thread is currently in process, the link addition will be postponed by backing off and rescheduling for a later time when the other process is expected to be completed. Allowing multiple attempts is done to handle potential conflict between several nodes attempting to add links simultaneously. This is not meant to deal with the problem of an unreliable RF link. This latter issue should be addressed by using a link protocol on the overhead channel that uses ARQ and retransmission to recover lost/errored messages.

Thus, the distributed scheduling protocol can assume that messages will not get lost. This allows simplification of the protocol. When topology control selects a neighbor node from the NP list to connect to as a new neighbor, it issues a topology change (link addition) event which (after consistency checks in the idle process) causes a transition to the link add state in the SP slot assignment process.

TABLE 6

Procedure for Idle State (SP Event Management)

Case Event Type
    Received Message:
        If received message is not consistent with the
state of the Link Scheduling Message
        DB for that Nbr_ID
            Discard Message
        Elseif message type = REQ_SPTS
            If no pending SP message activity in the Link
            Scheduling Message DB for link additions    other
than receiving a previous REQ_SPTS    message from
Nbr_ID TABLE 6-continued Procedure for Idle State (SP Event Management)

```
            Transition to Process REQ SPTS state to
process message
        Else
                Reject new link and send negative
REPLY_SPTS message to Nbr_ID
        End
        Elseif message type = REPLY_SPTS
            Transition to Process REPLY_SPTS state to
process message
        Elseif message type = CONFIRM
            Transition to Process CONFIRM state to
process message
        Elseif message type = DELETE_TS
            Transition to Process DELETE_TS state to
process message
        End
    Check Timeouts:
        Check all timeouts
        If Timeout expired for a link in the SP_Req state
            Transition to Link Add State
        If Timeout expired for a link in the SP_Reply
state
            Reset Slot Assignment DB for time slot Ns and
in the Link Message state in
                Link Scheduling Message DB for index Nbr_ID
        End
    Link Addition Notification from Topology Control:
        If no pending SP message activity in the Link
Scheduling Message DB
            Transition to Link Add state to add Nbr_ID
        Else
            Backoff and reschedule Link Addition
        End
    Link Failure or Link Deletion:
        Transition to Link Delete state to delete link to
Nbr_ID
        End
End
```

Psuedocode for the link add process is shown in TABLE 7. This starts a process which requires coordination of the SP time slot assignment and protocol message exchanges between only the two neighbor nodes. The node requesting the link sends a REQ_SPTS message to the candidate neighbor node with the list of acceptable time slots for the link.

The list of candidate time slots must contain at least N time slots including at least one semi-permanent time slot SP. The list can also include possibly all of the N−1 available DA time slots. The available or on-demand time slots may be currently temporarily allocated for on-demand traffic. This list will be priority-ordered to indicate the time slot preference that causes the least perturbation in the current available time slot assignments. In other words, the notation being used is that a time slot is not an SP time slot unless already allocated to a communication link. Any of the 2N−1 time slots may be an SP time slot. Thus, the list of N time slots sent are all either free time slots or an available DA time slot. These may be N−1 SP time slots but they are already allocated and are not on the list.

The REQ_SPTS message can be sent up to MAX_TRIES times to allow for unreliable links and conflicts with other assignments potentially occurring simultaneously. The timeout in the link scheduling message DB triggers the retries if there is no REPLY_SPTS message from the neighbor node in response to the REQ_SPTS message. Once the REQ_SPTS message is sent the process returns to the idle state where other events can be processed.

TABLE 7

Procedure for Link Addition to Node Nbr_ID (Generate REQ_SPTS Message)

```
If Num_tries = MAX_TRIES (No more tries)
    Reset state of Link Scheduling Message DB for index
Nbr_ID (Link State = Free and no timeout for retry)
    Return to Idle state
Else
    If initial try to node Nbr_ID
        Set Num_tries = 1 in Link Scheduling Message DB
for index Nbr_ID
    Else
        Set Num_tries = Num_tries +1 in Link Scheduling
Message DB for index Nbr_ID
    End
    Construct list Ls of time slots to offer to Nbr_ID
    Append list Ls to REQ_SPTS message and send to Nbr_ID
    Setup timeout and Link Message state in Link Scheduling
Message DB for index
        Nbr_ID and in Slot Assignment DB
    Return to Idle state
End
```

The neighbor receiving a REQ_SPTS message will have its SP slot assignment process transition to the process REQ_SPTS state. The procedure for processing this message is shown in TABLE 8. This procedure takes the offered list of time slots, Ls, and selects its preferred time slot, Ns.

If the number of links to neighbor nodes, Num_links, is less than the limit N, the procedure selects the time slot it prefers from this list. Then a REPLY_SPTS reply message with this selection is sent. If the link cannot be accepted or if there is another ongoing SP slot assignment in process, a negative REPLY_SPTS reply message is sent.

The selected time slot will be selected from one of its N available time slots or one of its free time slots. An available time slot is either a "free" time slot or an available DA time slot. There will be at least N of these if we can add another link. Each node always manages its time slots so that there are N time slots available to assign as semi-permanent time slots (one to each of N neighbor nodes if that many neighbor nodes are available). If it accepts the link, then it will have at most N−1 other neighbor nodes with one semi-permanent time slot allocated per node. The procedure also makes the appropriate modifications to the state in the link scheduling message DB and the slot assignment DB.

TABLE 8

Procedure for Processing REQ_SPTS Message (from Nbr_ID)

```
If Num_links<N
    Examine list Ls of the available time slots received
from potential neighbor node
        Nbr_ID, compare with the current allocations in
the Slot Assignment DB, and select the best
assignment = Ns
    Make appropriate modification to the Slot Assignment DB
    (mark it as SP_Reply) for time slot Ns
    If time slot Ns was DA allocated
        Send DELETE_TS to the neighbor node allocated the
DA time slot
    End
    Append time slot choice, Ns, to REPLY_SPTS message and
send to Nbr_ID
    Setup timeout and Link Message state (to SP_Reply with
time slot Ns) in Link
        Scheduling Message DB for index Nbr_ID
    Return to Idle state
```

TABLE 8-continued

Procedure for Processing REQ_SPTS Message (from Nbr_ID)

```
Else
    Reject new link and send negative REPLY_SPTS message to
Nbr_ID
    Return to Idle state
End
```

A received REPLY_SPTS message is processed as shown in TABLE 9. The choice of time slot, Ns, received from the neighbor node is extracted from the message. We will also require the node to confirm this reply with either a positive or negative CONFIRM message that indicates that it will agree to use the allocated time slot. This three-way handshake eliminates uncertainty in the outcome of the scheduling process.

If the REPLY_SPTS message is a positive reply, then the choice of time slot, Ns, is examined to see if it is still an allowable assignment for a new SP time slot for the new link. If it is allowable, then the appropriate modifications to the state in the slot assignment and link scheduling message databases are made. Then a positive CONFIRM message is returned.

If the received REPLY_SPTS message was negative, then the slot assignment and link scheduling message databases are reset for this Nbr_ID. Otherwise, if the choice of Ns is no longer allowable, then the link scheduling message database is reset for this Nbr_ID. Then a negative CONFIRM message is sent to the neighbor node rejecting the link.

TABLE 9

Procedure for Processing REPLY_SPTS Message from Nbr_ID

```
Extract time slot choice Ns from the REPLY_SPTS message from
Nbr_ID
If (positive REPLY_SPTS message) and (choice of Ns is still
allowable from Slot Assignment DB)
    Make appropriate modification to the Slot Assignment DB
    (mark it as SP_Reply)
            for time slot Ns and in the Link Message state in
    Link Scheduling Message DB
            for index Nbr_ID
        If time slot Ns was DA allocated
            Send DELETE_TS to the neighbor node allocated the
    DA time slot
        End
    Create CONFIRM message for Ns and send to Nbr_ID
    Increment Num_links
    Return to Idle state
Elseif negative REPLY_SPTS message
    Reset Slot Assignment DB for time slot Ns and in the
Link Message state in
        Link Scheduling Message DB for index Nbr_ID
    Return to Idle state
Else
    Reset Link Message state in Link Scheduling Message DB
for index Nbr_ID
    Send negative CONFIRM message to Nbr_ID
    Return to Idle state
End
```

Table 10 shows the procedure for processing CONFIRM messages. If the CONFIRM is positive, the link is considered to be added to the set of neighbors. The number of links for the node, Num_links, is incremented. The assigned time slot, Ns, is marked SP_Alloc in the slot assignment DB, and the link message state in the link scheduling message DB is reset for index Nbr_ID. If the message was a negative CONFIRM, then the slot assignment and link scheduling message databases are reset for this Nbr_ID.

TABLE 10

Procedure for Processing CONFIRM Message from Nbr_ID

```
If positive CONFIRM message
    Make appropriate modification to the Slot Assignment DB
    (mark it as SP_Alloc)
            for time slot Ns
        Reset Link Message state in Link Scheduling Message DB
for index Nbr_ID
        Increment Num_links
        Return to Idle state
Else
    Reset the Slot Assignment DB (mark it as Free) for time
    slot Ns
    Reset Link Message state in Link Scheduling Message DB
for index Nbr_ID
    Return to Idle state
End
```

An allocated time slot may need to be de-allocated for one of several reasons. If during the course of normal operation a link goes down or becomes unreliable, then the topology control function gets involved to address the unreliable link problem. Ultimately, it may generate a topology change (e.g., link deletion) event directing the SP slot assignment process to delete all slots assigned to the link.

The steps involved in this procedure are shown in TABLE 11. The link is de-allocated by sending a DELETE_TS message from the node requesting the de-allocation of all the time slots which are shared with the other node. In addition, the appropriate entries in the link scheduling message DB and the slot assignment DB are reset.

TABLE 11

Procedure for Link Deletion to Node Nbr_ID (Generate DELETE_TS Message)

```
Extract list of all SP and DA time slots, Ls, from the Slot
Assignment DB assigned to the
    link to Nbr_ID
Construct message, DELETE_TS, with the list, Ls, and send to
Nbr_ID
Reset Link Scheduling Message DB for index Nbr_ID and Slot
Assignment DB for all time slots in Ls
Decrement Num_links
Return to Idle state
```

Table 12 shows the procedure for processing a received DELETE_TS message. The list of de-allocated time slots, Ls, is extracted from the message. Then the appropriate state in the slot assignment DB and in the link scheduling message DB is reset.

TABLE 12

Procedure for Processing DELETE_TS Message from Nbr_ID

```
Extract list of time slots, Ls, from the DELETE_TS message
from Nbr_ID
Reset the Slot Assignment DB (mark it as Free) for all time
slots in list Ls
Reset Link Message state in Link Scheduling Message DB for
all time slots in list Ls for index Nbr_ID
Decrement Num_links
Return to Idle state
```

In summary, the objective for the function allocating the semi-permanent time slots is to connect to as many neighbor nodes as possible up to N. If N neighbor nodes are obtained, then each is allocated a single semi-permanent time slot. Once a new link is established by this protocol, both nodes will commence operation in the newly allocated SP time slot.

This operation will test the new link to determine if reliable communication can be maintained using the allocated time slot. This insures that there is no unusual interference that occurs in this particular time slot. If the link is tested as unreliable, then the topology control function will be notified so that the time slot can be de-allocated and used for other purposes.

Allocation of available (on-demand) time slots will now be discussed. The available time slots are to be allocated in a manner that is responsive to the fluctuating demands of network traffic. Again, assume that N is fixed and intelligently chosen with respect to the network size and environment. Also assume that $N_{frame}=2N-1$.

To allow fine granularity in the allocation of available capacity, time slots will be divided into $m_s$ sub-time slots. Assume for the rest of the following discussion that $m_s=2$. This will be accomplished by defining a sub-time slot to be a specific time slot allocation that repeats every $m_s^{th}$ (or second) frame.

A request for available time slots from one node to a neighbor node is allowed only if at least one semi-permanent time slot is allocated for the link between these two nodes. After a link is allocated at least one semi-permanent time slot, then a node may request a periodic allocation of a single time slot every $m_s^{th}$ (or second) frame. The messages used for scheduling the available time slots can be sent over the PA link for scheduling time slots several frames in advance of when they are needed since the link has an allocation of at least one semi-permanent time slot per frame.

A key requirement for efficient allocation of available time slots is the measurement of the traffic requirements on each link. Two measures will be needed. First, the measured average traffic sent over link (i, k) (in units of the number of time slots per frame) will be denoted by $T_{ikse}$. This measure will include all traffic sent over one or more semi-permanent time slots per frame as well as any available time slots.

In addition, we also need to maintain a current measure of the queue state, $Q_{ik}$, for link (i, k). Larger values of $Q_{ik}$ indicate the need for an immediate allocation of one or more available time slots. Occasional bursts of demand may produce increases in $Q_{ik}$, which should then trigger a request for additional time slots of on-demand capacity until the queue size decreases.

The total number of time slots (quantized to ½ of a time slot with $m_s=2$) allocated on link (i, k) will be denoted by $N_{ik}^{tot}$. The time slot demand is defined as follows:

$$T_{ik}^{dem}=f(T_{ik}^{se},Q_{ik},\qquad(4)$$

which is a function of the measured traffic plus the estimated additional capacity needed that is indicated by the queue size. Then the number of time slots needed on this link, $T_{ik}^{need}$, is as follows:

$$T_{ik}^{need}=\max(T_{ik}^{dem},T_{ki}^{dem})\qquad(5)$$

The metric assigned to this link is as follows:

$$M_{ik}^{DA}=T_{ik}^{need}-N_{ik}^{tot}+B,\qquad(6)$$

which is a measure of the estimated number of additional time slots that should be allocated to this link through the DA slot allocation mechanism. B is a bias term that might be nominally set at about ¼ to ½ of a time slot to allocated enough excess capacity to each link to avoid significant queuing. While we are illustrating the approach using the metric defined in (4), a variety of other forms of metric could also be used as the basis for allocating the DA time slots.

Figure 8:
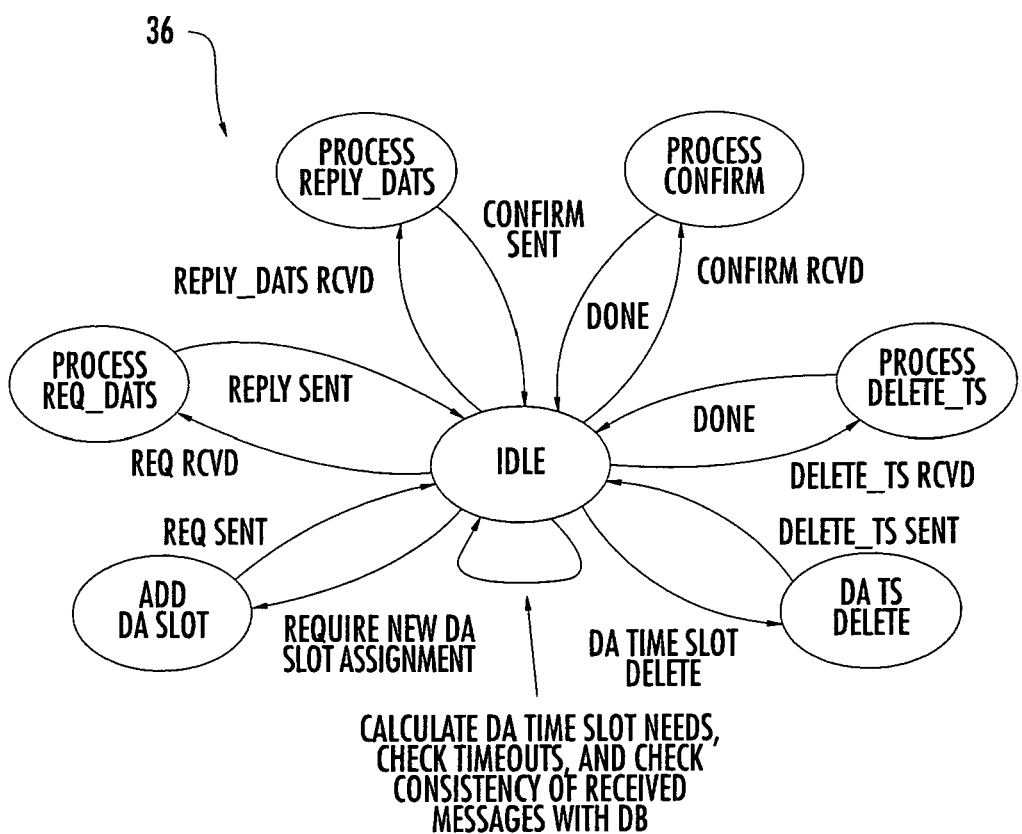
FIG. 8 is a diagram illustrating an available time slot scheduling process in accordance with the present invention.

FIG. 8 shows a state diagram of the DA slot assignment process 36. The state diagram and the protocol exchanges are similar to those of the SP slot assignment process. In order to simplify the protocol message processing, only a single thread of DA time slot allocation can be in process at any time. The idle process does event management in that it checks received events prior to allowing a state change to one of the other states.

These operations include the following. Check received messages to determine if they are consistent with the current state of the DB. If a message is inconsistent with the DB, it is discarded. Certain timeouts may indicate that DB state needs to be reset. This process performs this function. It also determines if the DA slot assignment is optimal given the traffic load needs of the node. It may cause a transition to the add DA slot state if it determines if a new DA time slot must be added to a particular link.

There are four basic message types required in the DA time slot assignment protocol as listed below in TABLE 13. These are very similar to those used in the SP slot allocation. The use of these is self-explanatory and consistent with the prior discussion of the SP slot allocation process.

TABLE 13

| Message Type | Message Function |
|---|---|
| REQ_DATS | Request New DA Slot Assignment |
| REPLY_DATS | Reply to Received REQ_DATS |
| CONFIRM | Response to Received REPLY_DATS |
| DELETE_TS | Message Indicating Deleted Time Slot Allocation |
| LINK_METRIC | Message Broadcast to Neighbor Nodes with Link Metric for Each Link to a Neighbor Node |

Figure 9:
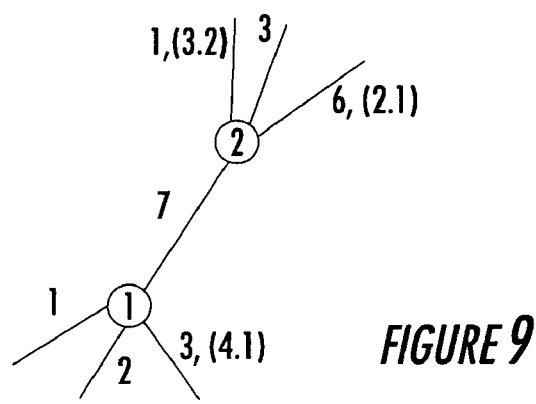
FIG. 9 is a diagram illustrating an available time slot being added to a communications link in accordance with the present invention.

An example of DA time slot assignment is shown in FIG. 9. Node 1 wants to add an additional DA time slot allocation for its link (1,2). The corresponding protocol message exchange is shown in TABLE 5. Node 1 initiates the exchange by sending a REQ_DATS (L=(4.2, 5,6)) indicating that it can support allocations of all of slots 5 and 6 and sub-slot 4.2. This list may include all free and DA time slots, the later of which are less needed.

When the request message is sent, the appropriate changes are made to the time slot and link scheduling message data structures. Node 2 is using time slots 1, 3 and 6 as SP allocations for its links to its 3 neighbors and sub-slots 2.1 and 3.2 as DA allocations. It can select either sub-slot 4.2 or both sub-slots of slot 5. It chooses and sends this choice in the reply message.

When a reply message is sent the appropriate changes are also made to the time slot and link scheduling message data structures. Finally, when a confirm is sent or received, the state of the appropriate time slots are changed to "sub-slot 4.2 DA allocated to link (1,2)."

TABLE 14

| Node 1 | Node 2 |
|---|---|
| Determines That The Link From Node 1 to Node 2 Requires An Additional DA Time Slot | |

TABLE 14-continued

| Node 1 | | Node 2 |
|---|---|---|
| Send REQ_DATS (L= (4.2, 5, 6) ) | → | Msg Lost |
| Timeout and retry Resend REQ_DATS (L= (4.2, 5, 6) ) | → | Rcvd REQ_DATS (L= (4.2, 5, 6) ) |
| Rcvd REPLY_DATS(Slot 4.2) | ← | Send REPLY_DATS(Slot 4.2) |
| Send CONFIRM (Slot 4.2) | → | Rcvd CONFIRM (Slot 4.2) |
| Slot 4.2 DA Allocated to Link (1,2) | | Slot 4.2 DA Allocated to Link (1,2) |

The following approach is used at each network node to allocate the (N−1) available time slots for directional links to neighbor nodes. Using these measures each node will continuously maintain the link metric, $M_{ik}^{DA}$ for each of its links allocated a semi-permanent time slot. Each node will use this link metric to indicate the need for additional transmission time slots to each neighbor node. The largest values of $M_{ik}^{DA}$ indicate the links with the greatest need for additional on-demand time slot allocation. A positive value of $M_{ik}^{DA}$ indicates the number of additional time slots required, and a negative value of indicates the number of time slots that can be surrendered for re-allocation.

As the metrics, $M_{ik}^{DA}$, are maintained, if the largest link metric indicates a need for an additional sub-slot allocation and if there are sub-slots available either as free slots or as excess DA allocation to other links (again indicated by a small metric), then the process transitions to the add DA slot state and the process of finding a DA sub-slot allocation is initiated.

As with the semi-permanent time slots, the node need only coordinate the selection of the DA time slot to be assigned for a directional link to a neighbor with that neighbor. This means that a neighbor will send a request to the neighbor for the time slot assignment over the directional link, and receive either a grant of the assignment or a denial of the request over the same link.

Some initial pseudocode describing the processes required in FIG. 8 has been developed. There are various events that may occur which must be processed by the DA slot assignment process. Event management is done in the idle process as shown in TABLE 6.

Four categories of events are shown: 1) received message, 2) check timeouts, 3) recalculation of link metrics, and 4) DA time slot needs and DA time slot deletion. Received messages are first checked versus the link scheduling message DB to insure that the message is consistent with the current state of the DB. For example, if we sent a request to a neighbor, the next message expected is a reply.

To simplify this distributed protocol, only one thread of DA protocol message exchanges is allowed at a time. This is enforced in the procedure by checking the DB to see if other DA message exchanges are ongoing prior to initiating an add DA slot transition or prior to processing a REQ_DATS message. If an addition slot cannot be initiated because another DA protocol thread is currently in process, the addition slot will not be done.

It can be naturally rescheduled on the next opportunity for recalculation of link metrics and DA time slot needs. Link metrics will be recalculated periodically according to a preset schedule. A link which has a link metric greater than a certain threshold, Max_metric_threshold, is a candidate for obtaining a new DA sub-lot.

The link with the maximum metric that exceeds this threshold will be selected as the next link to which a new DA sub-slot is allocated. When a new DA sub-slot needs to be allocated and if it satisfies the above conditions, then a transition to the add DA slot state occurs in the DA slot assignment process.

TABLE 15

Procedure for Idle State (DA Event Management)

Case Event Type
   Received Message:
     If received message is not consistent with the state of the Link Scheduling Message
       DB for that Nbr_ID
       Discard Message
     Elseif message type = REQ_DATS
       If no pending DA message activity in the Link Scheduling Message DB for link additions   other than receiving a previous REQ_DATS   message from Nbr_ID Transition to Process   REQ_DATS state to process message
       Else
         Reject new link and send negative REPLY_DATS message to Nbr_ID
       End
     Elseif message type = REPLY_DATS
       Transition to Process REPLY_DATS state to process message
     Elseif message type = CONFIRM
       Transition to Process CONFIRM state to process message
     Elseif message type = DELETE_TS
       Transition to Process DELETE_TS state to process message
     End
   Check Timeouts:
     Check all timeouts
     If Timeout expired for a link in the DA_Req state
       Transition to Add DA Slot state
     If Timeout expired for a link in the DA_Reply state
       Reset Slot Assignment DB for time slot Ns and in the Link Message state in
         Link Scheduling Message DB for index Nbr_ID
     End
   Recalculate Link Metrics and DA Time Slot Needs:
     Recalculate link metrics
     Send new link metrics to all neighbor nodes in a LINK_METRIC message
     Sort link metrics and select Largest_link_metric
     If (no pending DA message activity in the Link Scheduling Message DB) and
       (Largest_link_metric > Max_metric_threshold)
       Transition to Add DA Slot state to add new DA slot assignment to Nbr_ID
     End
   DA Time Slot Delete:
     Transition to DA TS Delete state to delete Time Slot to Nbr_ID
End Psuedocode for the additional DA slot process is shown in TABLE 16. This starts a process which requires coordination of the time slot assignment and protocol message exchanges between only the two neighbor nodes. The node requesting the link sends a REQ_DATS message to the candidate neighbor node with the list of acceptable time slots for the link.

The list of candidate time slots must contain all free sub-slots and all DA sub-slots with a metric below a certain threshold, Min_metric_threshold. The DA time slots may be currently temporarily allocated for other DA traffic. This list will be priority-ordered to indicate the sub-slot preference that causes the least perturbation in the current on-demand time slot assignments. The priority ordering will be first the free time slots followed by the sub-slots with the smallest metrics progressing up to the largest metric less than the Min_metric_threshold.

In order to simplify this distributed protocol, only one thread of DA protocol message exchanges is allowed at a time. This is enforced in the idle procedure. The REQ_DATS message is only sent once, but it could be unsuccessful if the neighbor node is currently processing another DA protocol exchange. In this case, the node will eventually receive a negative REPLY_DATS message. The attempt to add the DA slot may be made again in this case if this link has the largest metric the next time the link metrics are evaluated. Once the REQ_DATS message is sent the process returns to the idle state where other events can be processed.

TABLE 16

Procedure for Addition of a New DA Subslot to the Link to Node Nbr_ID (Generate REQ_DATS Message)

Construct list Ls of time slots (subslots) to offer to
Nbr_ID from Free time slots and
    DA subslots with excess capacity (Link_metric <
Min_metric_threshold)
      Append list Ls to REQ_SPTS message and send to Nbr_ID
      Setup timeout and Link Message state in Link Scheduling
Message DB for index
        Nbr_ID and in Slot Assignment DB The neighbor receiving a REQ_DATS message will have its DA slot assignment process transition to the REQ_SPTS state. The procedure for processing this message is shown in TABLE 17. This procedure takes the offered list of sub-slots, Ls, and selects its preferred sub-slot, Ns. The sub-slot accepted is the first sub-slot on the list, is, that is either marked free in the slot assignment DB or is DA allocated with a link metric less than Min_metric_threshold. Then a REPLY_DATS reply message with this selection is sent. If the link cannot be accepted or if there is another ongoing DA slot assignment in process, a negative REPLY_DATS reply message is sent. The procedure also makes the appropriate modifications to the state in the link scheduling message DB and the slot assignment DB.

TABLE 17

Procedure for Processing REQ_DATS Message (from Nbr_ID)

Examine prioritized list Ls of the available subslots
received from Nbr_ID
    and compare with the current allocations in the
Slot Assignment DB
    Select the best assignment = Ns as the subslot on the
list that is either marked Free in
      the Slot Assignment DB or is DA allocated with
Link_metric <
        Min_metric_threshold
If no subslot satisfies conditions for acceptance
    Reject new link and send negative REPLY_DATS message to
Nbr_ID
    Return to Idle state
Else
    Make appropriate modification to the Slot Assignment DB
    (mark it as DA_Reply)
      for time slot Ns
    If time slot Ns was DA allocated
      Send DELETE_TS to the neighbor node allocated the
DA time slot
    End TABLE 17-continued Procedure for Processing REQ_DATS Message (from Nbr_ID)

Append time slot choice, Ns, to REPLY_DATS message and
send to Nbr_ID
    Setup timeout and Link Message state (to DA_Reply with
time slot Ns) in Link
      Scheduling Message DB for index Nbr_ID
    Return to Idle state
End A received REPLY_DATS message is processed as shown in TABLE 18. The choice of sub-slot, Ns, received from the neighbor node is extracted from the message. We require the node to confirm this reply with either a positive or negative CONFIRM message that indicates that it will agree to use the allocated time slot. As indicated in the SP allocation process, this three-way handshake eliminates uncertainty in the outcome of the scheduling process.

If the REPLY_DATS message is a positive reply, then the choice of sub-slot, Ns, is examined to see if it is still an allowable assignment for a new DA sub-slot for the new link. If it is allowable, then the appropriate modifications to the state in the slot assignment and link scheduling message databases are made. Then a positive CONFIRM message is returned.

If the received REPLY_SPTS message was negative, then the slot assignment and link scheduling message databases are reset for this Nbr_ID. Otherwise, if the choice of Ns is no longer allowable, then the link scheduling message database is reset for this Nbr_ID. Then a negative CONFIRM message is sent to the neighbor node rejecting the link.

TABLE 18

Procedure for Processing REPLY_DATS Message from Nbr_ID

Extract time slot choice Ns from the REPLY_DATS message from
Nbr_ID
If (positive REPLY_DATS message) and (choice of Ns is still
allowable from Slot
    Assignment DB)
    Make appropriate modification to the Slot Assignment DB
    (mark it as DA_Reply)
      for time slot Ns and in the Link Message state in
Link Scheduling Message DB
      for index Nbr_ID
    If time slot Ns was DA allocated
      Send DELETE_TS to the neighbor node allocated the
DA time slot
    End
    Create CONFIRM message for Ns and send to Nbr_ID
    Return to Idle state
Elseif negative REPLY_DATS message
    Reset Slot Assignment DB for time slot Ns and in the
Link Message state in
      Link Scheduling Message DB for index Nbr_ID
    Return to Idle state
Else
    Reset Link Message state in Link Scheduling Message DB
for index Nbr_ID
    Send negative CONFIRM message to Nbr_ID
    Return to Idle state
End TABLE 19 shows the procedure for processing CONFIRM messages. If the CONFIRM is positive, the selected sub-slot to be added to the allocation to the link to Nbr_ID. The assigned time slot, Ns, is marked DA_Alloc in the slot assignment DB, and the link message state in the link scheduling message DB is reset for index Nbr_ID. If the message was a negative CONFIRM, then the slot assignment and link scheduling message databases are reset for this sub-slot.

TABLE 19

Procedure for Processing CONFIRM Message from Nbr_ID

If positive CONFIRM message
    Make appropriate modification to the Slot Assignment DB
    (mark it as DA_Alloc)
        for time slot Ns
        Reset Link Message state in Link Scheduling Message DB
    for index Nbr_ID
        Return to Idle state
    Else
        Reset the Slot Assignment DB (mark it as Free) for time
    slot Ns
        Reset Link Message state in Link Scheduling Message DB
    for index Nbr_ID
        Return to Idle state
    End An allocated time slot may need to be de-allocated for one of several reasons. If during the course of normal operation a link goes down or becomes unreliable, then the topology control function gets involved to address the unreliable link problem. Ultimately, it may generate a topology change (e.g., a link deletion) event directing the SP slot assignment process to delete all slots assigned to the link.

The steps involved in this procedure are shown in TABLE 11. The link is de-allocated by sending a DELETE_TS message from the node requesting the de-allocation of all the time slots which are shared with the other node with. In addition, the appropriate entries in the link scheduling message DB and the slot assignment DB are reset.

TABLE 20

Procedure for DA TS Delete to Node Nbr_ID (Generate
DELETE_TS Message)

Construct message, DELETE_TS, containing the DA subslot, Ns,
    that is to be deleted
        and send to Nbr_ID
Reset Link Scheduling Message DB for index Nbr_ID and Slot
    Assignment DB for subslot Ns
Return to Idle state Table 21 shows the procedure for processing a received DELETE_TS message. The subslot, Ls, to be de-allocated is extracted from the message. Then the appropriate state in the slot assignment DB and in the link scheduling message DB is reset.

TABLE 21

Procedure for Processing DELETE_TS Message from Nbr_ID

Extract DA subslot, Ns, from the DELETE_TS message from
    Nbr_ID
Reset the Slot Assignment DB (mark it as Free) for subslot
    Ns
Reset Link Message state in Link Scheduling Message DB for
    subslot Ns
Return to Idle state The link scheduling algorithm is also applicable to multiple simultaneous beams generated by the phased array antenna 16. Assume the extension to a system with nodes each employing multiple antenna beams with separate receivers such as a multiple beam phased array (or other types of multiple, directional antennas). Furthermore, assume that all nodes do not all have to have the same number of beams, i.e., node k has $B_k$ beams. This is equivalent to $B_k$ parallel links possible at any time slot.

We are extending the previous discussion (which assumed a single steered beam) to allow the $B_k$ beams to be time-shared among a set of neighbor nodes larger than $B_k$. Even though the nodes may each have different numbers of beams, all nodes must use a common time slot format and frame with a number of time slots per frame for each beam equal to $N_{frame}$.

Consider an upper limit at any node k on the number of semi-permanently (SP) assigned time slots on any one of its $B_k$ beams (and therefore the maximum number of allowable neighbor nodes per beam) to be denoted by $N_{beam}$. The value of $N_{beam}$ is dependent only on the number of time slots per frame and not the number of beams. As in (3) we will specify that $N_{beam}$ must satisfy the following equation:

$$N_{frame} \geq 2 \cdot N_{beam} - 1 \qquad (7)$$

Assume that all nodes in a network are connected by directional links, where node k has $B_k$ beams with beam sharing by time hopping and pointing to its neighbor nodes. Further, assume the number of neighbors allowed per beam is equal to $N_{beam}$, the fixed limit on the allowable number of semi-permanent time slots allowed per beam (with one SP time slot allocated per neighbor).

If the fixed value of $N_{beam}$ for each beam at each neighbor node satisfies (7), then all nodes can select a different semi-permanent time slot for each of these links and each of its beams by mutual agreement with the neighbor for that link without regard to what colors other nodes are selecting more than one hop away. This allows each node to select its $N_{beam}$ semi-permanent time slots for each beam in a very direct fashion by communicating only with its neighbor node. By following this strategy, each node is able to support at least $$N_k = B_k \cdot N_{beam} \qquad (8)$$

neighbors and each allocated a single SP time slot with no more than $N_{beam}$ such time slots allocated per beam.

Verification that $N_{beam}$ neighbors per beam can be supported as long as (7) is satisfied follows directly from the verification of the observation for the single beam case. Then if all $B_k$ beams have their SP time slots scheduled in the same fashion, it is obvious that the number of neighbor nodes that can be supported is the product of the number of beams and the number of neighbors per beam resulting in (8).

Figure 10:
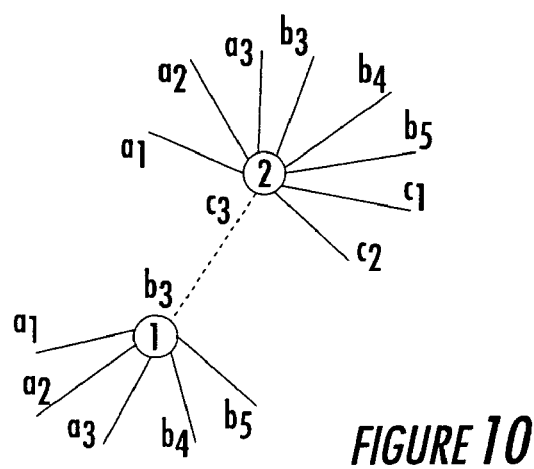
FIGS. 10 and 11 are diagrams illustrating a semi-permanent time slot being scheduled for a new communications link based upon multiple simultaneous antenna beams from a phased array antenna in accordance with the present invention.

An example of SP time slot assignment between two nodes with an unequal number of beams per node is shown in FIG. 10. In this example node 1 has 2 beams and node 2 has 3 beams. While the two nodes have different numbers of beams, both nodes must use the same frame structure. In this example $N_{frame}=5$ time slots per frame. From (7) and (8), this allows node 1 to have a maximum of 6 neighbors and node 2 to have a maximum of 9 neighbors.

Initially both nodes have one less than the maximum number of neighbors they are allowed under the constraints of (7) and (8). The SP beam/time slots allocations are shown for each link. These nodes can add an additional link between themselves while still satisfying the constraints of (7) and (8). The link scheduling protocol will find an acceptable beam/time slot for the SP allocation for each node, and it operates in essentially the same way it did with the single beam case.

The corresponding protocol message exchange is shown in TABLE 22. Node 1 initiates the exchange by sending a REQ_SPTS(L=(1, 2, 3)) with a list of at least $N_{beam}$ candidate time slots. Note the 3 beam IDs are denoted by a, b and c, and the slot number is denoted by the subscript on the beam ID. Node 1 had to identify that it had used all 3 allowable SP time slots on beam a, but it had allocated only 2 of the 3 allowable SP time slots on its beam b.

Thus, it sent a list of the 3 SP time slots (available on beam b) to node 2. This list may include all free and DA time slots on this beam. When the request message is sent, the appropriate changes are made to the time slot and link scheduling message data structures. Node 2 has previously allocated SP all available SP time slots on beams a and b for its links to its 8 neighbors.

Thus, beam c is the only beam that can accept a new SP allocation. When it receives the REQ_SPTS(L=(1, 2, 3)) from node 1, it selects beam/time slot $C_3$ as the only one that will work for the new link (having previously allocated $c_1$ and $c_2$ as SP time slots). It sends this choice in the reply message. When a reply message is sent the appropriate changes are also made to the beam/time slot and link scheduling message data structures. Finally, when a confirm is sent or received, the state of the appropriate time slots are changed to "SP allocated to link (1,2)."

TABLE 22

| Node 1 | Node 2 |
| --- | --- |
| Receives Link Add Event From Its Topology Control For A Link From Node 1 to Node 2 | |
| Send REQ_SPTS(L=(1, 2, 3)) → | Rcvd Send REQ_SPTS(L=(1, 2, 3)) |
| Rcvd REPLY_SPTS(Slot 3) ← | Send REPLY_SPTS(Slot 3) |
| Send CONFIRM(Slot 3) → | Rcvd CONFIRM(Slot 3) |
| Beam/Slot $b_3$ | Beam/Slot $c_3$ |
| Allocated to Link (1, 2) | Allocated to Link (1, 2) |

The changes that are required to implement the multiple beam scheduling algorithm/protocol are straightforward and are as follows. Add the beam ID as a variable in the state of the time slot DB and the link scheduling message DB. Use (7) and (8) as the criteria for determining if it is possible to schedule a new SP time slot. We specify a value for the parameters $N_{frame}$ and $N_{beam}$ for the network.

To offer a new SP time slot to a potential neighbor, the algorithm must first find a beam for which the number of neighbors is less than $N_{beam}$. This beam can then be used to add the new neighbor. The REQ_SPTS message that the node sends to its neighbor will specify $N_{beam}$ available time slots for that beam that are not currently SP allocated.

Having received an REQ_SPTS message the node must find one of its beams for which the number of neighbors is less than $N_{beam}$. This beam can then be used to add the new neighbor. Comparing the list of $N_{beam}$ time slots in the received REQ_SPTS message with the $N_{beam}$ time slots not currently allocated in the selected beam, at least one time slot can be found that is common to both lists. That time slot can be selected as the time slot to send in the REPLY_SPTS message. Once the originating node receives the REPLY_SPTS message, both nodes will have selected their beam and the common time slot allocation.

This example implicitly assumed that a single frequency band is used for each of the beams. In this case, a node could have several beams simultaneously communicating over the same band without interference. This interference-free operation may be difficult to support in practice. A similar formulation of the problem could be done with each beam operating in a different frequency band, i.e., beams a, b, and c in FIG. 10 each use a different frequency band. In terms of the scheduling algorithm, we would apply the same constraints on the allocation of SP time slots. However, in actually allocating the time slot/beam combinations we would need to find an allocation such that the two nodes are using the same beam (equivalent to using the same band) as well as the same time slot. This equivalent to making each beam/time slot combination different from the scheduling perspective. Thus, the number of available time slots is the number of beams multiplied by the frame size. In this case the constraint on assigning SP time slots to potential neighbors is given by $$B \cdot N_{frame} \geq 2 \cdot N - 1 \qquad (9)$$

where B denotes the number of beams. This constraint on the number of neighbors is slightly more restrictive than that of (7) and (8) because of the requirement that nodes which share an SP time slot must also use the same beam/frequency channel as well as the same time slot. For the example $N_{frame}=5$ and B=3, then the constraint of (9) allows 8 neighbors for each node whereas the constraints of (7) and (8) will allow 9 neighbors for each node.

Figure 11:
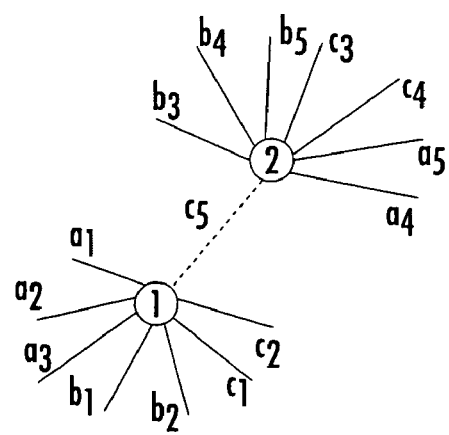

The example problem in FIG. 10 has 2 nodes each with 3 beams with each beam operating in a different frequency band, i.e., beams a, b, and c each use a different frequency band. Assume also that the frame size is 5. Both nodes have already committed 7 SP time slots to neighbor nodes and thus, from (9), they can each add an additional neighbor with an SP time slot allowing them to establish a link between them. The committed SP time slots are indicated in the figure, and the message exchanges required to establish the SP time slot assignment and the new link are indicated in Table 23. The message exchange is initiated by node 1 by sending a REQ_SPTS (L=($a_4$, $a_5$, $b_3$, $b_4$, $b_5$, $c_3$, $c_4$, $c_5$)) message to node 2 which must include the 8 beam/time slot combinations it has not previously allocated as SP time slots. In this example, node 2 had already allocated 7 beam/time slot combinations that were not used by node 1 (which were in the list of 8 beam/time slot combinations received in the REQ_SPTS message). Thus, by (9) there must be at least one remaining beam/time slot combination that it can select for allocation ($c_5$). This is the SP beam/time slot combination allocated to the link between nodes 1 and 2 as show in both FIG. 11 and Table 23.

TABLE 23

| Node 1 | Node 2 |
| --- | --- |
| Receives Link Add Event From Its Topology Control For A Link From Node 1 to Node 2 | |
| Send REQ_SPTS(L=($a_4$, $a_5$, $b_3$, $b_4$, $b_5$, $c_3$, $c_4$, $c_5$)) → | Rcvd Send REQ_SPTS(L=($a_4$, $a_5$, $b_3$, $b_4$, $b_5$, $c_3$, $c_4$, $c_5$)) |
| Rcvd REPLY_SPTS (Beam/Slot $c_5$) ← | Send REPLY_SPTS (Beam/Slot $c_5$) |
| Send CONFIRM (Beam/Slot $c_5$) → | Rcvd CONFIRM (Beam/Slot $c_5$) |
| Beam/Slot $c_5$ | Beam/Slot $c_5$ |
| Allocated to Link (1, 2) | Allocated to Link (1, 2) |

Turning now additionally to FIGS. 12 and 13, one particularly advantageous approach for determining when it is appropriate to establish a directional link between two mobile nodes 12 is to first determine the quality of the omni-directional link between the nodes and base the determination on this quality value. That is, directional signals typically have greater signal strength than omni-directional signals transmitted at the same power level because the energy of the directional communication link is focused in one direction and not spread out over 360°. Thus, by requiring nodes to have a sufficient quality value for the omni-directional communication link before establishing the directional communication link, this provides a good indication that the directional communication link will also be of a desired quality level.

Indeed, the omni link quality is a key issue in maintaining a connected mobile ad-hoc network of nodes using directional antennas. There are a variety of link impairments that can lead to loss of either or both of directional and omni-directional links, either intermittently or for a relatively long time. Link quality is preferably continuously measured for both link types, and mechanisms should be used to react to changes in link quality. These measurements may be performed at the link layer, and the network layer will be informed of link quality through link layer notification, although other configurations may be used in certain embodiments.

As such, the process of establishing a directional link preferably begins (Block 120) by first establishing an omni-directional link between a given pair of mobile nodes 12, at Block 121, as described above. This will occur when a neighbor is first detected by hearing its Link_HELLO packets. In accordance with this aspect of the invention, the link scheduler will not be allowed to initiate the process of directional link setup until the omni link quality is sufficiently high.

The controller 18 determines a quality value for the omni link (Block 122) as follows. Using OLSR as an exemplary routing protocol, to be consistent with the OLSR specification, we will define the link quality measure, denoted as the variable N_quality, as a number between 0 and 1, where 1 represents the highest quality. In accordance with one method for calculating quality in the OLSR specification, this may be done as an estimate of the packet reception error value for OLSR packets.

The process of estimating channel quality should be implemented in a fashion such that the most accurate possible estimate of channel quality is obtained. One possibility is to use signal-to-noise estimates, e.g., from an 802.11 card, if they are easily obtained and related to the time slots assigned to particular nodes.

If a signal-to-noise ratio estimate cannot be easily used, one can use the approach used with OLSR, which estimates quality from the successful reception of OLSR packets. For the omni link several packets per second are received from each neighbor of the types Link_HELLO, Directional Neighbor, and Channel Quality Feedback. For a given set of configuration parameters, a fixed number of these packets are transmitted each second from each neighbor node. Thus, a known number of these packets per second are transmitted, and the number received can be counted.

An algorithm for calculating the omni quality value $N\_quality omni^{L_k}$ is as follows. For each successful packet reception from node k, the $N\_quality_{omni}^{L_k}$ value for the link from node k is updated as:

$$N\_quality_{omni}^{L_k} = (1-\alpha) \cdot N\_quality_{omni}^{L_k} + \alpha. \quad (10)$$

For each packet transmission from node k that is lost, the $N\_quality omni^{L_k}$ value for the link from node k is updated as:

$$N\_quality_{omni}^{L_k} = (1-\alpha) \cdot N\_quality_{omni}^{L_k}. \quad (11)$$

The initial condition for the $N\_quality_{omni}^{L_k}$ value for the link from node k is set to 0 prior to the first received Link_HELLO, and then it is updated according to (10) with the correctly received Link_HELLO. The choice of the parameter $\alpha$ effectively sets a time constant for a first order filter (or exponentially weighted average) for calculating the estimate of the probability of successful packet transmission. The proper setting for the value of this parameter is dependent on the number of messages per second expected, and it is a compromise between the desired responsiveness and the accuracy of the estimate. As will be appreciated by those skilled in the art, larger values of $\alpha$ result in larger changes for each new sample received. This leads to faster recognition of a change in link status at the expense of increased possibility of incorrectly classifying the link status.

For the link $L_k$, a variable $Can\_Alloc^{L_k}$ will be set that will preferably be TRUE to initiate a directional link time slot allocation, either for the initial SP time slot allocation or for any future DA allocation or re-allocation due to interference mitigation. That is, link scheduler will only establish a directional communication link with the neighboring mobile node if the quality value for the omni-directional communication link is greater than a first quality threshold (indicating $Can\_Alloc^{L_k}$ is TRUE), at Blocks 123 and 124, thus concluding the illustrated method. The directional communication link may be established as previously described above.

Of course, the method may optionally continue (Block 130) by continuing to determine/monitor the quality value (Block 131) after a directional link is established. In such case, the variable $Can\_Alloc^{L_k}$ will be modified each time $N\_quality omni^{L_k}$ is determined according to the relationships:

$$N\_quality_{omni}^{L_k} < T_{omni}^{L}; \text{ Set } Can\_Alloc^{L_k} = \text{FALSE}; \quad (12)$$

$$N\_quality_{omni}^{L_k} > T_{omni}^{H}; \text{ Set } Can\_Alloc^{L_k} = \text{TRUE}; \text{ and} \quad (13)$$

$$T_{omni}^{L} \geq N\_quality_{omni}^{L_k} \leq T_{omni}^{H}; \text{ Do not modify } Can\_Alloc^{L_k}. \quad (14)$$

To avoid link flapping caused by the statistical fluctuations in estimating the $N\_quality_{omni}^{L_k}$ value, hysteresis is introduced in (12)–(14) to prevent modifications of the $Can\_Alloc^{L_k}$ variable unless a sufficient change in $N\_quality omni^{L_k}$ is estimated, as illustrated at Block 132. The first threshold $T_{omni}^{H}$, the second threshold $T_{omni}^{L}$, and the parameter $\alpha$ are selected to insure this behavior. Exemplary values for the thresholds are $T_{omni}^{L} = 0.2$ and $T_{omni}^{H} = 0.8$, although other values may also be used. Of course, if the quality value falls below the second threshold $T_{omni}^{L}$, use of the directional link may be temporarily suspended, or the link discontinued as appropriate (Block 133), thus ending the illustrated method (Block 134).

It should be noted that the procedures which will be discussed further below may be predicated upon using the $Can\_Alloc^{L_k}$ variable as a gate, as described above. That is, the variable should have the value $Can\_Alloc^{L_k} = \text{TRUE}$ before a time slot can be allocated to a directional link $L_k$. The variable is set initially to the value $Can\_Alloc^{L_k} = \text{FALSE}$ when the first Link_HELLO packet is received for the link $L_k$. Of course, other approaches could be used for determining when it is appropriate to establish and/or continue to use directional communication links.

Figure 16:
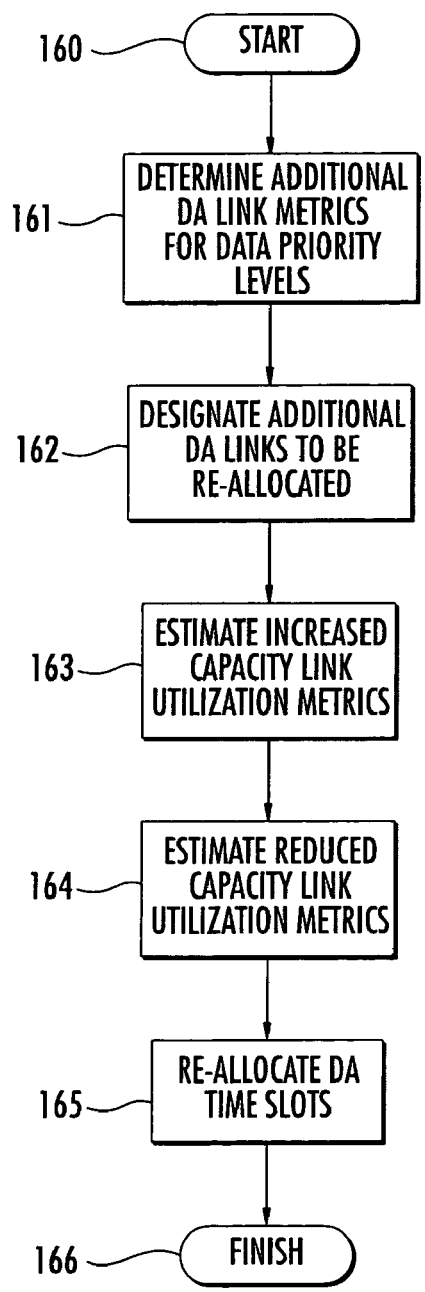

Referring now additionally to FIGS. 14–16, allocation of the demand assigned time slots will now be discussed in further detail. The DA time slots are preferably allocated in a manner that is responsive to the fluctuating demands of network traffic. As noted above, the variable Can_Alloc$^{L_k}$ may be used to determine when it is first appropriate to establish a directional communication link. That is, good omni channel quality may be used as a precondition for assignment of new DA time slots. Thus, for a link $L_k$, the variable Can_Alloc$^{L_k}$ should be TRUE prior to allocation of a new DA time slot either by the requester of the time slot or the node receiving a time slot allocation request.

Similarly, it may also be desirable to require that the variable Can_Alloc$^{L_k}$ be TRUE prior to re-allocation of a DA directional time slot responsive to interference conditions or other link degradation. The following discussion of allocation of DA time slots assumes the condition that Can_Alloc$^{L_k}$ is TRUE, but this is not required in all embodiments.

In accordance with this aspect of the invention, a request for on-demand time slots from one node to a neighbor node is allowed only if a semi-permanent time slot is allocated for the link between these two nodes. After a link is allocated at least one semi-permanent time slot, then a node may request a periodic allocation of an additional time slot. The messages used for scheduling the DA time slots can be sent over the omni link or the directional link.

More particularly, each controller 18 preferably includes a data queue 18f for storing data to be sent over a given communication link. A first approach for allocating demand assigned time slots (FIG. 14) begins (Block 140) with scheduling respective semi-permanent time slots between pairs of mobile nodes 12, at Block 141, as discussed above. A quantity of data previously sent over the communication link during the semi-permanent time slots may be determined, at Block 142, along with the amount of data stored in the data queues (Block 143), and link utilization metrics for each communication link may be determined based thereon, at Block 144. The demand assigned time slots may then be scheduled based upon the link utilization metrics (as will be described further below), at Block 145, thus concluding the illustrated method, at Block 146.

In particular, measurement of the traffic requirements on each link is particularly important for efficient allocation of DA time slots. As noted above, this is preferably done based upon the quantity of data being sent over a given link and the data that is getting backed up in the queues 18f. With respect to the former, the measured average traffic sent over the link between nodes i and k (in units of the number of time slots per epoch) will be denoted by $T_{ik}^{se}$. This measure will include all traffic sent over one or more semi-permanent time slots per epoch as well as any on-demand time slots.

A current measure of the queue state, $Q_{ik}$, is also maintained for the link between nodes i and k. Larger values of $Q_{ik}$ indicate the need for an immediate allocation of one or more DA time slots. Occasional bursts of demand may produce increases in $Q_{ik}$, which should then trigger a request for additional time slots of DA capacity until the queue size decreases.

The total number of time slots allocated on link between nodes i and k will be denoted by $N_{ik}^{tot}$. The time slot demand may be defined as:

$$T_{ik}^{dem} = f(T_{ik}^{se}, Q_{ik}), \quad (15)$$

which is a function of the measured traffic plus the estimated additional capacity needed that is indicated by the queue size. This function can take many forms and can be also influenced by new requests for reserved capacity.

In some embodiments, it may be desirable to allow the link metric to be influenced by the priority of the traffic demand. That is, the level of demand for a given communication link during a time slot may be further segmented into the amount of expected demand for several priority class of traffic. This enables more effective allocation of time slots to meet the demand of prioritized traffic.

Thus, with reference to FIG. 15, such approach may begin (Block 151) by scheduling the SP time slot as similarly described with reference to the step illustrated at Block 141 in FIG. 14. Link utilization metrics may then be determined for each of a plurality of data priority levels or classes for each communication link, at Block 152. This may be done using one or both of the above measurements (i.e., amount of data previously transmitted and/or amount of data stored in the data queue 18f), or other appropriate usage measurements.

By way of example, if the traffic is prioritized into p priority classes in order of priority from lowest to highest, $P_1, P_2, P_3, \ldots, P_p$, then the time slot demand for priority class $P_j$ is:

$$T_{ik}^{dem,Pj} = f(T_{ik}^{se,Pj}, Q_{ik}^{Pj}). \quad (16)$$

A separate demand metric is computed for each priority class. Then the number of time slots needed for this priority class on this link, $T_{ik}^{need,Pj}$, is computed using the metrics from both directions:

$$T_{ik}^{need,Pj} = \max(T_{ik}^{dem,Pj}, T_{ki}^{dem,Pj}). \quad (17)$$

It may be desirable to increase the highest priority demand metric, $T_{ik}^{need,P_p}$, by a bias term, B (e.g., of about ¼ of a time slot) to ensure that adequate capacity is allocated to avoid significant queuing. An aggregate metric may then optionally be determined (Block 153) as the aggregate demand over all priority classes, that is:

$$T_{ik}^{need} = \sum_{j=1}^{p} T_{ik}^{need,Pj}. \quad (18)$$

The DA time slots may then be scheduled based thereon and based upon the priority levels, at Block 154, thus concluding the method (Block 155).

A demand metric is assigned to this link which is a function of both the demand for capacity and the number of time slots previously allocated to the link. We will denote this by $M_{ik}^{DA}(T_{ik}^{Pj}, N_{ik}^{tot})$, indicating that it is dependent on the estimated demand for all priority classes and the number of allocated slots. This approach provides that the metric increases as the proportion of higher priority traffic increases, and as more time slots are needed. In addition, the metric is reduced if the number of allocated time slots is increased. Thus, if a link has excess time slots, the metric is negative. Of course, other metrics may be used in various applications, as will be appreciated by those of skill in the art.

The following algorithm can be used to calculate the link metric. For the following example, we assume three priority classes for simplicity with priority class $P_3$ being the most important. If $T_{ik}^{need} \leq N_{ik}^{tot}$ then set $$M_{ik}^{DA}(T_{ik}^{P_j}, N_{ik}^{tot}) = T_{ik}^{need} - N_{ik}^{tot};$$

else if $T_{ik}^{need} - T_{ik}^{need,P_1} < N_{ik}^{tot}$, then $$M_{ik}^{DA}(T_{ik}^{P_j}, N_{ik}^{tot}) = \max(K_s, T_{ik}^{need} - N_{ik}^{tot});$$

else if $T_{ik}^{need} - T_{ik}^{need,P_1} - T_{ik}^{need,P_2} < N_{ik}^{tot}$, then $$M_{ik}^{DA}(T_{ik}^{P_j}, N_{ik}^{tot}) = \max(2 \cdot K_s, K_s + T_{ik}^{need} - T_{ik}^{need,P_1} - N_{ik}^{tot});$$

else $$M_{ik}^{DA}(T_{ik}^{P_j}, N_{ik}^{tot}) = 2 \cdot K_s + T_{ik}^{need} - T_{ik}^{need,P_1} - T_{ik}^{need,P_2} - N_{ik}^{tot}.$$

In the above algorithm, the constant parameter $K_s \geq 1$ is selected to allow as much range as needed in the metric for each priority class. For example, if $K_s = 1$, then if additional time slots are needed and there is class $P_3$ traffic demand, the aggregate metric will be in the range $2 < M_{ik}^{DA}(T_{ik}^{P_j}, N_{ik}^{tot}) \leq 3$. Likewise, if the highest traffic class is class $P_2$, then the aggregate metric will be in the range $1 < M_{ik}^{DA}(T_{ik}^{P_j}, N_{ik}^{tot}) \leq 2$. Otherwise, if the highest traffic class is class $P_1$, then the aggregate metric will be in the range $0 < M_{ik}^{DA}(T_{ik}^{P_j}, N_{ik}^{tot}) \leq 1$. The range can be further expanded by selecting a larger value for $K_s$. For $K_s = 2$ using the procedure above, the metric ranges for the 3 priority classes from lowest to highest are 0 to 2, 2 to 4, and 4 to 6.

The metric $M_{ik}^{DA}(T_{ik}^{P_j}, N_{ik}^{tot})$, as calculated above, provides a basis for determining whether or not a link requires additional slot assignments (i.e., if $M_{ik}^{DA}(T_{ik}^{P_j}, N_{ik}^{tot})$ is positive) and which priority class requires the assignment. It also enables new slots to be assigned on those links with the highest metric indicating the greatest need for slots at the highest priority. In addition, it also indicates if there is excess capacity assigned to the link (i.e., $M_{ik}^{DA}(T_{ik}^{P_j}, N_{ik}^{tot})$ is negative).

A key point to note is that when using the above approach the link metrics will indicate prioritized relative demand for time slots. The largest metric greater than zero indicates the greatest need for additional capacity for traffic of higher priority than any other link. A metric less than zero indicates that the link has excess capacity. The smallest link metric indicates the link with the greatest excess capacity. This link would then be the best candidate for rescheduling capacity on another link if required.

An exemplary approach will now be described with reference to FIG. 16 which may be used at each network node 12 to allocate on-demand time slots for directional links to neighbor nodes. Using the approaches outlined in either or both of FIGS. 14 and 15, beginning at Block 160 a mobile node 12 will continuously maintain the link metric $M_{ik}^{DA}(T_{ik}^{P_j}, N_{ik}^{tot})$ for each of its links allocated a semi-permanent time slot, at Block 161.

Each node 12 will use this link metric to indicate the need for additional transmission time slots to each neighbor node. The largest values of $M_{ik}^{DA}(T_{ik}^{P_j}, N_{ik}^{tot})$ indicate the links with the greatest need for additional DA time slot allocation ordered by priority. A value of $M_{ik}^{DA}(T_{ik}^{P_j}, N_{ik}^{tot}) > 2 \cdot K_s$ indicates the need for additional time slots of the highest priority class $P_3$. Similarly, if $K_s < M_{ik}^{DA}(T_{ik}^{P_j}, N_{ik}^{tot}) \leq 2 \cdot K_s$, then additional time slots are needed to serve priority class $P_2$. Finally, if $0 < M_{ik}^{DA}(T_{ik}^{P_j}, N_{ik}^{tot}) \leq K_s$, then additional time slots are needed to serve priority class $P_1$.

As the metrics $M_{ik}^{DA}(T_{ik}^{P_j}, N_{ik}^{tot})$ are maintained, the link with the largest link metric greater than zero should be selected as the first choice for an additional time slot allocation, at Block 162. If there are time slots available either as free slots or as excess DA allocation to other links (again indicated by a small metric) or slots that are being used but have a lower priority, then the process transitions to the Add DA Slot state and the process of finding a DA time slot allocation is initiated.

There are several other metrics that will be useful in this time slot re-allocation process. An increased capacity link utilization metric $M_{ik}^{DA}(T_{ik}^{P_j}, N_{ik}^{tot}+1)$ may be calculated to estimate how the link metric changes after an additional time slot is added, at Block 163. This can be useful in determining if a second time slot should be requested and what the priority of that request should be. It may indicate that this link should be allocated a second time slot, or another link may now have a larger metric. In the latter case, the next time slot allocation should be to that link with the largest metric.

Similarly, a reduced capacity link utilization metric $M_{ik}^{DA}(T_{ik}^{P_j}, N_{ik}^{tot}-1)$ may be calculated, at Block 164, to estimate what the link utilization metric will be if a time slot is taken away from the link. This can be useful in the re-allocation of time slots from one link to another. That is, the demand assigned time slot(s) designated for re-allocation may then be re-allocated, at Block 165, if the increased and/or decreased link utilization metrics are within acceptable limits, as will be appreciated by those of skill in the art, thus concluding the illustrated method (Block 166).

As with the semi-permanent time slots, a node 12 need only coordinate the selection of the DA time slot to be assigned for a directional link to a neighbor with that neighbor. This means that a neighbor will send a request to the neighbor for the time slot assignment over the directional link, and receive either a grant of the assignment or a denial of the request over the same link, as will be discussed further below.

Link metrics are preferably recalculated periodically according to a predetermined schedule. A link which has a link metric greater than a certain threshold Max_metric_threshold is a candidate for obtaining a new DA capacity. The metric may indicate the need for multiple time slots, and they may be requested concurrently in one request. The link with the maximum metric that exceeds this threshold will have preference in allocating a new DA time slot. However, if multiple link metrics exceed the threshold Max_metric_threshold, then a node may request DA time slots from multiple neighbor nodes concurrently. A negative value of link metric indicates that the link has excess capacity, although other forms of the metrics may also be used in various embodiments. This capacity may be relinquished to satisfy the needs of other links with larger link metrics.

Using multiple data priority levels also provides the flexibility of prioritizing data so that higher priority data can be transmitted first. Of course, a given link may have several time slots allocated in each directional epoch. Thus, a directional link $L_k$ to neighbor node k may have time slots i and j allocated to it, and these two time slots may have differing link qualities. Depending on interference levels, one of the time slots may be of high quality while the other is of poor quality. It would not typically be appropriate to transmit important traffic over time slots of poor quality.

Figure 17:
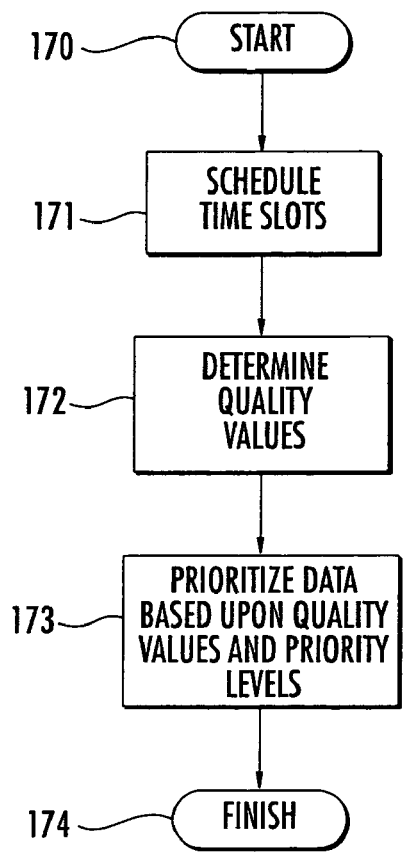
FIGS. 17 and 18 are flow diagrams illustrating a data prioritization method in accordance with the present invention.

One advantageous approach for prioritizing data based upon link quality of service (QoS) during given time slots will now be discussed with reference to FIG. 17. Beginning at Block 170, a plurality of time slots are scheduled between a given pair of mobile nodes 12, at Block 171. Again, this would typically include one or more SP time slots, and one or more DA time slots, as previously described above. As also described above, respective link quality values associated with the communication link during each time slot are also illustratively determined, at Block 172. This may be done based upon SIR, packet reception error values, etc. As such, the data is prioritized to be transmitted during the time slots based upon the priority level of the data and the quality values, at Block 173, thus concluding the illustrated method (Block 174).

More particularly, the controller 18 preferably assigns data corresponding to a highest one of the priority levels to the time slot having the highest quality value associated therewith. For example, the highest priority level may correspond to network control data, as this type of data typically requires prompt delivery and action to mitigate interference, re-allocate lost links to new time slots, etc.

Figure 18:
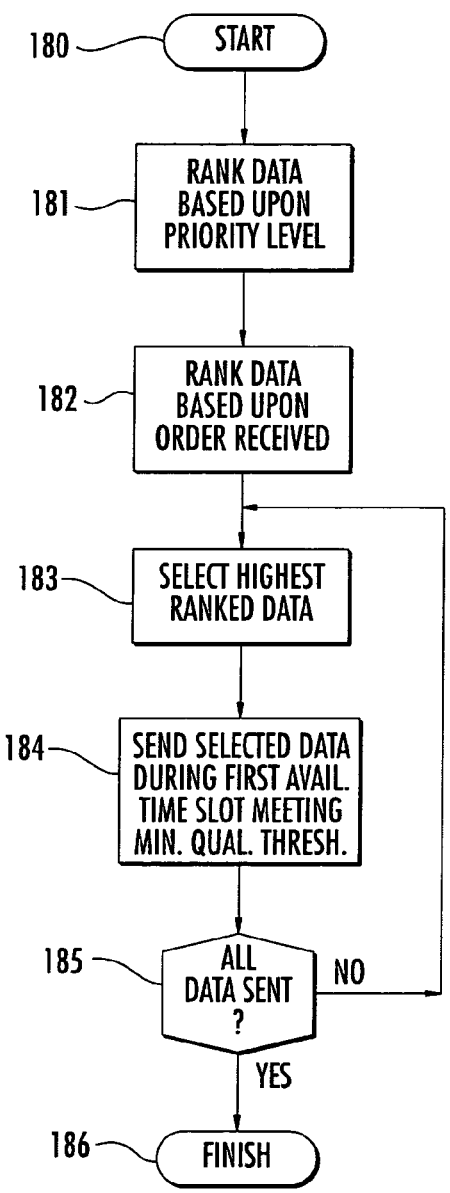

Referring additionally to FIG. 18, an exemplary approach for prioritizing the data is now described. Beginning at Block 180, data waiting to be transmitted is first preferably ranked by data priority level, at Block 181, and then further by the order in which the data was received, at Block 182. The highest ranking data from these two steps may then be selected (Block 183) and sent during a first available time slot for which the quality value is above a respective minimum quality threshold for that data priority level, at Block 184. This process then continues until all of the data is sent (Block 185), which concludes the illustrated method, at Block 186. Of course, it will be appreciated that the above steps will be repeated frequently during actual operation, but they are illustratively shown as terminating at Block 186 for clarity of illustration.

It should be noted that the data queues 18f could in fact be implemented as separate data priority level queues if prioritization based upon quality values (i.e., QoS) is implemented. Moreover, some modification may be desirable to account for differing link qualities of each time slot allocated to a specific link. Again using the above example, it may not be desirable to transmit OLSR network control traffic over a time slot of questionable quality.

The quality measure estimated at a node j for its link to node k via time slot i is denoted by $N\_quality_i^{L_k}$. Similarly, the estimated quality for that time slot at node k and transmitted in the Channel Quality Feedback packets will be denoted by $N\_quality\_Rx_i^{L_k}$. Then, based on these two estimates, the quality of time slot i may be estimated as $Quality_i^{L_k} = Min(N\_quality_i^{L_k}, N\_quality\_Tx_i^{L_k})$.

If network control traffic is assigned the highest priority, when a time slot i allocated to a directional link $L_k$ comes up, then any queued network control traffic for the directional link $L_k$ has first choice at using this time slot, assuming certain conditions on the quality of the time slot are met.

For the class of network control traffic, such conditions may be as follows. A packet addressed to node k is transmitted in the first time slot i and allocated to the directional link $L_k$ if the quality of the link $L_k$ satisfies $Quality_i^{L_k} > T_{NC}$, where the threshold $T_{NC}$ is chosen to insure sufficient link quality for network control traffic. Otherwise, the packet addressed to node k may be transmitted in the time slot allocated to directional link $L_k$ that has the highest link quality $Quality_i^{L_k}$.

Furthermore, for some of the classes of mission data traffic it may be desirable to impose similar time slot quality conditions. For any mission data class Cm, one can impose time slot quality conditions as follows. A packet addressed to node k may be transmitted during the first time slot i allocated to directional link $L_k$ that satisfies $Quality_i^{L_k} > T_{Cm}$, where the threshold $T_{Cm}$ is chosen to ensure sufficient link quality for mission data traffic of class Cm. Otherwise, the packet addressed to node k may be transmitted during the time slot allocated to directional link $L_k$ that has the highest link quality $Quality_i^{L_k}$.

As will be appreciated by those skilled in the art, with the above approach there is an advantage to having a longer epoch with several time slots allocated within each epoch to each link $L_k$. That is, there is much less chance of link degradation when one time slot experiences poor quality either temporarily or permanently due to interference. In this case the other allocated time slots may have higher quality and be crucial for maintaining QoS for critical traffic. If a single time slot is allocated to a link, then there may be a delay in the allocation of a new time slot if the quality of the single allocated time slot begins to degrade due to interference.

Link quality sensing is preferably performed on the directional links as well as the omni links. Yet, this is more complex for the directional links since each time slot may have a different link quality. In addition to normal propagation effects inducing link outages, the directional links are subject to quality degradation by interference from other node pairs reusing the same time slot. Thus, the link quality for every time slot may need to be estimated and stored separately (even if several time slots are allocated to the same neighbor node).

Moreover, even with the link quality estimated separately for each time slot, the aggregate link quality for a link over several time slots is typically the only information transferred to the routing protocol, as is the case with OLSR, for example. This process is complicated by the frequent reassignment of time slots to links that may be required by changes in traffic demand and by changes in the interference constraints (induced by changes in geometry) for certain time slots.

All of this activity at the link layer may in fact be transparent to the routing protocol. For any given link to a neighbor, the only information typically reported to the routing protocol is the link quality of the link to that neighbor. Various features of the invention which may be used at the link layer to support link quality sensing, interference avoidance and mitigation, and the relationship thereof to assigning new time slots are described below.

Figure 19:
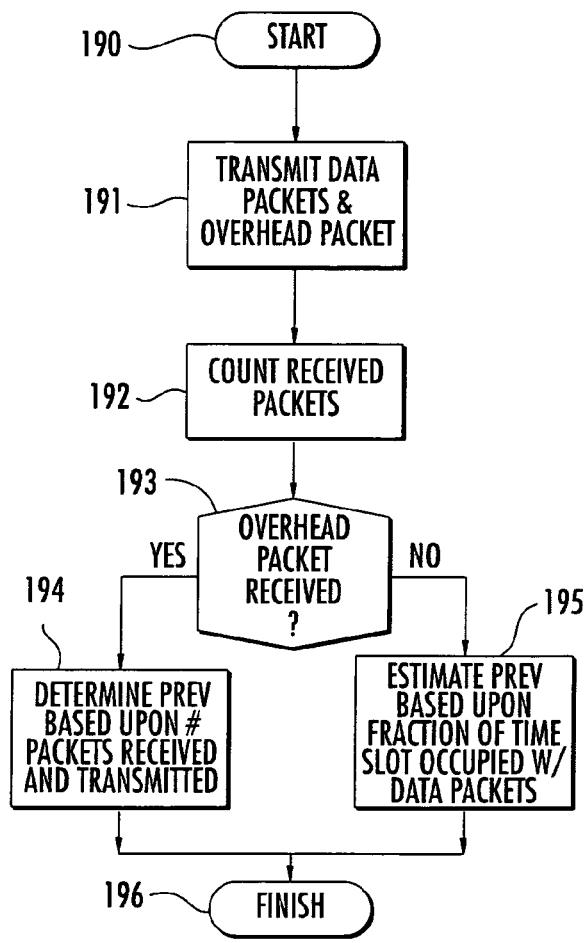
FIGS. 19 and 20 are flow diagrams illustrating a method for determining a packet reception error value and adjusting link usage based thereon in accordance with the present invention.
Figure 20:
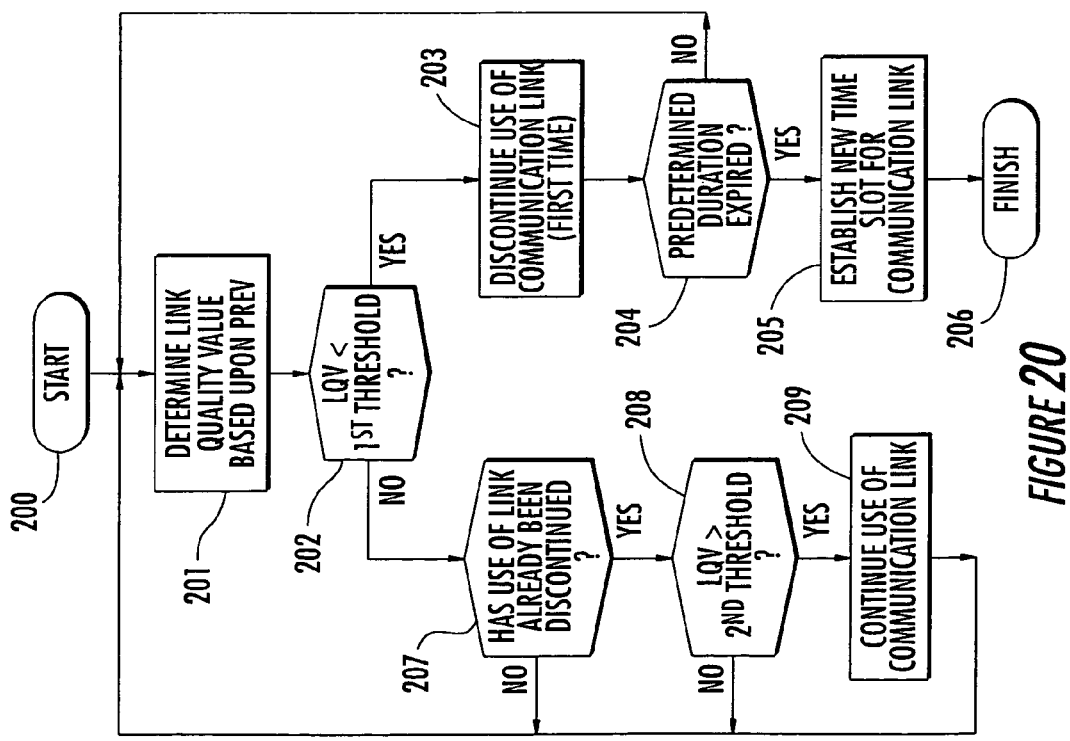

One particularly advantageous approach for determining directional link quality will now be described with reference to FIGS. 19 and 20. If a signal-to-noise ratio estimate cannot be easily used to estimate quality for each individual time slot, then the approach described above for estimating omni link quality may be used (i.e., using the successful reception of omni overhead packets). In the case of a directional time slot, the traffic is primarily mission data traffic.

In particular, beginning at Block 190, several such data packets will be transmitted by a source node in each time slot, but the receiving node does not know how many were transmitted. To allow the receiving node to know how many packets were transmitted in the time slot, the transmitter will also transmit in the slot a special overhead packet PKT_CT along with the data packets, at Block 191. The overhead packet provides the transmitted packet count during the time slot (including itself). Thus, the receiving node will know how many total packets were transmitted in a time slot if the PKT_CT packet is received. We will denote this number as $n_i^T$ for the number transmitted in the time slot. The receiving node also counts the number of correctly received packets, denoted as $n_i^R$, at Block 192.

A packet reception error value for a time slot i may be estimated based on the packets received in time slot i. Preferably, the network will be configured such that at least one packet will always be transmitted (i.e., the PKT_CT packet). As such, if no packets are received in a given time slot, the packet reception error value for time slot i is estimated at 0. If the PKT_CT packet is received correctly, at Block 193, it provides the value of $n_i^T$, and the packet reception error value for time slot i is estimated at $n_i R/n_i^T$, thus concluding the illustrated method, at Block 196.

The other case that can occur is if the PKT_CT packet is not received correctly, and the value of $n_i^T$ is not known. In this case the probability of correct packet reception for time slot i is estimated as the fraction of the time slot occupied by correctly received packets (Block 195), i.e., $B_i^R/TS_i$. Here, $B_i^R$ denotes the number of bytes in correctly received packets during the time slot, and $TS_i$ denotes the time slot length in bytes. Thus, the estimate of the packet reception error value, $\tilde{P}_i^C$, for time slot i is calculated as:

$$\tilde{p}_i^C = \begin{cases} n_i^R/n_i^T; & (n_i^T\_known) \\ B_i^R/TS_i; & (n_i^T\_not\_known) \\ 0; & (no\_pkts\_received) \end{cases} \quad (23)$$

The method may optionally include, beginning at Block 200, using the packet reception error value to determine/update the directional link quality value (LQV) $N\_quality_i^{L_k}$ for each time slot i assigned to a link $L_k$, at Block 201. These values are updated once per epoch for each time slot in the epoch. After each time slot the $N\_quality_i^{L_k}$ value for the directional link allocated to time slot i is updated as:

$$N\_quality_i^{L_k} = (1-\beta) \cdot N\_quality_i^{L_k} + \beta \tilde{p}_i^C. \quad (24)$$

The initial condition for the $N\_quality_i^{L_k}$ value for the link from node k is set to 1 prior to the first received time slot after the time slot is allocated to this link. It is then updated according to (24) with each subsequent epoch after the time slot i for that epoch.

The choice of the parameter $\beta$ effectively sets a time constant relative to the length of a directional link epoch for a first order filter estimating probability of successful packet transmission. The proper setting for the parameter $\beta$ is a compromise between desired responsiveness and accuracy of the estimate. Larger values of $\beta$ result in a larger potential change during an epoch. This leads to faster recognition of a change in link status at the expense of increased possibility of incorrectly classifying the link status.

One issue is how much time (in number of epochs) should be allowed to pass before it is determined that a change in link status has occurred. After a period of time, if the time slot i has become very bad, the value of $N\_quality_i^{L_k} \approx 0$. Similarly, if the time slot i has become very good, the value of $N\_quality_i^{L_k} \approx 1$. The difficulty lies in judging the transition between good and bad and when to declare a time slot should be re-allocated.

One particularly advantageous approach for making this determination is to use hysteresis. In accordance with this aspect of the invention, generally speaking, the destination node determines the link quality value $N\_quality_i^{L_k}$ associated with the communication link based upon the packet reception error value, at Block 201. If the link quality value $N\_quality_i^{L_k}$ falls below a first threshold, the source node and the destination node will discontinue use of the communication link during the time slot, at Block 203.

Further, if the link quality value $N\_quality_i^{L_k}$ remains below the first threshold (other thresholds could also be used in other embodiments) for a predetermined duration, at Block 204, the source node and the destination node may establish a new time slot for establishing a wireless communication link therebetween, at Block 205, thus concluding the illustrated method (Block 206). On the other hand, if the link quality value $N\_quality_i^{L_k}$ has previously fallen below the first threshold and use of the link already discontinued, at Block 207, the source node and the destination node will continue using the communication link during the time slot if the link quality value increases above a second threshold higher than the first threshold, at Blocks 208 and 209.

By way of example, if the $N\_quality_i^{L_k}$ value for the link from node k over time slot i has a range of 0 to 1, for the present example we will quantize this to three levels with hysteresis for certain network control functions. The variable $TS\_Qual_i^{L_k}$ will represent the quantized value of the $N\_quality_i^{L_k}$ variable. The new variable can take on the values of GOOD, MID, and BAD, representing three possible link quality states. The $TS\_Qual_i^{L_k}$ variable will be modified each time $N\_quality_i^{L_k}$ is modified according to the following:

$$N\_quality_i^{L_k} > T_Q^H; \text{ Set } TS\_Qual_i^{L_k} = GOOD; \quad (25)$$

$$TS\_Qual_i^{L_k} = GOOD \text{ and if } T_Q^M \leq N\_quality_i^{L_k} \leq T_Q^H,$$
$$\text{then set } TS\_Qual_i^{L_k} = GOOD; \quad (26)$$

$$TS\_Qual_i^{L_k} = GOOD \text{ and if } T_Q^L \leq N\_quality_i^{L_k} < T_Q^M,$$
$$\text{then set } TS\_Qual_i^{L_k} = MID; \quad (27)$$

$$TS\_Qual_i^{L_k} = MID \text{ and if } T_Q^L \leq N\_quality_i^{L_k} \leq T, \text{ then}$$
$$\text{set } TS\_Qual_i^{L_k} = MID; \quad (28)$$

$$TS\_Qual_i^{L_k} = BAD \text{ and if } T_Q^M \leq N\_quality_i^{L_k} \leq T_Q^H,$$
$$\text{then } TS\_Qual_i^{L_k} = MID; \quad (29)$$

$$TS\_Qual_i^{L_k} = BAD \text{ and if } T_Q^L \leq N\_quality_i^{L_k} < T_Q^M,$$
$$\text{then } TS\_Qual_i^{L_k} = BAD; \text{ and} \quad (30)$$

$$N\_quality_i^{L_k} < T_Q^L; \text{ Set } TS\_Qual_i^{L_k} = BAD. \quad (31)$$

As will be appreciated by those of skill in the art, hysteresis is introduced in the above relationships (25)–(31) to prevent excessive fluctuations in the estimated time slot states. Exemplary values for the thresholds are $T_Q^L = 0.2$, $T_Q^M = 0.5$, and $T_Q^H = 0.8$, although other values may be used depending of the given application. It should be noted herein that while the exemplary quality range is used herein extends from 0 to 1 for convenience, other ranges could also be used. When $TS\_Qual_i^{L_k} = BAD$ for a specific time slot, the scheduler preferably will not transmit any traffic over the link during that time slot unless there are no other time slots available for that link with a quality of MID or GOOD.

It should also be noted that the use of exponentially-weighted averages as set forth above is appropriate for measuring link quality of both the omni and directional links. There are a variety of link impairments that can lead to the loss of either of these links. Link quality is preferably continuously measured for both link types, and mechanisms should also be used to react to changes in link quality.

As will be appreciated by those skilled in the art, various phenomena may affect link quality. For example, the distance between two nodes may become so great that the line of sight (LOS) is lost. In this case, the link is lost until the nodes become closer in distance at some future time. The same effect is observed if a node moves behind an obstruction and remains obscured for a long period of time. In such case, both the omni and directional links will have very low quality. This would preferably trigger removal of semi-permanent time slot allocations and/or removal of the links in OLSR routing.

Another phenomenon is that a link may rapidly oscillate between having good and poor quality (a.k.a. "flapping"). This may occur, for example, when a node is rapidly moving through small obstructions. In this case both omni and directional links will be flapping. This could also potentially happen if the link quality is estimated using too small of a sample size. This case needs to be treated somewhat more carefully. The links may be too poor to be used for routing traffic while this situation persists. However, the time slot assignments may be kept for a time to determine if a high quality link can be restored.

Furthermore, the omni link could be of high quality while the directional link in a specific time slot is of low quality. Communication on this directional link with the other node could also be of good quality in other time slots assigned. This indicates that there is specific interference from other users operating in the single directional time slot of poor quality. Intermittent interference could also cause flapping of the link in this time slot. In this case the time slot should be rescheduled to eliminate the interference. Routing could still occur either if other time slots are available or if a new time slot assignment could be obtained quickly while traffic is buffered.

Several types of action are possible in response to the above-described phenomena. For example, at the link layer, it may be determined that the neighbor node is no longer reachable in a single hop. In this case, neighbor tables are updated to reflect the new state, and any directional time slots are de-allocated and marked as "free." If a time slot is declared bad due to excessive interference while the neighbor is within range, then the link scheduling protocol will attempt to allocate a new time slot that is interference-free.

At the routing layer, the routing protocol does not need to be notified of some of these actions at the link layer unless they affect connectivity. If time slots between two nodes are rescheduled but the two nodes are still connected and can exchange mission data, the routes through that link are still good. If a neighbor node is no longer reachable, then the routing protocol should find new routes that do not utilize this link.

Turning now to the problem of interference, it will be appreciated by those skilled in the art that interference is a possibility in any scheduling algorithm where time slot reuse is an objective. Generally speaking, two strategies for reducing potential and actual interference from other users in a given time slot are provided in accordance with the present invention. An interference avoidance strategy is used for initial time slot scheduling and some preemptive interference avoidance rescheduling. An interference mitigation strategy is used for cases where the avoidance strategy does not act in time to prevent actual interference. The interference mitigation strategy will act to reschedule time slots to remove the interference.

Figure 21:
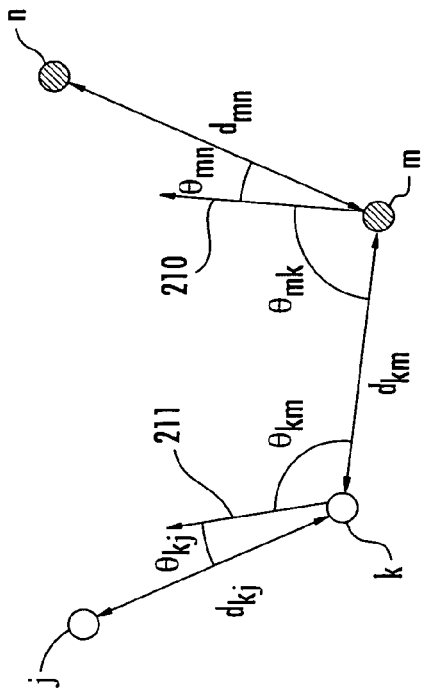
FIG. 21 is a schematic block diagram illustrating an interference avoidance scenario for two pairs of mobile nodes in a wireless communication network of the present invention.

An exemplary interference avoidance scenario is illustrated in FIG. 21. In this scenario, node m is evaluating potential interference prior to scheduling a time slot for transmissions to a neighboring mobile node n. This evaluation may be prompted by a request from node n to node m to establish an initial/additional time slot therebetween, as discussed above. The node m can look in its tables of information received via the Directional Neighbor packets to determine which of its neighbor nodes have scheduled transmissions in the same time slot. In the illustrated example, nodes k and j are potentially interfering nodes using the same time slot (illustratively shown as empty circles).

More specifically, the interference from node k at the node m illustratively traverses a distance dkm and is received at an angle $\theta_{mk}$ from the boresight (indicated by the arrow 210) of the antenna sector that node m would use in pointing to node n. In addition, the potentially interfering signal is transmitted toward node m at an angle $\theta_{km}$ from the boresight (indicated by the arrow 211) of the antenna at node k when transmitting to node j.

Figure 22:
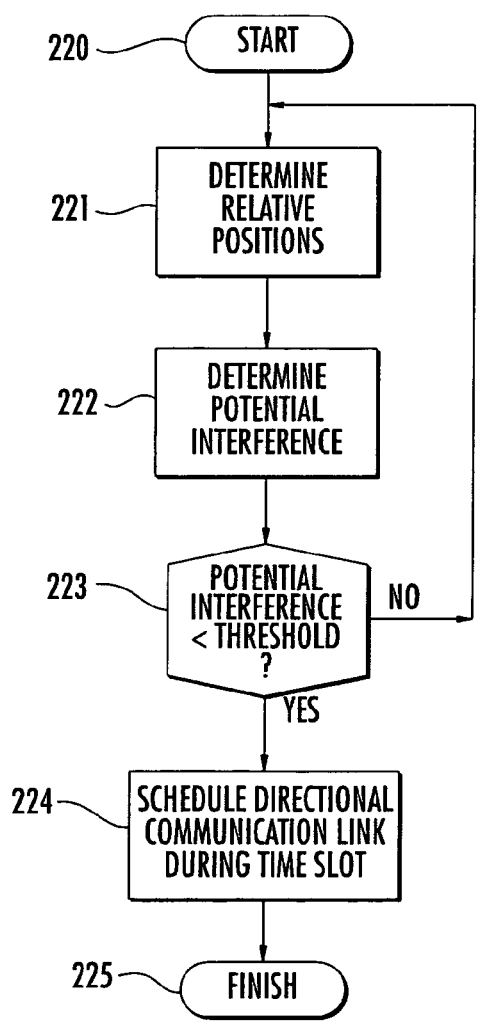
FIGS. 22 and 23 are flow diagrams illustrating an interference avoidance method in accordance with the present invention.

Whether the resulting interference is of sufficient strength to cause node m to avoid scheduling this time slot for transmissions to node n may be determined based upon several factors. Turning now to FIG. 22, one approach begins (Block 220) with determining relative positions of the neighboring mobile node n and other potentially interfering mobile nodes (here, the nodes j and k) transmitting during the time slot, at Block 222.

The potential interference to the directional communication link between nodes m and n is then determined based upon these relative positions, at Block 222. One approach for doing so is to calculate the positions based upon the respective distances and angles to the neighboring mobile node n and the potentially interfering mobile nodes k, j, as will be discussed further below. The directional communication link is then scheduled during the time slot only if the interference is below a threshold, at Block 224, thus ending the illustrated method (Block 225).

In addition to the relative positions of the nodes, the potential interference can further be determined based upon the suppression which can be achieved on the antenna sidelobes by the suppression algorithm or filter used by node m. That is, an interfering signal may be suppressed to varying degrees by the path loss of the distance $d_{km}$ and the antenna sidelobes at nodes m and k. This will be measured by a metric $M_{k,T_i}^I$ calculated for each potentially interfering node. This metric represents an interference level (in dB) received from node k in time slot $T_i$.

The information received from neighbor nodes in their HELLO and Directional Neighbor update packets will allow calculation of the distance to the node and the boresight direction of the beam used for transmissions in each time slot. For the present example, we will assume that all nodes have an antenna gain pattern as a function of the angle from the boresight given by the function $G_a(\theta)$. If the exact propagation loss in a given environment may not be known, loss as an inverse function of $d^{n_p}$ can be estimated, where d is the distance from the interfering node k to the node of interest, and $n_p$ is a constant propagation loss exponent that would typically be in the range of 2 to 4.

As an exemplary model, the path attenuation may be calculated as the maximum of the path attenuation given by the plane-earth attenuation equation and the free-space attenuation equation. For the plane-earth equation, the attenuation is:

$$L_{km}^P = 40 \cdot \log(d_{km}) - 20 \cdot \log(h_t) - 20 \cdot \log(h_r), \quad (32)$$

where the path length $d_{km}$ (the distance from node k to node m) and the respective heights $h_t$, $h_r$ of the transmitter and receiver are all in meters. The free space attenuation equation gives a path attenuation of:

$$L_{km}^{fs} = 32.45 + 20 \cdot \log(d_{km}) + 20 \cdot \log(f), \quad (33)$$

where the RF frequency, f, is in GHz. The total estimated path loss is the maximum of the two, namely:

$$L_{km}^{tot} = \max(L_{km}^{P}, L_{km}^{fs}). \tag{34}$$

As will be appreciated by those of skill in the art, the actual loss will be time-varying and may differ significantly from this calculation because of obstructions or foliage, but this constant value may be used as a reasonable approximation in evaluating effects of potential interferers. Then a theoretical metric may be calculated that is based on the signal loss at the receiving antenna at node m on the path from the potentially interfering node k for the signal transmitted from node k during time slot $T_i$ as:

$$M_{k,T_i}^{I} = -L_{km}^{tot} + G_a(\theta_{km}), \tag{35}$$

where $\theta_{km}$ is the angle from the boresight at node k of the signal direction toward node m. This metric can be used at node m for calculating interference effects for allocating time slot $T_i$ to any other neighbor node.

The foregoing metric does not incorporate the effects of the sidelobe suppression of the interfering signal at node m because this depends on which neighbor node is being considered for being scheduled during time slot $T_i$. However, when considering any neighbor node for this time slot, such as node n, a new metric can be calculated from $M_{k,T_i}^{I}$ which includes the sidelobe suppression at node m as:

$$M_{k,T_i}^{I,mn} = M_{k,T_i}^{I} + G_a(\theta_{mk}). \tag{36}$$

Then the maximum interference level for interference from the link L between of the node pair k, j communicating in time slot $T_i$ received at node m is given by the maximum level received either from node k or node j, i.e., $$N_{L,T_i}^{mn} = \max_{k,j}(M_{k,T_i}^{I,mn}, M_{j,T_i}^{I,mn}). \tag{37}$$

As such, the total interference received at node m in time slot $T_i$ is the sum of the interference received from all links L operating in time slot $T_i$, i.e., $$N_{T_i}^{mn} = 10 \cdot \log\left[\sum_L 10^{N_{L,T_i}^{mn}/10}\right]. \tag{38}$$

In most cases an approximation of this quantity is sufficient. With a small number of potential interferers in any time slot, it is unlikely that two or more interferers will have nearly equal power. In this case, we can calculate the approximate value of interference as $$N_{T_i}^{mn} \approx \max_L(N_{L,T_i}^{mn}). \tag{39}$$

Then, since actual signal-to-interference will depend strongly on the ratio of the distance to the desired target node relative to the distance to the interfering node, we can calculate a theoretical SIR metric for time slot $T_i$ as:

$$SIR_{mn}^{T_i} = N_{T_i}^{mn} + L_{mn}^{tot}. \tag{40}$$

Figure 23:
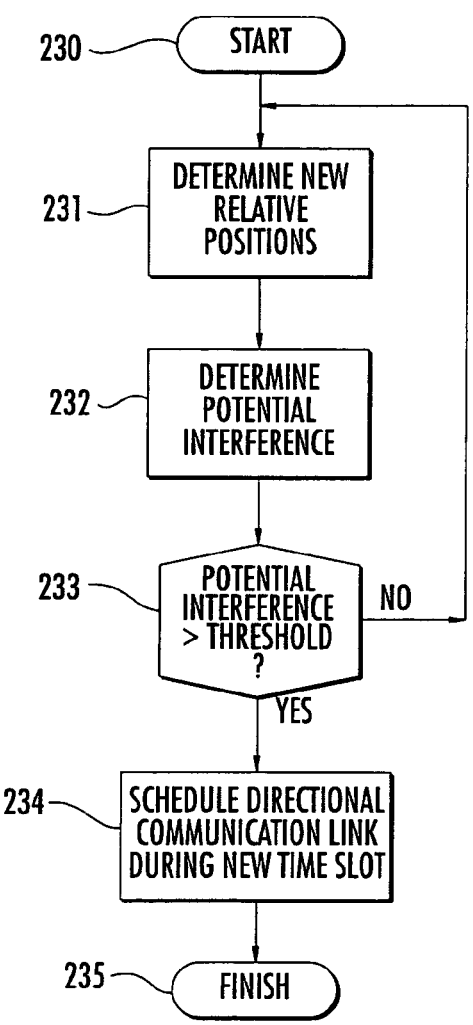

The foregoing metrics are in dB, and they can be used to provide interference avoidance in initially scheduling a time slot for any neighbor node. In addition, they can advantageously be used in intermittently checking to determine if a currently scheduled time slot is beginning to experience or likely to experience an increased level of interference. This approach is illustrated in FIG. 23, which begins (Block 230) with node m intermittently determining the relative positions of the neighboring mobile node n and other potentially interfering nodes, at Block 231. It should be noted that since the nodes are mobile, the potentially interfering nodes may have changed in the interim. That is, the nodes j and k may or may not still be potentially interfering nodes, and other potentially interfering nodes may have come within range of node m in the interim.

In any event, once the new relative positions to the new potentially interfering nodes are determined, the potential interference to the directional communication link is determined based thereon, at Block 232, as previously described above. If the potential interference is above the above-referenced interference threshold, at Block 233, then the directional communication link is scheduled during a new time slot, at Block 234, thus concluding the illustrated method (Block 235). Of course, a different threshold could be used, such as to introduce hysteresis, as described above.

The above-described interference equations provide a useful model for the time slot prioritization that is preferably accounted for when determining the appropriate allocation of time slots. Of course, in practice calculating each of the above metrics every time interference is to be determined may require significant processing resources. As such, it may be advantageous to pre-compute a set of ranges of the input/output values or ratios and store them in a look-up table 18g in the controller 18 to calculate SIR, as will be appreciated by those of skill in the art.

Figure 24:
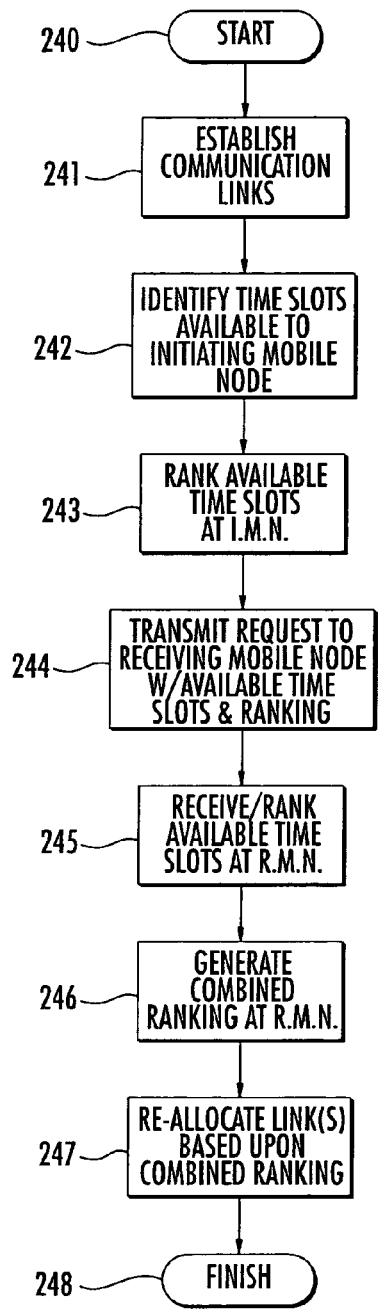
FIGS. 24 and 25 are flow diagrams illustrating a method for re-allocating time slots in accordance with the present invention.

Turning now additionally to FIG. 24, SP and DA time slot re-allocation will now be discussed in further detail. First, we will consider the initial scheduling of a new SP or DA time slot between the node m and its neighbor node n (see FIG. 21). As an initial matter, it is assumed herein that when allocating a new SP time slot, any "free" time slots or DA time slots are available for allocation with the "free" time slots of higher priority than the DA time slots. The DA time slots are also preferably ordered with the smallest value of demand metric as the highest priority for re-allocation. A similar process is followed when allocating a new DA time slot except that existing time slot allocations with a demand metric larger than a certain amount are not available for re-allocation, as noted above.

The initial scheduling process may also be augmented by considering estimated interference levels and the prioritized traffic demand metric as prioritization metrics, as discussed above. Thus, the process of rank ordering potential time slots is more complex with these two metrics.

Generally speaking, re-allocation of time slots may begin (Block 240) following establishment of the initial time slots, at Block 241, as discussed above. In accordance with the present example, the initiating mobile node n will identify available time slots shared with its neighboring mobile nodes, at Block 242, and rank the available time slots based upon link utilization during the time slots by the initiating mobile node and the neighboring mobile nodes, at Block 243. The initiating mobile node n then transmits a time slot re-allocation request to the receiving mobile node m including the available time slots and ranking thereof, at Block 244.

As such, the receiving mobile node m will in turn receive the time slot re-allocation request and rank the available time slots based upon link utilization during the available time slots by the receiving mobile node and mobile nodes neighboring the receiving mobile node, at Block 245. Further, node m then generates a combined ranking of the available time slots, at Block 246, based upon the rankings thereof by the initiating mobile node and the receiving mobile node. The receiving mobile node m may then re-allocate one or more of the available time slots for establishing a communication link between the initiating mobile node and the receiving mobile node based upon the combined ranking, at Block 247, thus concluding the illustrate method, at Block 248.

Figure 25:
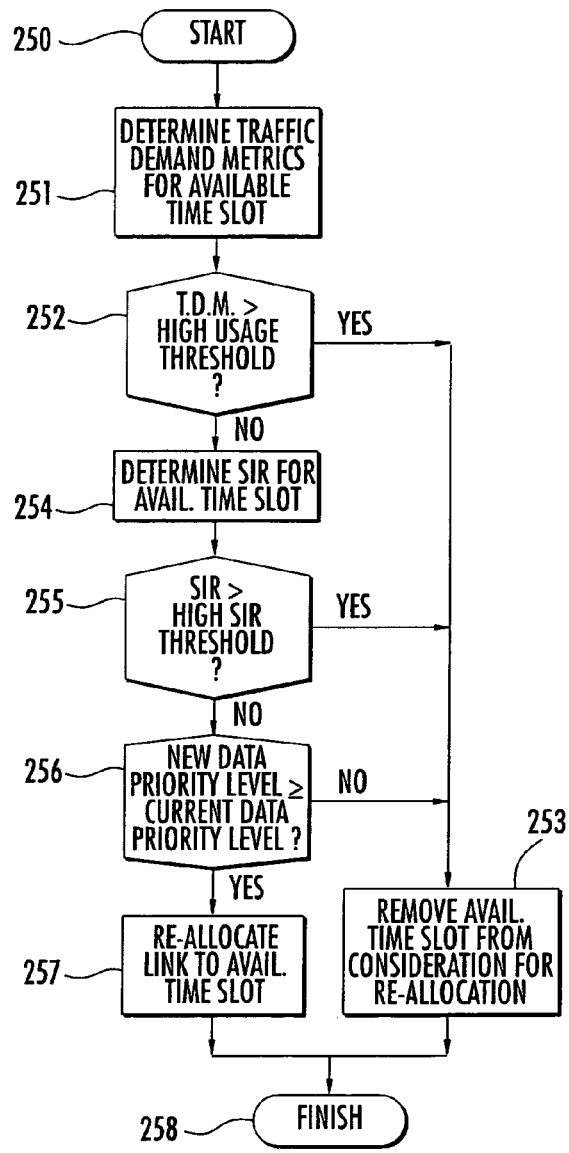

With further reference to FIG. 25, the above re-allocation method may also advantageously include various other features in certain embodiments. Beginning at Block 250, the initiating mobile node n and the receiving mobile node m may each determine a traffic demand metric associated with each available time slot, at Block 251, as described above, and remove from consideration for re-allocation any available time slot having a traffic demand metric associated therewith above a high usage threshold, at Blocks 252 and 253.

Similarly, the initiating mobile node n and receiving mobile node m may also each determine an SIR value associated with each available time slot, at Block 254, and remove from consideration for re-allocation any available time slots having an SIR value associated therewith above a high SIR threshold, at Blocks 255 and 253. It should also be noted that the initiating mobile node n and the receiving mobile node m may also use the SIR values in the ranking of the time slots (Blocks 243, 245 in FIG. 24).

These rankings could also take into account increased and/or decreased link utilization metrics, as were previously described above. Moreover, the initiating mobile node n and the receiving mobile node m may each rank the available time slots based upon an average quantity of data transmitted therein and/or an amount of data stored in their queues 18f, as was also discussed above.

Moreover, since the initiating mobile node n and the receiving mobile node m will preferably transmit data having a plurality of priority levels, the receiving mobile node m can prohibit re-allocation of an available time slot if data to be transmitted during the available time slot does not have has an equal or greater priority level than data currently being transmitted during the available time slot, at Blocks 256 and 253. Otherwise, the link can be re-allocated (Block 257) as previously described above, thus concluding the illustrated method, at Block 258.

More specifically, exemplary algorithms will now be provided for performing the above-described ranking of time slots. However, before giving the algorithms for rank-ordering potential time slots that may be re-allocated to the link between nodes m and n, we will first define a term MetLim$_{mn}$ to ensure that no time slots will be re-allocated from another link to the link between nodes m and n unless it is needed to carry higher priority traffic, as noted with reference to Block 256, above. Again assuming the example with three priority classes, MetLim$_{mn}$ is defined as:

If $M_{mn}^{DA}(T_{mn}^{P_j}, N_{mn}^{tot})/K_s > 2$ then $MetLim_{mn}=2$, (41)

Else if $M_{mn}^{DA}(T_{mn}^{P_j}, N_{mn}^{tot})/K_s > 1$ then $MetLim_{mn}=1$, (42)

Else $MetLim_{mn}=0$. (43)

To illustrate the overall approach, first consider the approach for rank ordering the time slots when the interference metrics are not considered. We begin by rank ordering all other time slots not assigned to the link between nodes m and n (i.e., those assigned between node m and one of its neighbor nodes r, not shown) according to the following time slot prioritization approach, which considers priority of traffic demand in allocating new time slots but does not include the effects of interference.

In particular, when a new time slot is required to be allocated between nodes m and n, a list of available time slots is created from free and DA time slots. These time slots are then be rank ordered at the requesting or initiating node n prior to sending a list of potential time slots to the receiving node m. Available time slots are rank ordered using the prioritized traffic demand metric $M_{mr}^{DA}(T_{mr}^{P_j}, (N_{mr}^{tot}-1))$. Note the use of $(N_{mr}^{tot}-1)$ in this metric, which indicates the value of the metric if a time slot is taken away from the link between nodes m and r.

The following approach is recommended for this ordering. The highest ranking time slots are the time slots that are free. The remaining time slots are rank ordered in inverse order of the traffic demand metric $M_{mr}^{DA}(T_{mr}^{P_j}, (N_{mr}^{tot}-1))$. If the new time slot to be allocated is a DA time slot, then all time slots are eliminated which are carrying equal or higher priority traffic, i.e., $$M_{mr}^{DA}(T_{mr}^{P_j},(N_{mr}^{tot}-1)) > MetLim_{mr}.$$ (44)

This ensures that only traffic of lower priority is lost in the re-allocation process.

A rank ordered list of time slots (according to the above criteria) is included in the REQ message sent by the requesting node n, as noted above. The receiving node m receives the REQ message and takes the list of rank ordered time slots and rank orders these time slots according to the method described above using the priority traffic demand. Then the remaining time slots are given a combined ranking from the rankings determined by the two nodes, and the time slot is selected which has the best combined ranking, as also noted above.

If the metric $M_{ik}^{DA}(T_{ik}^{P_j},(N_{ik}^{tot}+1)) > 0$, this indicates that another time slot will be needed even after allocating the first time slot. This metric can then be compared with the metrics for the links to other neighbors to see if a second time slot should be requested, or if another link now has a more urgent need for an additional time slot. In the latter case, the next time slot allocation is preferably given to that link with the largest metric.

The foregoing approach may also advantageously be enhanced in some embodiments to account for traffic priority as described above. The following approach is recommended for rank-ordering potential time slots with interference. Received interference levels $M_{n,T_i}^I$ are maintained for each neighbor node and each time slot. These levels are preferably updated periodically, e.g., about once per second with new position updates.

When a new time slot is required to be allocated between nodes m and n, a list of available time slots is created from free and DA time slots. These time slots are then rank ordered or prioritized at the requesting node n prior to sending a list of potential time slots to the receiving node m. Thus, to rank-order the time slots, the total received interference power may be evaluated after receiving antenna suppression for each neighbor. The total estimated interference power received $N_{T_i}^{mn}$ may then be calculated, as will be appreciated by those of skill in the art.

The available time slots allocated to neighbor nodes may then be ranked using the prioritized traffic demand metric $M_{mr}^{DA}(T_{mr}^{P_j},(N_{mr}^{tot}-1))$ and the interference metric $N_{T_i}^{mn}$. Note the use of $(N_{mn}^{tot}-1)$ in this metric, which indicates the value of the metric if a time slot is taken away from the link between nodes m and r. For this rank-ordering, it is preferred that the highest ranking time slots are the time slots that are free or are DA time slots that have a prioritized traffic demand metric $M_{mr}^{DA}(T_{mr}^{P_j},(N_{mr}^{tot}-1) \leq T_{DA}^{L}$ less than a predetermined threshold. In other words, these are time slots that are either not being used (free) or are almost never used. These time slots are then rank ordered according to the level of estimated interference power $N_{T_i}^{mn}$, with the lowest values of $N_{T_i}^{mn}$ assigned the highest rank.

The next time slots in order of rank are the remaining DA time slots that have a prioritized traffic demand metric $M^{mDA}(T_{mr}^{P_j},(N_{mr}^{tot}-1)) \leq T_{DA}^{H}$ less than a higher threshold value, and simultaneously have very high $SIR_{min}^{T_i}$ for the time slot indicated by exceeding a threshold $SIR_{min}^{T_i} > T_{SIR}^{H}$. These time slots are rank ordered according to the prioritized traffic demand metric with smallest demand metric indicating highest rank. These time slots are ranked below those previously calculated.

The remaining DA time slots that satisfy $M^{mDA}(T_{mr}^{P_j},(N_{mr}^{tot}-1)) \leq T_{DA}^{H}$ but do not satisfy $SIR_{mn}^{T_i} > T_{SIR}^{H}$ are rank ordered according to the highest value of $SIR_{mn}^{T_i}$. These time slots are ranked below those previously calculated. Further, the remaining DA time slots are ranked below those previously calculated. These time slots are rank ordered according to the prioritized traffic demand metric with smallest prioritized traffic demand metric indicating highest rank. Of course, it will be appreciate that the above ranking approach is exemplary and that other approaches may also be used within the scope of the present invention.

Any time slots in the previous priority ranking are preferably eliminated from consideration for re-allocation if the time slot predicted signal-to-interference ratio is:

$$SIR_{mn}^{T_i} < T_{SIR}^{L}. \tag{45}$$

This eliminates from consideration any time slots for which interfering nodes might cause too low an SIR. Furthermore, if the new time slot to be allocated is a DA time slot, then all of time slots are preferably eliminated which are carrying equal or higher priority traffic, i.e., $$M_{mr}^{DA}(T_{mr}^{P_j},(N_{mr}^{tot}-1)) > MetLim_{mr}. \tag{46}$$

This ensures that only traffic of lower priority is lost in the re-allocation process.

As noted above, a rank ordered list of time slots (according to the above criteria) is included in the REQ message sent by the requesting node. The receiving node m receiving the REQ message takes the list of rank ordered time slots and rank-orders these time slots according to the same method described above using demand and interference metrics it calculates. This preferably includes eliminating any time slots that fail the SIR, interfering node distance, and interfering node angle thresholds, or that are unavailable at the receiving node. Then the remaining time slots are given a combined ranking from the rankings determined by the two nodes, and the time slot is selected which has the best combined ranking.

If the metric $M_{ik}^{DA}(T_{ik}^{P_j},(N_{ik}^{tot}+1)) > 0$, this indicates that another time slot will be needed even after allocating the first time slot. This metric can then be compared with the metrics for the links to other neighbors to see if a second time slot should be requested, or if another link now has a more urgent need for an additional time slot. In the latter case, the next time slot allocation should preferably be to that link with the largest metric.

After a time slot is allocated, it will be continually monitored as part of the interference avoidance and mitigation approach. In addition, the omni link quality is continually measured. If the quality of the omni link goes bad (indicating a loss of LOS or too much distance to the other node), then the link is declared down and the routing algorithm (e.g., OLSR) is notified of the loss of link. This will initiate rerouting at the network layer. As long as the omni link is still good, then the individual time slots must still be monitored for interference.

The following discussion illustrates how potential or existing interference on directional time slots is evaluated when the omni link is of good quality. There will be situations where the link quality indicators show that the omni link to a given neighbor node is good, but one of the directional time slots allocated to that node is very unreliable. This will be an indication of excessive interference on that time slot that has not been prevented by the interference avoidance techniques described above.

There are several situations that can cause such interference which are typically initiated by movement. These include, for example, rapid change of the direction of arrival of the desired signal, rapid change of the direction of arrival of the interfering signal, increasing number of interferers, and changes in distance between a node and its target node and the interfering nodes.

Figure 26:
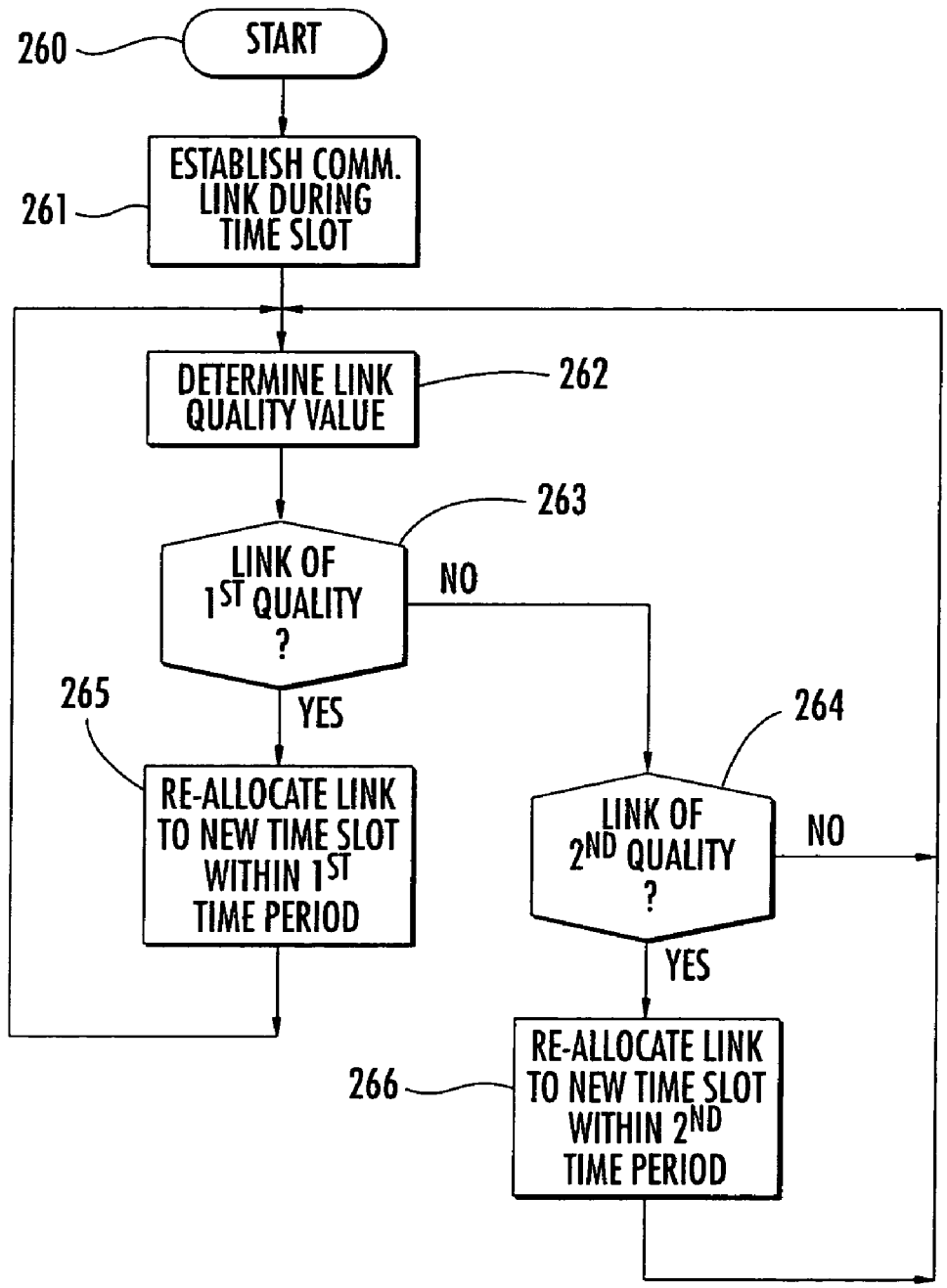
FIGS. 26–28 are flow diagrams illustrating a method for re-allocating time slots within different time periods based upon link quality in accordance with the present invention.

An overview of the interference monitoring/mitigation approach in accordance with the invention will now be described with reference to FIG. 26. Beginning at Block 260, after a communication link is established between the pair of mobile nodes m and n during one or more time slots (Block 261), as described above, at least one of the nodes determines a link quality value associated with the communication link during the time slot(s), at Block 262. This node then determines if the communication link is of a first (marginal) or a second (poor) quality, at Blocks 263 and 264.

In accordance with the invention, the mobile nodes cooperate to re-allocate the communication link to a new time slot within a first time period if the communication link is of marginal quality during a given time slot, at Block 265. Further, if the communication link is of poor quality during a given time slot, the nodes then cooperate to re-allocate the communication link to a new time slot within a second time period shorter than the first time period, at Block 266. That is, if link quality is severely degraded, the time slot may be allocated relatively quickly (i.e., within the second shorter time period) to minimize disruption to communications. On the other hand, if link quality is marginal but still usable, re-allocation of the time slot may be delayed longer (i.e., within the longer first time period), which may reduce conflicts between competing pairs of nodes attempting to re-allocate time slots simultaneously.

Figure 27:
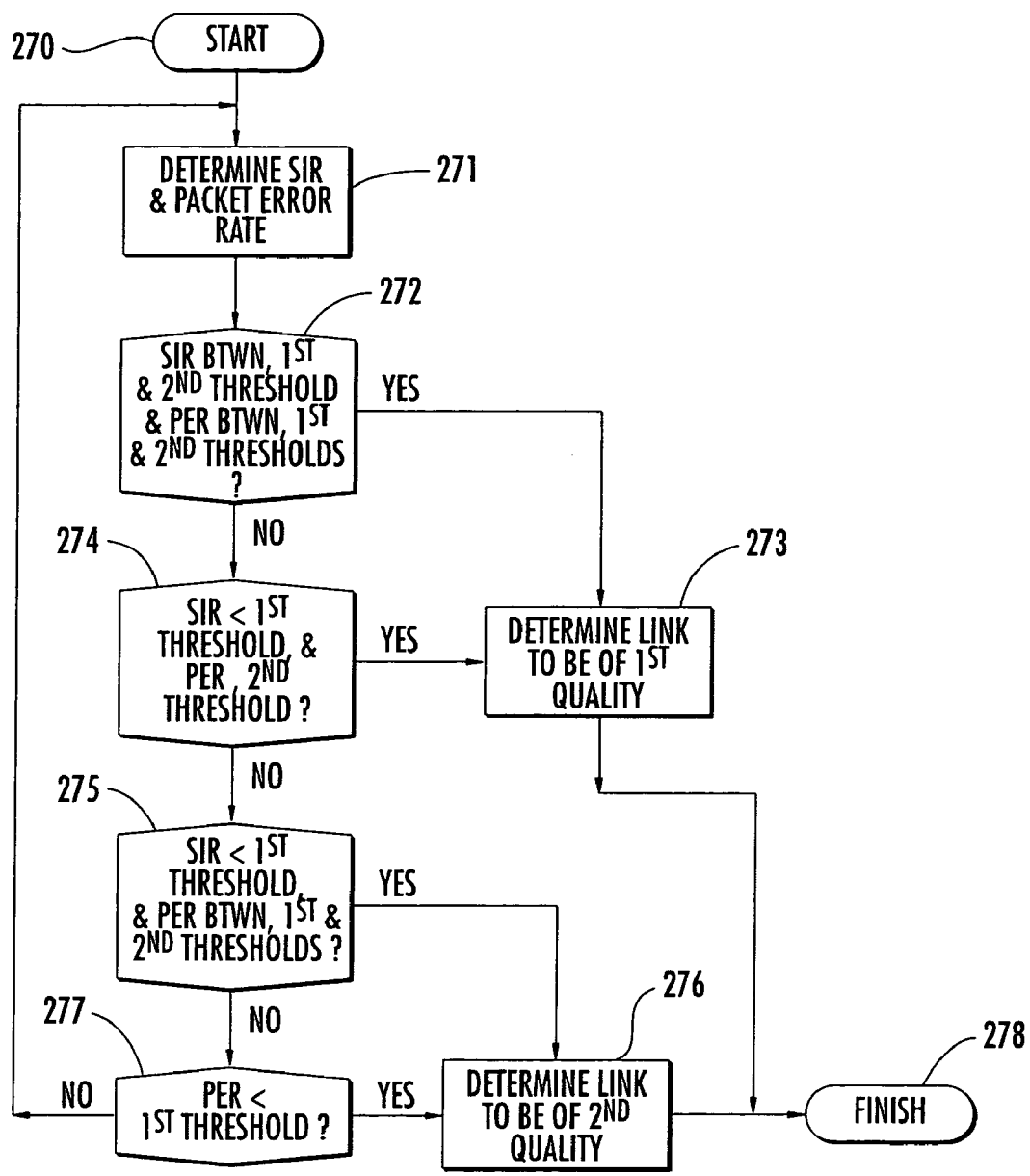

The steps generally illustrated at Blocks 262–264 are illustrated in further detail in FIG. 27. In particular, the link quality value is preferably determined based upon the SIR and packet reception error value (PREV), as described above, at Block 271. As will be described further below, the communication link is preferably determined to be of marginal quality if the SIR is between a first SIR threshold and a second SIR threshold (which is higher than the first quality threshold), and the PREV is between a first error threshold and a second error threshold (which is higher than the first error threshold), at Blocks 272 and 274, concluding this aspect of the method (Block 278).

Similarly, the communication link is also preferably determined to be of marginal quality if the SIR is less than the first SIR threshold and the PREV is greater than the second error threshold, at Blocks 274 and 273. Additionally, if the SIR is less than the first SIR threshold and the PREV is between the first error threshold and the second error threshold, the communication link is determined to be of poor quality, at Block 275 and 276. Also, the communication link is determined to be of poor quality if the quality factor is below the first error threshold.

Figure 28:
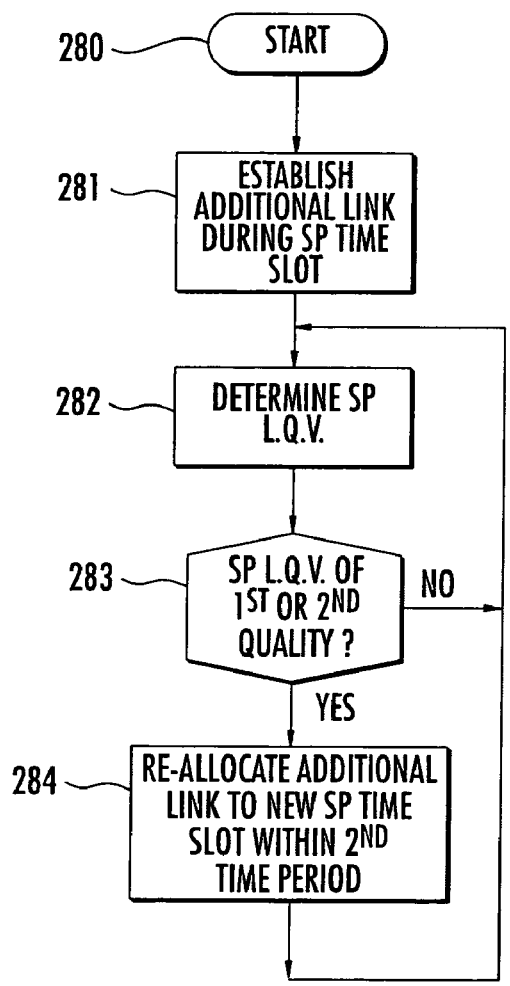

The above-described approach is particularly well suited for demand assigned time slots. For semi-permanent time slots, it may in some applications be appropriate to re-allocate these time slots relatively quickly. As such, referring now to FIG. 28, beginning at Block 280, after the initial establishment of an SP time slot, at Block 281, a semi-permanent link quality value associated with the communication link during the semi-permanent time slot is determined, at Block 282, as similarly described above for the DA time slots. If the additional communication link is determined to be of either marginal or poor quality during the semi-permanent time slot based upon the semi-permanent link quality value, at Block 283, then the link is re-allocated to a new SP time slot within the relatively short second time period, at Block 284. Otherwise, the link quality value will continue to monitored, as illustratively shown.

The above-outlined interference avoidance and mitigation procedure will now be described in further detail with reference to particular equations for calculating he above-noted variables. Again, several key variables will be periodically re-calculated for each time slot and for each interfering node. These include the link quality $N\_quality_i^{L_k}$ and its quantized value $TS\_Qual_i^{L_k}$ for each time slot i for each directional link $L_k$; the potential $SIR_{mn}^{T_i}$ for time slot I; and the omni link status $Can\_Alloc^{L_k}$.

These variables will be indicators of interference or potential interference on time slot i. Minor degradation in these variables will initiate a more leisurely attempt (i.e., within the first relatively long time period) to reschedule a more favorable time slot in order to avoid potential interference. Since the interfering node pair(s) may have also detected this condition, the leisurely backoff will reduce the probability that both node pairs will reschedule at the same time and possibly introduce another conflict.

As such, if the interfering node pair decides to reschedule first, this may eliminate the need for rescheduling. For this "slow" backoff approach (i.e., within the first time period), the rescheduling operation will be initiated with probability $p_{rs}^{slow}$ at a random time over the next $\Delta T_R$ seconds. If it is not initiated, then the tests will be performed again when the variables are again recalculated (about once per second). If the tests are failed again, then the rescheduling operation will be initiated with probability $p_{rs}^{slow}$ at a random time over the next $\Delta T_R$ seconds. This testing process will go on as long as the potential interference condition exists.

Detection of existing severe degradation will require more immediate rescheduling to avoid existing excessive interference. In this case the "fast" backoff approach is to initiate rescheduling of the time slot within the second relatively short time period. By way of example, this may be within the next directional epoch, for example, and this is done with probability $p_{rs}^{fast}$. If rescheduling is not initiated within this epoch, then it is initiated within the next epoch with probability $p_{rs}^{fast}$, and so on.

The decision between doing no re-allocation of a current time slot assignment and doing either slow or fast backoff toward re-allocation is preferably based on the following criteria. First, re-allocation of the time slot is not considered if the time slot i for the link between nodes m and n satisfies either of the following conditions:

$$SIR_{mn}^{T_i} > T_{SIR}^{M} \text{ and } TS\_Qual_i^{L_k} = \text{GOOD or } MID; \text{ and} \qquad (47)$$

$$SIR_{mn}^{T_i} > T_{SIR}^{L} \text{ and } TS\_Qual_i^{L_k} = \text{GOOD}. \qquad (48)$$

Furthermore, a slow backoff toward re-allocation of the time slot is used if the time slot i for the link between nodes m and n satisfies either of the following conditions (fast backoff if it is the only time slot for the link between nodes m and n):

$$T_{SIR}^{L} \leq SIR_{mn}^{T_i} \leq T_{SIR}^{M} \text{ and } TS\_Qual_i^{L_k} = MID; \text{ and} \qquad (49)$$

$$SIR_{mn}^{T_i} < T_{SIR}^{L} \text{ and } TS\_Qual_i^{L_k} = \text{GOOD}. \qquad (50)$$

Also, a fast backoff toward re-allocation of the time slot is used if the time slot i for the link between nodes m and n satisfies either of the following conditions:

$$SIR_{mn}^{T_i} < T_{SIR}^{L} \text{ and } TS\_Qual_i^{L_k} = MID; \text{ and} \qquad (51)$$

$$TS\_Qual_i^{L_k} = \text{BAD}. \qquad (52)$$

The time slot is de-allocated and the routing protocol (e.g., OLSR) is notified that the link between nodes m and n has been lost if the following conditions are satisfied:

$$TS\_Qual_i^{L_k} = \text{BAD and } Can\_Alloc^{L_k} = \text{FALSE for at least } T_B \text{ seconds}. \qquad (53)$$

As briefly discussed above, once rescheduling is determined to be necessary either through fast or slow backoff, certain precautions may be desirable if time slot i is an SP time slot. Because of the importance of SP time slots it is important that this time slot not be degraded. If the time slot is the only time slot allocated between nodes m and n, then fast backoff is preferably done even if the conditions listed below would indicate that a slow backoff is satisfactory.

The other case is when nodes m and n have several time slots allocated. If slow backoff is otherwise indicated for an SP time slot, then node m can immediately notify node n that one of their DA time slots should be made the SP time slot, thereby letting the current time slot assume the less critical role of DA time slot. If no other time slots allocated to nodes m and n are of sufficient quality to rename as the SP time slot, then fast backoff is used to reschedule the SP time slot i. If the time slot i is a DA time slot or can be made a DA time slot, then the fast or slow backoff decision decided by the criteria below is used.

In particular, the time slot being re-allocated is not de-allocated until the new time slot allocation is made. After the new time slot is obtained, the old questionable or bad time slot can be de-allocated. It is preferred that forwarding of packets over a time slot of "low" quality ($TS\_{Quali}^{L_k}$=BAD) be discontinued if another time slot is available for the link between nodes m and n.

A simple interface with the Optimized Link State Routing (OLSR) routing algorithm may be included in the present invention and is discussed below with reference to FIGS. 2 and 29. As is known to those skilled in the art, with OLSR, link state information can quantify the status of a link. Complete topology information is maintained and neighbor topology information is periodically broadcast to all other nodes in the network to allow them to construct complete network topology. Most of the activity surrounding allocation and reallocation of time slots to meet traffic demands and mitigation of interference should be hidden from OLSR. An issue arises when there are several time slots allocated to a link with a neighbor node, e.g., a link to neighbor node k has m time slots, $i_1, i_2, \ldots, i_m$. If one or more, but not all of the time slots are determined to be of poor quality due to interference, then rescheduling of the time slots could be initiated. As long as at least one time slot to the neighbor node is still of high quality, then the nodes are still connected neighbors, and no changes are needed in routing tables.

Thus, there is no need to cause OLSR to react to this. The link does experience a loss of some capacity during the rescheduling, which may be of concern, but there is nothing that OLSR should do. If all of the time slots are of poor quality, then OLSR must be allowed to react and reroute data through other links. The following link quality measure is defined for the link to node k as the maximum quality of each of the time slots allocated to that link.

$$N\_quality^L = {}_{All\_TS\_for\_L_k}\max (N\_quality_i^{L_k}) \quad (54)$$

The quality measure, $N\_quality^{L_k}$, for the link to node k can then be reported to OLSR each time it changes. This quality measure will replace the quality measure that OLSR typically calculates from received HELLO packets. It will replace the standard OLSR quality measure, but it will then be used by OLSR in exactly the same way. As is typically done in OLSR, a hysteresis function may be applied to it to reduce "link flapping" as seen by OLSR. If the link quality becomes too poor, then the link will be declared "down" and OLSR will automatically send new status information in its HELLO and TC update packets and recalculate routes.

More specifically, the controller 18 (FIG. 2) preferably includes a communications router 18*i* to discover routes and route communications to neighboring nodes with a routing protocol, such as OLSR. The time slot scheduling unit 18*a*/18*b* schedules time slots to establish the communication link with each neighboring mobile node, and an antenna aiming unit 18*c* aims the directional antenna toward each neighboring mobile node during communication therewith. Here, a link quality estimator 18*h* is provided to estimate link quality based upon the quality of each time slot scheduled for the communication link and to report estimated link quality to the communications router 18*i*.

As discussed above, the estimated link quality may be defined as the maximum quality of each time slot scheduled for the communication link, and the router 18*i* may route communications to neighboring nodes based upon the estimated link quality. The communication link is preferably maintained as long as the maximum quality of at least one time slot for the link is above a predetermined threshold, and the router 18*i* initiates new route discovery when the estimated link quality for the link is below the predetermined threshold. The router 18*i* may perform a hysteresis function to the estimated link quality reported from the link quality estimator.

Figure 29:
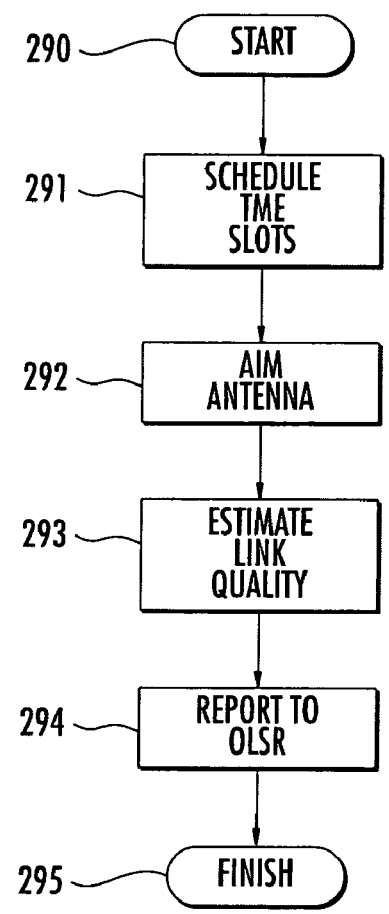
FIG. 29 is a flow diagram illustrating a method for estimating and reporting link quality to a routing protocol in accordance with the present invention.

Referring to FIG. 29, the general steps of this method aspect of the present invention are now described. The method begins at Block 290, time slots are scheduled and the antenna is aimed, in accordance with the approaches discussed above, at Blocks 291 and 292, respectively. At Block 293 the link quality is estimated, and reported to the communications router 18*i* or OLSR as indicated in Block 294, before the method ends at Block 295.

The present invention thus provides a fully distributed link scheduling algorithm and protocol for phased array networks. It should be noted that the above description of the algorithm/protocol details assumed the case of a single directional beam per node, which is time-shared and pointed toward neighbor nodes during the allocated time slot for that access. However, the approach can be used for any number of steered beams per node.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A wireless communication network comprising:
 a plurality of mobile nodes each comprising a transceiver,
  a directional antenna connected to said transceiver, and
  a controller connected to said transceiver and comprising
   a communications router to discover routes and route communications to neighboring nodes with a routing protocol,
   a time slot scheduling unit to schedule time slots to establish a communication link with each neighboring mobile node,
   an antenna aiming unit to aim said directional antenna toward each neighboring mobile node during communication therewith, and
   a link quality estimator to estimate link quality based upon the quality of each time slot scheduled for the communication link and to report estimated link quality to the communications router.

2. A wireless communication network according to claim 1, wherein the estimated link quality is defined as the maximum quality of each time slot scheduled for the communication link.

3. A wireless communication network according to claim 2, wherein the router routes communications to neighboring nodes based upon the estimated link quality.

4. A wireless communication network according to claim 3, wherein the communication link is maintained by the router as long as the maximum quality of at least one time slot for the link is above a predetermined threshold.

5. A wireless communication network according to claim 4, wherein the router initiates new route discovery when the estimated link quality for the link is below the predetermined threshold.

6. A wireless communication network according to claim 1, wherein the router performs a hysteresis function to the estimated link quality reported from the link quality estimator.

7. A wireless communication network according to claim 1, wherein a plurality of communication links are established within a scheduled time slot, with each communication link including a different pair of neighboring mobile nodes.

8. A wireless communication network according to claim 1, wherein said directional antenna comprises a phased array antenna.

9. A wireless communication network comprising: a plurality of mobile nodes each comprising a transceiver, a directional antenna connected to said transceiver, and a controller connected to said transceiver to discover routes and route communications to neighboring nodes with an Optimized Link State Routing (OLSR) protocol, to schedule time slots to establish a communication link with each neighboring mobile node, to aim said directional antenna toward each neighboring mobile node during communication therewith, and to estimate link quality based upon the quality of each time slot scheduled for the communication link and to report estimated link quality for use by the OLSR protocol.

10. A wireless communication network according to claim 9, wherein the estimated link quality is defined as the maximum quality of each time slot scheduled for the communication link.

11. A wireless communication network according to claim 10, wherein the controller routes communications to neighboring nodes based upon the estimated link quality.

12. A wireless communication network according to claim 11, wherein the communication link is maintained by the controller as long as the maximum quality of at least one time slot for the link is above a predetermined threshold.

13. A wireless communication network according to claim 12, wherein the controller initiates new route discovery when the estimated link quality for the link is below the predetermined threshold.

14. A wireless communication network according to claim 9, wherein the controller performs a hysteresis function to the estimated link quality reported from the link quality estimator.

15. A wireless communication network according to claim 9, wherein a plurality of communication links are established within a scheduled time slot, with each communication link including a different pair of neighboring mobile nodes.

16. A wireless communication network according to claim 9, wherein said directional antenna comprises a phased array antenna.

17. A mobile node for a wireless communication network, the mobile node comprising:
   a transceiver;
   a directional antenna connected to said transceiver; and
   a controller connected to said transceiver and comprising
      a communications router to discover routes and route communications to neighboring nodes with an Optimized Link State Routing (OLSR) algorithm,
      a time slot scheduling unit to schedule time slots to establish a communication link with neighboring mobile nodes,
      an antenna aiming unit to aim said directional antenna toward each neighboring mobile node during communication therewith, and
      a link quality estimator to estimate link quality based upon the quality of each time slot scheduled for the communication link and to report estimated link quality to the communications router.

18. A mobile node according to claim 17, wherein the estimated link quality is defined as the maximum quality of each time slot scheduled for the communication link.

19. A mobile node according to claim 18, wherein the router routes communications to neighboring nodes based upon the estimated link quality.

20. A mobile node according to claim 19, wherein the communication link is maintained by the router as long as the maximum quality of at least one time slot for the link is above a predetermined threshold.

21. A mobile node according to claim 20, wherein the router initiates new route discovery when the estimated link quality for the link is below the predetermined threshold.

22. A mobile node according to claim 17, wherein the router performs a hysteresis function to the estimated link quality reported from the link quality estimator.

23. A mobile node according to claim 17, wherein a plurality of communication links are established within a scheduled time slot, with each communication link including a different pair of neighboring mobile nodes.

24. A mobile node according to claim 17, wherein said directional antenna comprises a phased array antenna.

25. A method for establishing communication links for a plurality of mobile nodes, each mobile node comprising a transceiver, a directional antenna connected to the transceiver, and a controller connected to the transceiver, the method comprising for each mobile node:
   scheduling time slots to establish a communication link with each neighboring mobile node;
   aiming the directional antenna toward each neighboring mobile node during communication therewith;
   estimating link quality based upon the quality of each time slot scheduled for the communication link; and
   reporting estimated link quality for use by an Optimized Link State Routing (OLSR) protocol.

26. A method according to claim 25, wherein the estimated link quality is defined as the maximum quality of each time slot scheduled for the communication link.

27. A method according to claim 26, wherein OLSR routes communications to neighboring nodes based upon the estimated link quality.

28. A method according to claim 27, wherein the communication link is maintained by OLSR as long as the maximum quality of at least one time slot for the link is above a predetermined threshold.

29. A method according to claim 28, wherein OLSR initiates new route discovery when the estimated link quality for the link is below the predetermined threshold.

30. A method according to claim 25, wherein OLSR performs a hysteresis function to the reported estimated link quality.

31. A method according to claim 25, wherein a plurality of communication links are established within a scheduled time slot, with each communication link including a different pair of neighboring mobile nodes.

32. A method according to claim 25, wherein said directional antenna comprises a phased array antenna.

* * * * *

UNITED STATES PATENT AND TRADEMARK OFFICE
CERTIFICATE OF CORRECTION

PATENT NO. : 7,027,409 B2
APPLICATION NO. : 10/400997
DATED : April 11, 2006
INVENTOR(S) : Joseph Bibb Cain It is certified that error appears in the above-identified patent and that said Letters Patent is hereby corrected as shown below:

Column 19, Line 37    Delete: "Pseudocode"
Insert: -- Pseudocode --

Column 33, Lines 63 and 64    Delete: "$N\_quality_{omni}^{L_k}$"

Insert: -- $N\_quality_{omni}^{L_k}$ --

Column 33, Line 67    Delete:

"$N\_quality_{omni}^{L_k} = (1-\alpha) \cdot N\_quality_{omni}^{L_k} + \alpha$."

Insert: -- $N\_quality_{omni}^{L_k} = (1-\alpha) \cdot N\_quality_{omni}^{L_k} + \alpha$. --

Column 34, Line 3    Delete:

"$N\_quality_{omni}^{L_k} = (1-\alpha) \cdot N\_quality_{omni}^{L_k}$."

Insert: -- $N\_quality_{omni}^{L_k} = (1-\alpha) \cdot N\_quality_{omni}^{L_k}$. --

Column 34, Lines 5 and 37    Delete: "$N\_quality_{omni}^{L_k}$"

Insert: -- $N\_quality_{omni}^{L_k}$ --

UNITED STATES PATENT AND TRADEMARK OFFICE
CERTIFICATE OF CORRECTION

PATENT NO. : 7,027,409 B2  
APPLICATION NO. : 10/400997  
DATED : April 11, 2006  
INVENTOR(S) : Joseph Bibb Cain Page 2 of 4

It is certified that error appears in the above-identified patent and that said Letters Patent is hereby corrected as shown below:

Column 34, Line approx. line 40,  Delete:

"$N\_quality_{omni}^{L_k} < T_{omni}^{L}$; Set $Can\_Alloc^{L_k} = FALSE$;    (12)"

and

Insert:

-- $N\_quality_{omni}^{L_k} < T_{omni}^{L}$; Set $Can\_Alloc^{L_k} = FALSE$;    (12) -- approx. line 42,  Delete:

"$N\_quality_{omni}^{L_k} > T_{omni}^{H}$; Set $Can\_Alloc^{L_k} = TRUE$;    (13)"

and

Insert:

-- $N\_quality_{omni}^{L_k} > T_{omni}^{H}$; Set $Can\_Alloc^{L_k} = TRUE$;    (13) and -- approx. line 45,  Delete:

"$T_{omni}^{L} \leq N\_quality_{omni}^{L_k} \leq T_{omni}^{H}$; Do not modify $Can\_Alloc^{L_k}$.    (14)"

and

Insert:

-- $T_{omni}^{L} \leq N\_quality_{omni}^{L_k} \leq T_{omni}^{H}$; Do not modify $Can\_Alloc^{L_k}$.    (14) --

UNITED STATES PATENT AND TRADEMARK OFFICE
CERTIFICATE OF CORRECTION

PATENT NO. : 7,027,409 B2
APPLICATION NO. : 10/400997
DATED : April 11, 2006
INVENTOR(S) : Joseph Bibb Cain It is certified that error appears in the above-identified patent and that said Letters Patent is hereby corrected as shown below:

Column 34, Lines 48 and 50-51 (Line 48)

Delete: "$N\_quality_{omni}{}^{L_k}$"

Insert: -- $N\_quality_{omni}^{L_k}$ --

(Line 50-51)

Delete: "$N\_quality_{omni}{}^{L_k}$"

Insert: -- $N\_quality_{omni}^{L_k}$ --

Column 34, Lines 52, 54 and 56 (Line 52)

Delete: "$T_{omni}{}^{H}$"

Insert: -- $T_{omni}^{H}$ --

(Line 52)

Delete: "$T_{omni}{}^{L}$"

Insert: -- $T_{omni}^{L}$ --

(Line 54)

Delete: "$T_{omni}{}^{L} = 0.2$ and $T_{omni}{}^{H} = 0.8$"

Insert: -- $T_{omni}^{L} = 0.2$ and $T_{omni}^{H} = 0.8$ --

(Line 56)

Delete: "$T_{omni}{}^{L}$"

Insert: -- $T_{omni}^{L}$ --

UNITED STATES PATENT AND TRADEMARK OFFICE
CERTIFICATE OF CORRECTION

PATENT NO. : 7,027,409 B2
APPLICATION NO. : 10/400997
DATED : April 11, 2006
INVENTOR(S) : Joseph Bibb Cain It is certified that error appears in the above-identified patent and that said Letters Patent is hereby corrected as shown below:

Column 42, Line 46        Delete: "of the"

Insert: -- on the --

Column 48, Line 47        Delete: "$M_{n,T_t}{}^I$"

Insert: -- $M^I_{n,T_i}$ --

Column 51, Line 22        Delete: "he"

Insert: -- the --

Signed and Sealed this

Twenty-eighth Day of November, 2006

JON W. DUDAS
*Director of the United States Patent and Trademark Office*